(12) United States Patent
Galin et al.

(10) Patent No.: US 11,400,821 B2
(45) Date of Patent: Aug. 2, 2022

(54) ELECTRIC-VEHICLE CHARGING APPARATUS

(71) Applicant: Solaredge Technologies Ltd., Herzeliya (IL)

(72) Inventors: Yoav Galin, Raanana (IL); Lior Handelsman, Givatayim (IL); Gad Michaeli, Kochav Yair (IL); Peter Mathews, Los Altos Hills, CA (US); Guy Sella, Bitan Aharon (IL); Gil Matzliach, Kfar Saba (IL); Ariel Cohen, Modiin (IL); Meir Adest, Raanana (IL); Ilan Yoscovich, Ramat Gan (IL)

(73) Assignee: Solaredge Technologies Ltd., Herzeliya (IL)

( * ) Notice: Subject to any disclaimer, the term of this patent is extended or adjusted under 35 U.S.C. 154(b) by 141 days.

(21) Appl. No.: 17/017,842

(22) Filed: Sep. 11, 2020

(65) Prior Publication Data

US 2021/0094427 A1 Apr. 1, 2021

Related U.S. Application Data

(63) Continuation of application No. 15/872,287, filed on Jan. 16, 2018, now Pat. No. 10,875,406.
(Continued)

(51) Int. Cl.
*B60L 53/14* (2019.01)
*H02J 7/00* (2006.01)
(Continued)

(52) U.S. Cl.
CPC .............. *B60L 53/14* (2019.02); *B60L 53/20* (2019.02); *B60L 53/50* (2019.02); *B60L 53/57* (2019.02);
(Continued)

(58) Field of Classification Search
None
See application file for complete search history.

(56) References Cited

U.S. PATENT DOCUMENTS 5,825,639 A 10/1998 Wagoner
8,242,627 B2 8/2012 Ichikawa
(Continued)

FOREIGN PATENT DOCUMENTS

DE 102016213070 A1 12/2016
JP S6412828 A 1/1989
(Continued)

OTHER PUBLICATIONS

Nov. 2, 2021—JP Office Action—App No. 2018-006335.
(Continued)

*Primary Examiner* — Jared Fureman
*Assistant Examiner* — Aqeel H Bukhari
(74) *Attorney, Agent, or Firm* — Banner & Witcoff, Ltd.

(57) ABSTRACT

An apparatus for a power system. The apparatus includes multiple electrical power sources and an enclosure operatively connected to the power sources at multiple input terminals. Multiple loads operatively connect to the enclosure at multiple output terminals by multiple cables. The enclosure includes the input terminals and the output terminals and a controller unit. Multiple selection units operatively connect to the controller unit, multiple power converters are connected to multiple connection paths. The selection units connect to at least one of multiple switches connected in the connection paths. Multiple sensor units are operatively attached to the controller unit which is configured to sense multiple parameters in the connection paths. Responsive to the parameters sensed by the sensor units, the selection units select the connection paths between the electrical power sources and the loads.

20 Claims, 28 Drawing Sheets

Related U.S. Application Data

(60) Provisional application No. 62/521,635, filed on Jun. 19, 2017, provisional application No. 62/513,160, filed on May 31, 2017, provisional application No. 62/512,333, filed on May 30, 2017, provisional application No. 62/448,194, filed on Jan. 19, 2017.

(51) Int. Cl.

| | | |
|---|---|---|
| *H02J 4/00* | (2006.01) | |
| *H02J 3/14* | (2006.01) | |
| *H01R 13/66* | (2006.01) | |
| *B60L 53/20* | (2019.01) | |
| *B60L 53/50* | (2019.01) | |
| *B60L 55/00* | (2019.01) | |
| *B60L 53/57* | (2019.01) | |
| *H02J 3/38* | (2006.01) | |

(52) U.S. Cl.
CPC ............ *B60L 55/00* (2019.02); *H01R 13/665* (2013.01); *H01R 13/6683* (2013.01); *H02J 3/14* (2013.01); *H02J 3/38* (2013.01); *H02J 3/382* (2013.01); *H02J 3/388* (2020.01); *H02J 4/00* (2013.01); *H02J 7/0042* (2013.01); *H02J 2310/64* (2020.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y04S 10/126* (2013.01)

(56) References Cited

U.S. PATENT DOCUMENTS

| | | | |
|---|---|---|---|
| 8,466,655 B2 | 6/2013 | Mitsutani | |
| 9,731,611 B2 | 8/2017 | Kojima | |
| 9,831,674 B2 | 11/2017 | Kobayashi | |
| 10,183,583 B2 | 1/2019 | Narla | |
| 10,355,611 B2 | 7/2019 | Nagashima et al. | |
| 11,183,843 B1* | 11/2021 | Cooper | H02J 13/00004 |
| 2008/0039979 A1 | 2/2008 | Bridges et al. | |
| 2009/0189456 A1 | 7/2009 | Skutt | |
| 2011/0285350 A1* | 11/2011 | Mitsutani | B60L 50/61 |
| | | | 320/109 |
| 2012/0109403 A1 | 5/2012 | Shelton et al. | |
| 2013/0020993 A1 | 1/2013 | Taddeo et al. | |
| 2013/0335025 A1 | 12/2013 | Kuribayashi et al. | |
| 2015/0155715 A1 | 6/2015 | Kobayashi | |
| 2016/0176305 A1 | 6/2016 | James et al. | |
| 2019/0135116 A1 | 5/2019 | Narla | |

FOREIGN PATENT DOCUMENTS

| | | |
|---|---|---|
| JP | 2009278776 A | 11/2009 |
| JP | 2011103754 A | 5/2011 |
| JP | 2013059520 A | 4/2013 |
| JP | 2013251958 A | 12/2013 |
| JP | 2015023748 A | 2/2015 |
| WO | 2012/007640 A1 | 1/2012 |

OTHER PUBLICATIONS

Jun. 2, 20186—EP App No. 18152327.5 EP Search Report and WO.
"Product Leaflet: Electric Vehicle Charging Infrastructure Terra multistandard DC charging station 23", published in 2014, pp. 1-2, XP55909662, Retrieved from the Internet: URL:https://www.schnellladen.ch/images/uploaded/produkte/ABB/Terra/4EVC301505-LFEN_Terra23C-CT-CJ-CJG.pdf [retrieved on Apr. 6, 2022].
"Introduction and first demonstration of CCS Combined Charging System as the new Standard for Electric Vehicle Fast Charging", , Oct. 2, 2014 (Oct. 2, 2014), pp. 1-40, XP55909664, Retrieved from the Internet: URL:http://vww.messe-sauber.de/doc/files/d4_2_13_busch_script.pdf [retrieved on Apr. 6, 2022].
Apr. 13, 2022—European Office Action—EP App. No. 18181434.4.

\* cited by examiner

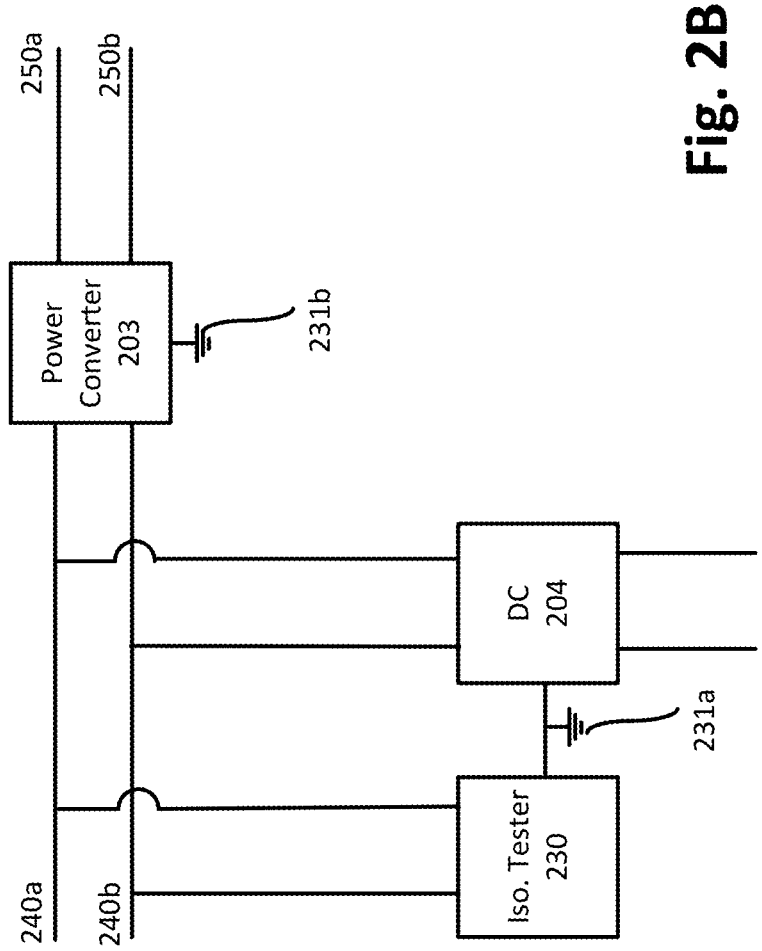

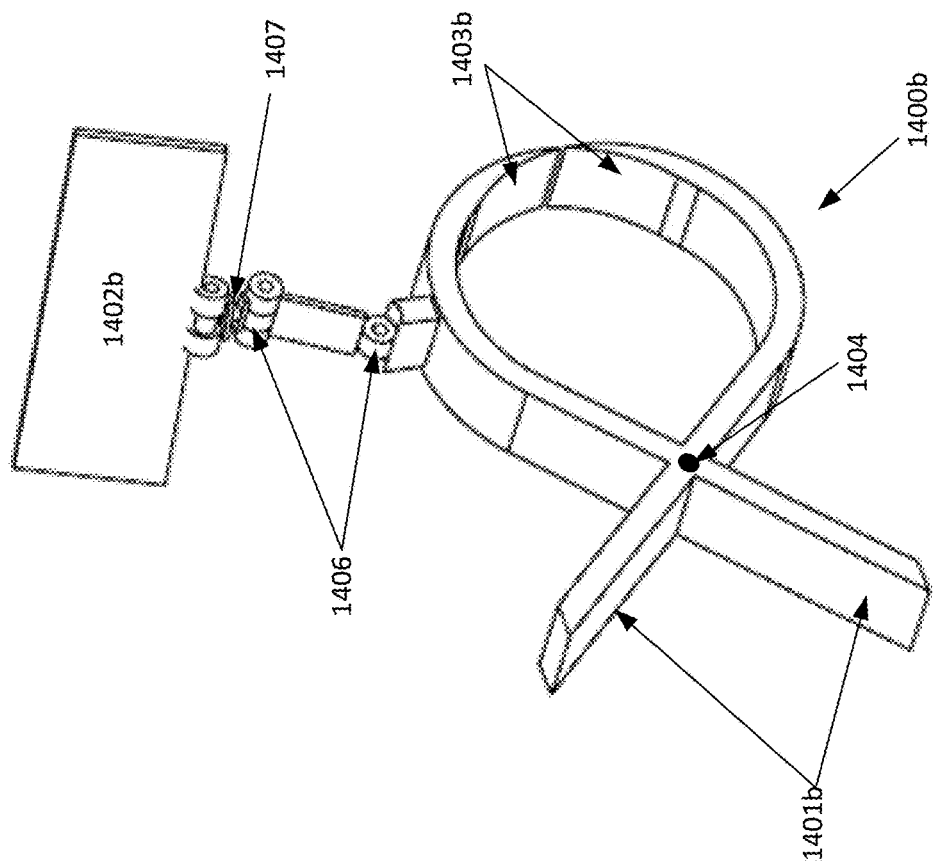
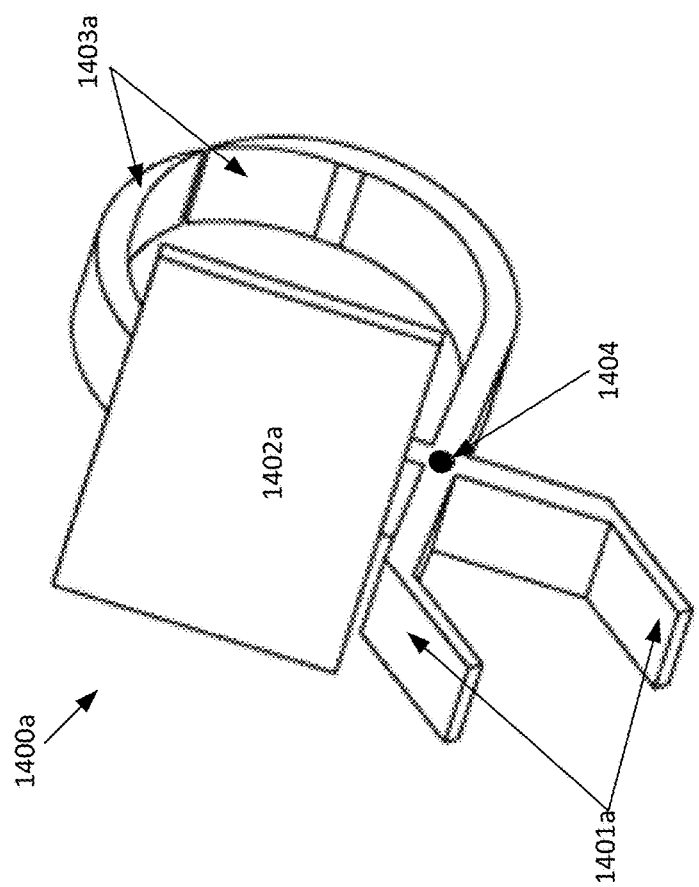
Fig. 14A
Fig. 14B

ELECTRIC-VEHICLE CHARGING APPARATUS

CROSS-REFERENCE TO RELATED APPLICATIONS

The present application is a continuation of U.S. patent application Ser. No. 15/872,287, filed on Jan. 16, 2018, which claims priority to and claims the benefit of U.S. Provisional Patent Application No. 62/448,194, which was filed on Jan. 19, 2017, U.S. Provisional Patent Application No. 62/512,333, which was filed on May 30, 2017, U.S. Provisional Patent Application No. 62/513,160, which was filed on May 31, 2017, and U.S. Provisional Patent Application No. 62/521,635, which was filed on Jun. 19, 2017, each of which is hereby incorporated by reference in its entirety.

BACKGROUND

Renewable power systems (e.g., photovoltaic, wind turbine, hydro-electric, to name a few non-limiting examples) may feature a direct current to alternating current (DC/AC) inverter for converting direct current (DC) power generated by renewable power sources to alternating current (AC) for consumption by electrical loads and/or for providing to an electrical grid. Electrical vehicles (EVs) may be rechargeable by home-charging circuits which may provide AC and/or DC power to EV on-board energy storage devices, such as batteries. Power systems at certain locations (e.g., homes) may include both an inverter and an EV charger, which may feature separate enclosures, separate control, monitoring and/or communication devices, and separate electronic circuits.

SUMMARY

The following summary is a short summary of some of the inventive concepts for illustrative purposes only, and is not intended to limit or constrain the inventions and examples in the detailed description. One skilled in the art will recognize other novel combinations and features from the detailed description.

Embodiments herein may employ integrated inverter-EV charger (IIEVC) circuits and associated apparatuses and methods for controlling operation of an integrated inverter-EV charger.

In illustrative embodiments, an integrated inverter-EV-charger (IIEVC) may include an inverter circuit, and one or more of a direct current (DC) EV-charger and an alternating current (AC) EV-charger.

Illustrative embodiments disclosed herein may include an inverter designed to receive a DC voltage at the inverter input and provide an AC voltage at the inverter circuit output. The AC voltage may be single-phase or multi-phase (e.g., three-phase). In some embodiments, the inverter may be configured to provide Maximum Power Point Tracking (MPPT) functionality to draw increased power from coupled renewable power sources (e.g., PV generators). In some embodiments, the inverter may be communicatively coupled to additional power modules (e.g., DC/DC converters) configured to provide MPPT functionality at a more granular (e.g., per PV-generator) level.

The inverter may be designed to convert power from a variety of power sources. In some embodiments, the inverter may be configured to convert DC photovoltaic voltage and/or power received from PV generators (e.g., one or more PV cells, PV cell substrings, PV cell strings, PV panels, strings of PV panels, PV shingles and/or PV roof tiles). In some embodiments, the inverter may convert power received from one or more fuel cells, batteries, wind turbines, flywheels or other power sources. In some embodiments, an inverter device may receive an AC voltage and/or power input, and may include a rectifier circuit to convert the AC voltage to a DC voltage, with an inverter circuit configured to convert the DC voltage to an AC output voltage.

In illustrative embodiments, an IIEVC may feature certain components which may be shared by both an inverter circuit and an EV-charger circuit. For example, in some embodiments, a single enclosure may house both the inverter circuit and the EV-charger circuit. In some embodiments, the inverter circuit and the EV-charger circuit may be housed in separate enclosures mechanically designed to be easily attachable. In some embodiments, additional circuitry may be housed in an enclosure along with the EV-charger circuit, with the additional circuitry which may be coupled to the inverter circuit. For example, a single enclosure may house an EV-charger circuit along with a safety device, with the joint EV-charger circuit and safety device apparatus electrically connectable (e.g., via suitably interconnecting connectors) to the inverter circuit and the enclosure mechanically connectable to an enclosure housing the inverter circuit.

In some embodiments, the inverter circuit and the EV-charger circuit may share one or more communication devices. In some embodiments, information and/or measurements obtained from and/or pertaining to the inverter circuit and the EV-charger circuit may be displayed on a single on-device monitor, remote monitor, mobile application or other monitoring and display devices. In some embodiments, a shared graphical user interface (GUI) may be provided to a user. In some embodiments, the user may be able to manually control operation of the inverter circuit and/or the EV-charger circuit via the shared GUI.

In some embodiments, the one or more communication devices may be configured to communicate with a second communication device which may a part of the EV.

In some embodiments, the inverter circuit and the EV-charger circuit may share a control device configured to control operation of the inverter and the EV-charger. In some embodiments, a shared control device may be configured to manage power production by the inverter and charging/discharging of an EV energy storage device.

In further embodiments, electrical circuitry may be shared by the inverter circuit and the EV-charger circuit. For example, a DC EV charger may share DC voltage inputs with the inverter circuit. As another example, an AC EV charger may share AC voltage terminals with the inverter circuit. In some embodiments, sensors may be configured to measure one or more parameters (e.g., voltage, current, power, temperature, isolation, etc.) affecting the operation of both the inverter circuit and an EV charger circuit. In some embodiments, the parameters may be provided to a shared control device and/or displayed or monitored on a shared monitoring device. In some embodiments, shared safety devices (e.g., Residual Current Detectors/Ground Fault Detector Interrupters, fuses, safety relays) may be disposed to detect and/or respond to a potentially unsafe condition affecting the inverter circuit and/EV-charger circuit.

In some embodiments, the EV-charger circuit and the inverter may share components external to the IIEVC. For example, a single IIEVC including an inverter and an EV-charger circuit may be connected to an electrical panel via a single circuit breaker, which may require less time and cost than the time and cost associated with installing an inverter and an EV-charger circuit separately to an electrical panel (e.g., via two separate circuit breakers).

In some embodiments, the inverter may be replaced by a direct-current to direct-current (DC/DC) converter configured to provide a DC output to a DC grid and/or coupled DC loads. For simplicity, reference will be made to an inverter throughout the disclosure (including in the acronym IIEVC—Integrated Inverter Electric Vehicle Charger), but this is not to be a limitation on the disclosure.

According to illustrative embodiments disclosed herein, an IIEVC may be communicatively connected to a Graphical User Interface (GUI) viewable and/or accessible to a user via a monitor mounted on the enclosure of the IIEVC or an external monitor (e.g., a smartphone, tablet, computer monitor, server etc.). The GUI may, in addition display operational information and/or allow manual control of the operation of the IIEVC. The Graphical User Interface (GUI) may additionally be available on a connector and/or plug which is connectable to corresponding receptacle and/or socket of the EV. The socket may be connected to the IIEVC via a cable. The connector may include seletable power conversion circuitry which enables either DC or AC power to be received from the IEVC and to convert either DC or AC power input power to an output power suitable to charge a storage device of the EV. Either DC or AC power input power to the IIEVC may also be selectable form a number of different power sources which may be available. Selection of input power to the IIEVC form a number of different power sources may be responsive to costs aassocaited with the cost of supply in each path from each of the power sources, required power levels in terms of voltages and curents potentially available in each path and/or current charge levels of storage devices.

As noted above, this Summary is merely a summary of some of the features described herein and is provided to introduce a selection of concepts in a simplified form that are further described below in the Detailed Description. The Summary is not exhaustive, is not intended to identify key features or essential features of the claimed subject matter and is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

FIG. 2B is part schematic, part block-diagram depicting aspects of an integrated inverter-EV charger (IIEVC) according to illustrative embodiments.

FIG. 14A shows an add-on clamp according to illustrative embodiments.

FIG. 14B shows an embodiment of an add-on clamp according to illustrative embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

The term "multiple" as used here in the detailed description indicates the property of having or involving several parts, elements, or members. The claim term "a plurality of" as used herein in the claims section finds support in the description with use of the term "multiple" and/or other plural forms. Other plural forms may include for example regular nouns that form their plurals by adding either the letter 's' or 'es' so that the plural of converter is converters or the plural of switch is switches for example.

The claim terms "comprise", "comprises" and/or "comprising" as used herein in the claims section finds support in the description with use of the terms "include", "includes" and/or "including".

Figure 1A:
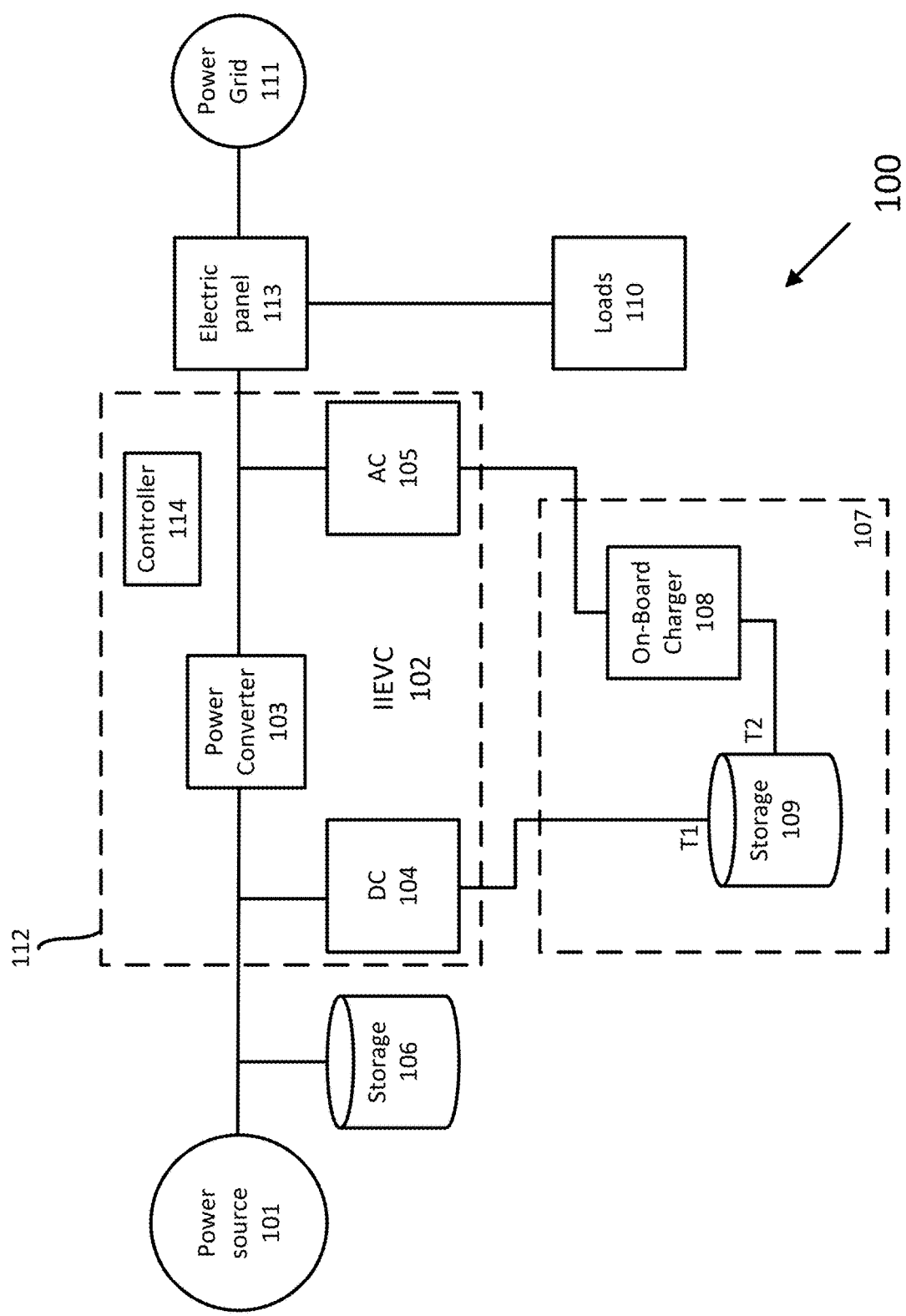
FIG. 1A is part schematic, part block-diagram depicting aspects of a power system configuration according to illustrative embodiments.
Figure 1B:
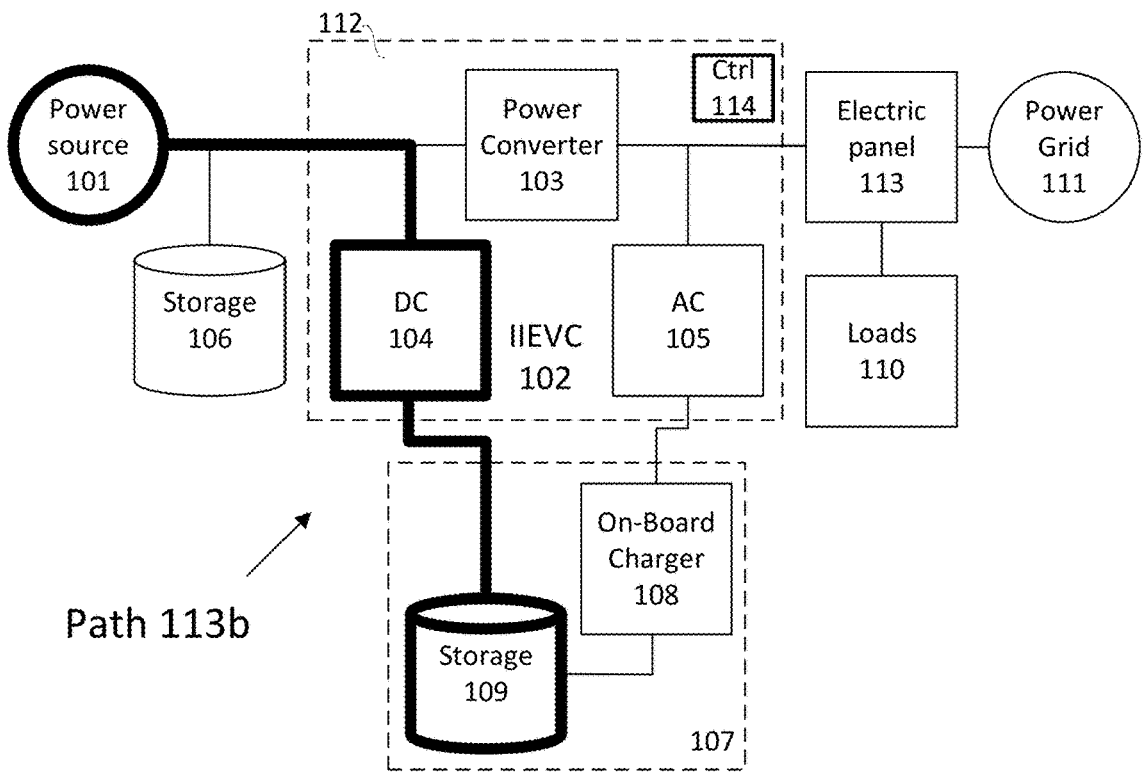
FIG. 1B illustrates a flow of power from a power source to an EV according to illustrative embodiments.
Figure 1C:
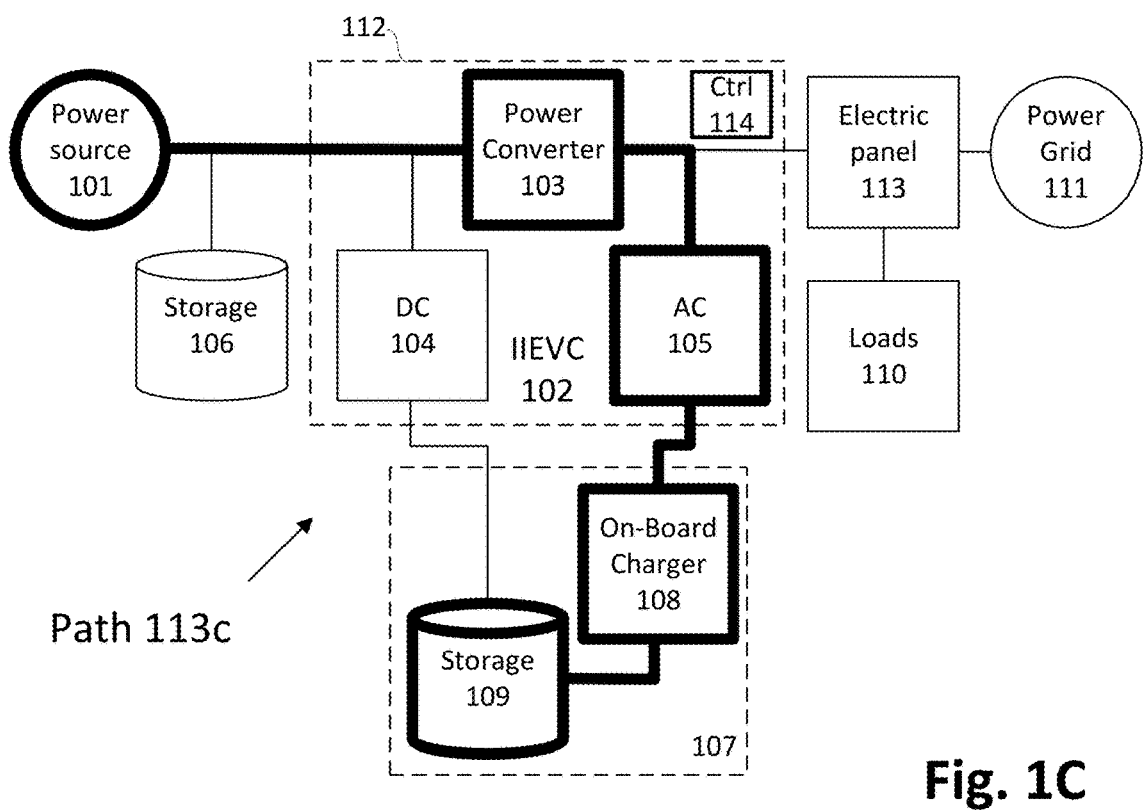
FIG. 1C illustrates a flow of power from a power source to an EV according to illustrative embodiments.
Figure 1D:
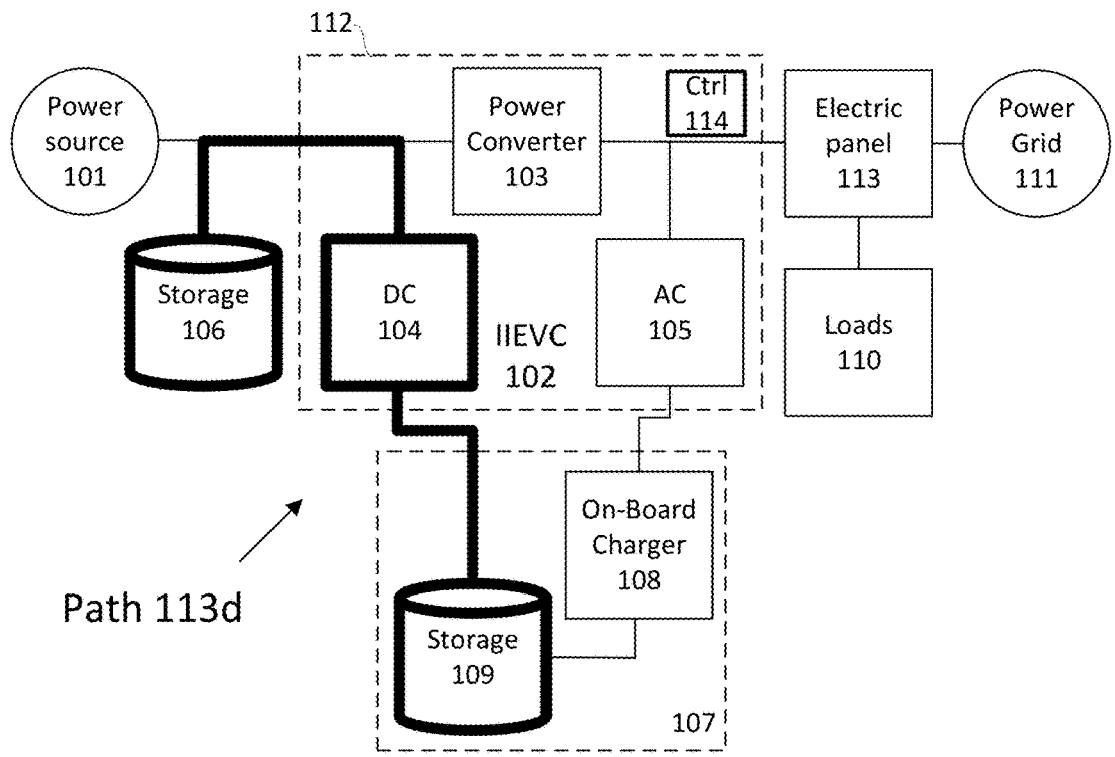
FIG. 1D illustrates a flow of power from a power source to an EV according to illustrative embodiments.
Figure 1E:
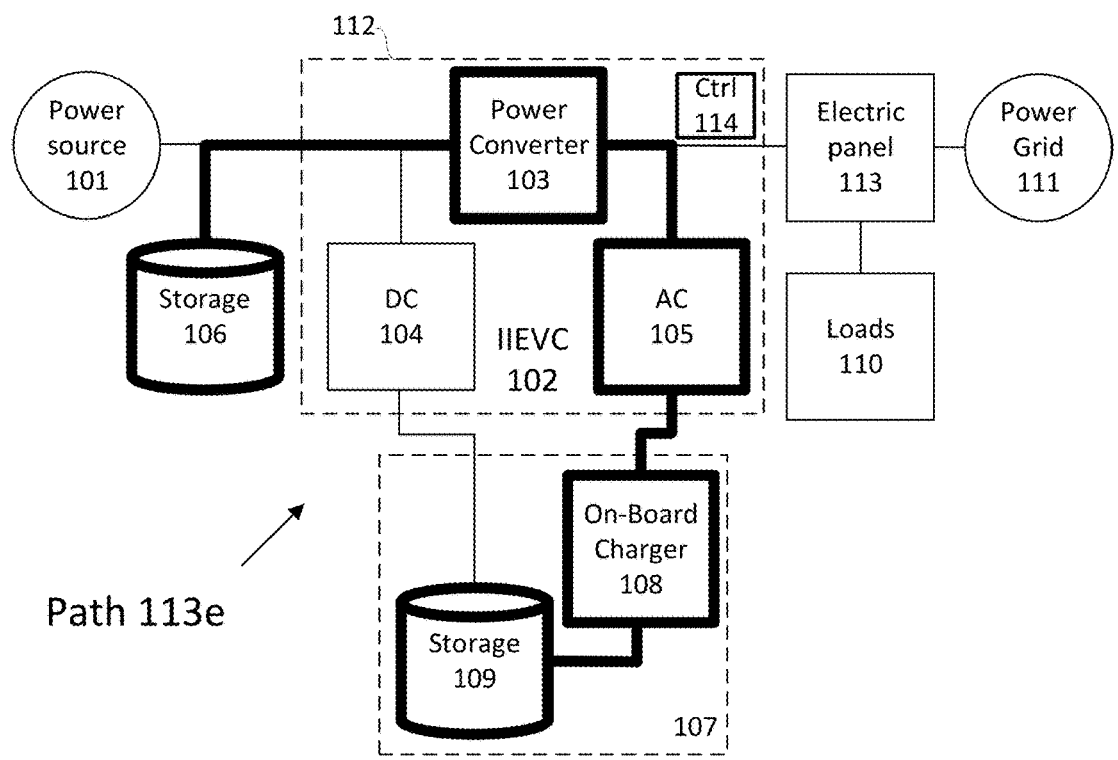
FIG. 1E illustrates a flow of power from a power source to an EV according to illustrative embodiments.
Figure 1F:
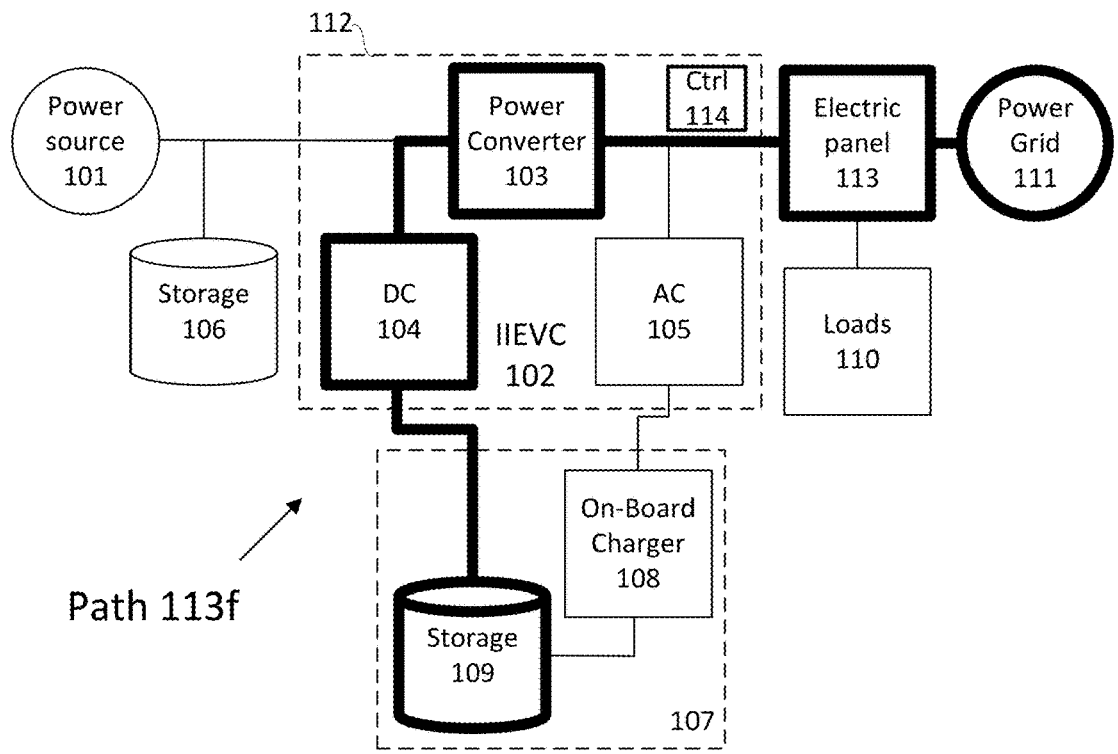
FIG. 1F illustrates a flow of power from a power source to an EV according to illustrative embodiments.
Figure 1G:
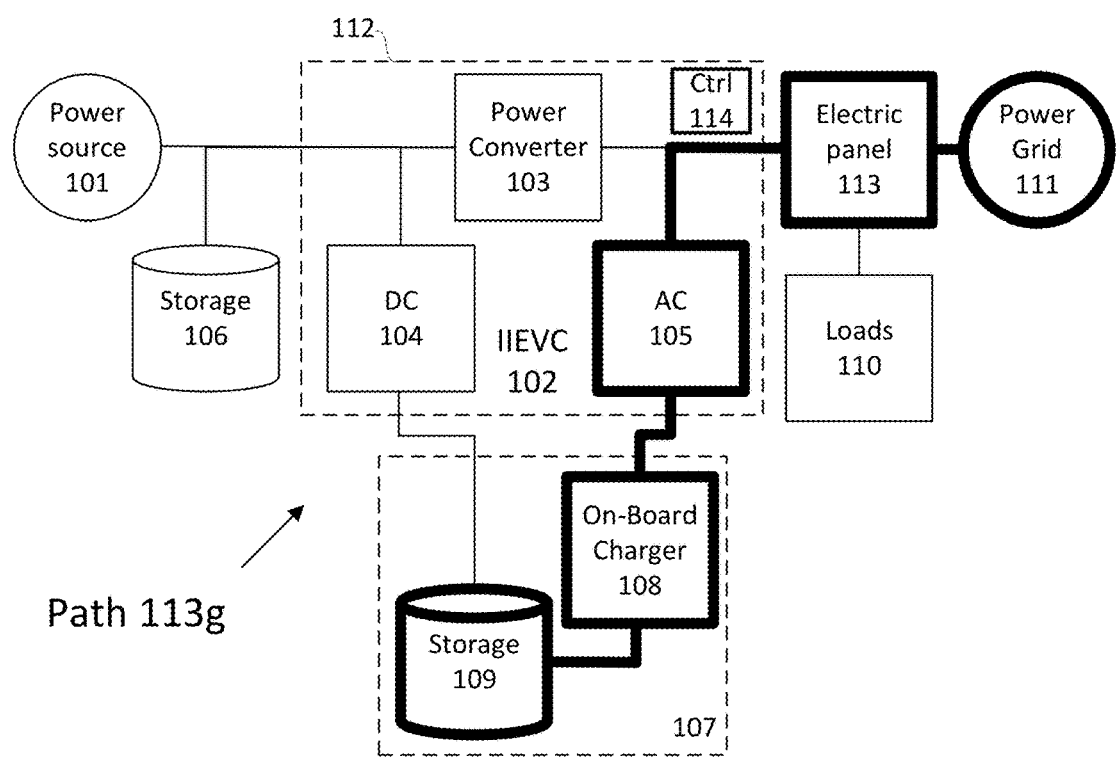
FIG. 1G illustrates a flow of power from a power source to an EV according to illustrative embodiments.

Reference is now made to FIG. 1A, which shows a block diagram of a power system 100 configuration according to illustrative embodiments. Power system 100 may include power source 101. In some embodiments, power source 101 may include, batteries, capacitors, stoage devices, or any suitable generator such as such as, for example, one or more PV cells, PV cell substrings, PV cell strings, PV panels, strings of PV panels, PV shingles, and/or PV roof tiles, to name a few non-limiting examples. Power source 101 may provide input power to integrated inverter-EV charger (IIEVC) 102.

IIEVC 102 may be variously realized. In the illustrative embodiment of FIG. 1A, IIEVC 102 includes enclosure 112, where enclosure 112 may house power converter 103, DC charging circuit 104, and AC charging circuit 105. Enclosure 112 may include terminals inside and cable glands (not shown) to terminate cables both mechanically and electrically to enclosure 112. The cables may connect power source 101 and storage 106 to enclosure 112, electric panel 113 to enclosure 112 and IIEVC 102 to EV 107. IIEVC 102 may provide power to EV 107 through AC charging circuit 105 and/or DC charging circuit 104. The path of provided power by the one or more power sources to EV 107 may be controlled by a controller or a control device which may be a part of IIEVC 102. Further details of the potentuial paths of power provided to EV107 are described in the descriptions which follow.

Power converter 103 may receive power from power source 101 and provide output power to loads 110 and/or power grid 111. In some embodiments, power source 101 may be a DC power source and storage device 106 and DC charging circuit 104 may be configured to receive DC power. Further in these embodiments, power converter 103 may be a DC/AC converter (e.g., an inverter) and loads 110 and power grid 111 may be configured to receive AC power from power converter 103. In some embodiments, power source 101 may be an AC power source, and DC charging circuit 104 and storage device 106 may be configured to receive AC power. Further in these embodiments, power converter 103 may be an AC/AC converter (e.g., a rectifier circuit coupled to an inverter) and loads 110 and power grid 111 may be configured to receive AC power from power converter 103. In some embodiments, power source 101 may be a DC power source, with storage device 106, DC charging circuit 104 and AC charging circuit 105 configured to receive DC power. Power converter 103 may be a DC/DC converter, AC charging circuit 105 may include a DC/AC converter and loads 110 and power grid 111 (e.g., a DC microgrid and/or a home power grid) may receive DC power from power converter 103. For simplicity, with regard to FIG. 1A and further embodiments disclosed herein, power source 101 will be considered to be a DC power source (e.g., a photovoltaic power generator) and power converter 103 will be considered to be a DC/AC converter (e.g., an inverter), without limiting the scope of the disclosure.

In some embodiments, power grid 111 may include one or more power grids and/or microgrids, power generators, energy storage devices and/or loads.

In some embodiments, loads 110 may include home appliances (e.g., refrigerator, vacuum cleaner, lights, washing machine, microwave and PC, workshop tools (e.g., compressor, electric saw, lathe and sander) and/or AC energy storage devices. Power converters mentioned herein (e.g., power converter 103 of FIG. 1A, optionally power converters included in DC charging circuit 104 and AC charging circuit 105, and power converters 203 and 303, discussed below) may be DC/DC, DC/AC, AC/AC or AC/DC converters, depending on the type of power source 101, loads 110 and/or power grid 111. The power converters may be isolated (e.g., by use of an internal transformer) or non-isolated, and may include, for example, full bridge circuits, Buck converters, Boost converters, Buck-Boost converters, Buck+Boost converters, Flyback converters, Forward converters, Cuk converters, charge pumps, or other types of converters.

For visual simplicity, FIG. 1A illustrates functional electrical connections using single line. A single-line may represent one or more cables including one or more conductors.

In some embodiments, electric panel 113 may be disposed between power converter 103 and power grid 111, with loads 110 coupled to power converter 103 and power grid 111 via electric panel 113. Electric panel 113 may include a single circuit breaker (not explicitly depicted) coupled to IIEVC 102. The single circuit breaker of electric panel 113 may be configured to trip in response to a current above a certain threshold (e.g., 40A) flowing into or out of IIEVC 102. In some embodiments, the single circuit breaker may be configured to trip in response to a first current (e.g., 40A) flowing into IIEVC 102, and configured to trip in response to a second current (e.g., 20A) flowing out of IIEVC 102 towards power grid 111. A dual-configuration circuit breaker disposed in electric panel 113 may be configured to impose a first current limit (e.g., 40A) provided for charging EV 107 and a second current limit (e.g., 20A) limiting a current that IIEVC 102 may provide to power grid 111.

In some embodiments, power system 100 may be an off-grid system, i.e., grid 111 might not be present (permanently or temporarily). IIEVC 102 may convert, control, and regulate power drawn from power source 101 and provide controlled power to electric vehicle (EV) 107 and/or loads 110. An off-grid system may be an on-board system, i.e. one or more of the elements shown in FIG. 1A may be mounted on or integrated in EV 107. EV 107 may include storage device 109 (e.g., a battery). EV 107 may be fully powered by storage device 109, or may include additional power supplies. For example, EV 107 may be a Hybrid EV combining both an electrical engine powered by storage device 109 and a combustion engine powered by gasoline. In some embodiments, storage device 109 may be charged directly by DC charging circuit 104. DC charging circuit 104 may include a power converter (e.g., a DC/DC converter in cases where power source 101 is a DC power source or a DC/AC converter in cases where power source 101 is an AC power source). In some embodiments, DC charging circuit 104 may provide power directly (e.g., without power conversion) to storage device 109. In some embodiments, storage device 109 may include an integrated power converter. In some embodiments, DC charging circuit 104 may include a plug.

In some embodiments, storage device 109 may be charged by on-board charger 108, which may receive power from AC charging circuit 105. In some embodiments, AC charging circuit 105 might not be necessary, and on-board charger 108 may be connected directly to the output of power converter 103 and/or power grid 111. AC charging circuit 105 may include a power converter for conditioning the power (e.g., AC power) output by power converter 103 and/or provided by power grid 111 (e.g., AC power at grid voltage and grid frequency). In some embodiments, AC charging circuit 105 may include one or more sensors, control devices, communication devices, and/or safety devices, and may be configured to control and/or monitor the power provided to on-board charger 108. In some embodiments, AC charging circuit 105 may be a short-circuit providing a direct connection between on-board charger 108 and the output of power converter 103.

In some embodiments, power provided to EV 107 may be transferred directly to a propulsion device (such as an electric engine, a hybrid engine or a power module (e.g., a power converter) coupled to an engine) of EV 107 instead of or in addition to being stored in a storage device. In such embodiments storage device 109 may be omitted from FIG. 1A or replaced with a propulsion device. Transferring power directly to a propulsion device may be implemented in an on-board system.

In some embodiments, power system 100 may include a vehicle to grid (V2G) mode, and/or EV 107 may transfer power to loads in power system 100 through IIEVC 102. A controller 114 may be a part of IIEVC 102 which may consider EV 107 as an additional energy storage device, and control the power to and/or from EV 107.

In some embodiments, the two terminals T1 and T2 of storage device 109 shown in FIG. 1A may be merged into a single terminal.

In some embodiments, the input voltage to storage device 109 may be a floating voltage with respect to power grid 111 and/or isolated from power grid 111. This may be achieved by designing DC charging circuit 104 to include an input and an output isolated from each other and/or by designing power source 101 and/or storage device 106 to generate a floating voltage with respect to power grid 111. If power system 100 is an off-grid system, i.e. disconnected from the grid, DC charging circuit 104 may include an input and an output which may be non-isolated from each other. In some embodiments, where DC charging circuit 104 may include an input and an output which may be non-isolated from each other, if power is transferred to/from EV 107 through DC charging circuit 104, power converter 103 may be disabled in order to allow isolation from power grid 111.

In some embodiments, where DC charging circuit 104 may include an input and an output which may be isolated from each other, if power is transferred to/from EV 107 through DC charging circuit 104, power converter 103 may be allowed to convert power.

Still referring to FIG. 1A, one or more power sources may provide power to power system 100. The power sources may provide DC power (e.g., power source 101 and/or storage device 106) and/or AC power (e.g., power grid 111). In some embodiments, power converter 103 may convert AC power to DC power and/or convert DC power to AC power. EV 107 may be able to receive DC power through DC charging circuit 104 and/or AC power through AC charging circuit 105. Each power source may provide power to EV 107 through AC charging circuit 105 and/or DC charging circuit 104. The path of provided power by the one or more power sources to EV 107 may be controlled by a controller or a control device which may be a part of IIEVC 102. For example, transferring power provided by power source 101 to EV 107 through a path including DC charging circuit 104 and/or a path including power converter 103 and AC charging circuit 105 may be controlled by the controller. In some embodiments, some paths may be preferable over other paths, either permanently or temporarily. For example, a first power source may provide power with a first fixed or variable cost rate per kWh (kilo Watt hour), and a second power source may provide power with a second fixed or variable cost rate per kWh. The first cost rate may be higher than the second cost rate, either permanently or temporarily. Preferring paths that include power provided by the second power source over paths that include power provided by the first power source may reduce the cost of power for power system 100. In another example, a first path may have higher power transfer efficiency compared to a second path, and the first path may be preferable in order to reduce power loss. As yet another example, a first path may deliver energy at a first power rate, and a second path may deliver energy at a second, lower power rate. In this case, using the first path may reduce charging time, and may be preferable.

In some embodiments, the capacity of power transferred through one or more charging circuits (such as DC charging circuit 104 and/or AC charging circuit 105) may be limited. An IIEVC (such as IIEVC 102) may first utilize most of the capacity of a first charging circuit, before transferring power through a second charging circuit. For example, the controller may direct power provided by power source 101 to be transferred through DC charging circuit. If DC charging circuit is not capable of transferring all the power provided by power source 101, then some (or, in some embodiments, none) of the power provided by power source 101 may be transferred through DC charging circuit 104, and the residual power provided by power source 101 may be converted into AC power by power converter 103 and transferred to EV 107 through AC charging circuit 105, or stored in an energy storage device which may be a part of loads 110.

In some embodiments, the controller may limit the power provided by one or more power sources (such as storage device 106). Limiting power may be beneficial when the power source is a storage device, which may provide power for a longer period of time by providing less power at any given time, or when the power source is providing power at a high cost. For example, when the power from power grid 111 is at a low cost rate per kWh, the controller may charge EV 107 with power provided by power grid 111, and may charge storage device 106 with power provided by power source 101. When the power from power grid 111 is at a high cost rate per kWh, the controller may charge EV 107 with less (or zero) power from power grid 111, and may charge EV 107 with power provided by storage device 106 and power source 101 (if available).

In some embodiments, where one of the power sources is a renewable energy source (such as a PV generator), it may be preferable to use some of the energy provided by the renewable energy source, over energy provided by other power sources. In some power systems, when the EV is disconnected and where an energy storage device is available, it may be preferable to store in an energy storage device some of the energy provided by the renewable energy source. Later the energy stored in the storage device may be used to charge the EV when the EV is coupled to one or more of the charging circuits.

In some embodiments, charging an EV via a DC charging circuit (such as DC charging circuit 104) may be preferable over charging an EV via an AC charging circuit (such as AC charging circuit 105). In some embodiments, charging an EV through a DC charging circuit may allow more power to be transferred to the EV (compared to charging the EV through an AC charging circuit).

In some embodiments the lines coupling IIEVC 102 to EV 107 may represent wires embedded in a single cable capable of transferring both DC power and AC power simultaneously (e.g., Combined Charging System (CCS), CHarge de MOve (CHAdeMO™).

In some embodiments, EV 107 may be coupled to IIEVC 102 or to a charging device coupled to IIEVC 102 through a wireless connection such as a plugless connection.

In some embodiments, EV 107 may be a multiple of electric vehicles. Each vehicle may include an energy storage device and an on-board charger. Each EV of EVs 107 may be coupled to IIEVC 102 through a cable. The cable may be shared with one or more EVs of EVs 107, may be a different cable for one or more EVs of EVs 107 and/or may be a single cable that splits to one or more EVs of EVs 107.

Reference is now made to FIGS. 1B-1G, which each illustrate a flow of power from a power source to an EV according to illustrative embodiments. IIEVC 102 may transfer power to EV 107 from various sources (e.g., power source 101, power grid 111 and/or storage device 106). The power from each source may be transferred to EV 107 via DC charging circuit 104 and/or AC charging circuit 105. Path 113*b* and path 113*c* illustrate possible power paths from power source 101 to storage device 109. IIEVC 102 may transfer power from power source 101 to storage device 109 directly through DC charging circuit 104 (path 113*b*), and/or transfer power from power source 101 to storage device 109 through power converter 103, AC charging circuit 105 and on-board charger 108 (path 113*c*). IIEVC 102 may distribute the power provided by power source 101 to one or more paths of paths 113*b* and 113*c*. In a similar manner, power provided by storage device 106 may be transferred to storage device 109 through two different paths, path 113*d* including DC charging circuit 104, and path 113*e* including power converter 103, AC charging circuit 105, and on-board charger 108. Power provided by power grid 111 may also be transferred to storage device 109 through two different paths, path 113*f* including electrical panel 113, power converter 103, DC charging circuit 104, and path 113*g*, including electrical panel 113, AC charging circuit 105, and on-board charger 108. The selection of the paths may be by use of multiple selector units (examples of which are discussed with respect to FIGS. 19A-C, below) which may include multiple switches and/or relays (not shown) which when selected by the selector units allow multiple connection paths 113*b*-113*g* to enable the selective supply of DC and/or AC power from power sources 101 and power grid 111 to loads 110 as well as to and/or from storages 106/109.

According to various embodiments, a controller 114 may be configured to determine and/or estimate a preferred distribution to paths of power provided by one or more power sources according to predetermined or adaptively-determined rules and/or limitations. Different paths may have different properties, which may include efficiency of the path and/or the cost of power provided by the source. For example, shorter paths and/or paths that include fewer elements may have better efficiency. In some power systems, where the tariff of power provided by power grid 111 may change over time, the controller may avoid paths that include power provided by power grid 111 at times where the rate of power is high.

Figure 2A:
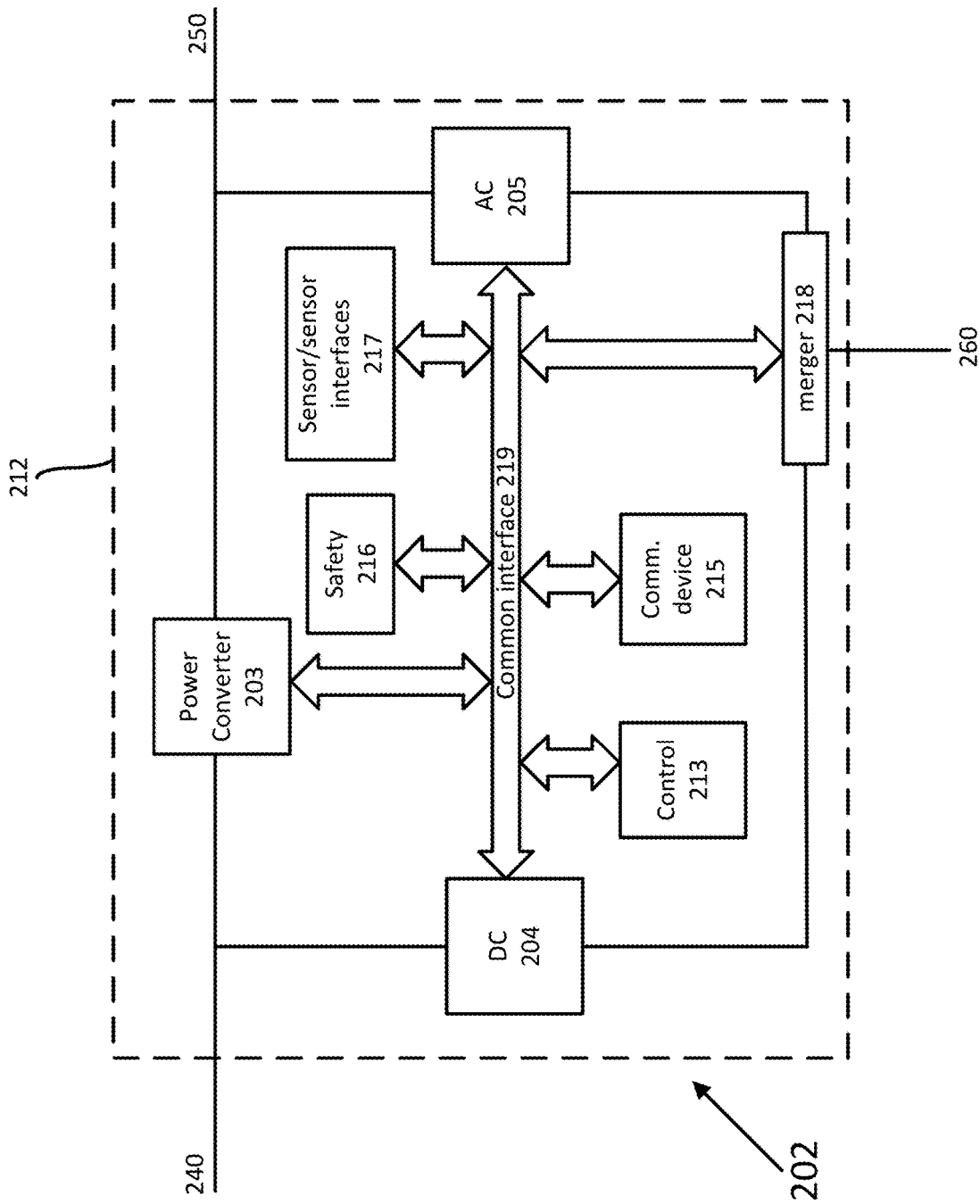
FIG. 2A is part schematic, part block-diagram depicting aspects of an integrated inverter-EV charger (IIEVC) according to illustrative embodiments.

Reference is now made to FIG. 2A, which shows further details of IIEVC 202 according to illustrative embodiments. IIEVC 202 may be similar to or the same as IIEVC 102 of FIG. 1A. Power converter 203, DC charging circuit 204 and AC charging circuit 205 may be similar to or the same as power converter 103, DC charging circuit 104 and AC charging circuit 105, respectively, of FIG. 1A. Enclosure 212 may be similar to or the same as enclosure 112 of FIG. 1A, and may house a plurality of components providing inverter functionality and EV-charging functionality to IIEVC 202.

IIEVC 202 may further include sensors/sensor interfaces 217, which may be configured to measure and/or receive measurements from sensors sensing various parameters at locations within or proximate to IIEVC 202. For example, sensors/sensor interfaces 217 may include voltage sensors configured to measure a voltage at the input 240 of power converter 203 and DC charging circuit 204. Sensors/sensor interfaces 217 may additionally or alternatively include voltage sensors configured to measure a voltage at the output 250 of power converter 203, which may also be the input to AC charging circuit 205. Using a single voltage sensor to measure voltage input to power converter 203 and DC charging circuit 204, and using a single voltage sensor to obtain voltage output by power converter 203 and voltage input to AC charging circuit 205, may provide cost savings by eliminating a need for separate voltage sensors. In some embodiments, sensors/sensor interfaces 217 may include temperature sensors configured to measure temperatures at or around input 240, output 250 and/or other components of IIEVC 202. In some embodiments, sensors/sensor interfaces 217 may include isolation-testing sensors configured to measure electrical isolation between various components of IIEVC and coupled electrical components. For example, sensors/sensor interfaces 217 may include an isolation-sensor configured to measure an isolation between an input to power converter 103 and a reference ground terminal, which may be the same as an isolation between an input to DC charging circuit 104 and the reference ground terminal.

In some embodiments, sensors/sensor interfaces 217 may include current and/or power sensors configured to measure power flowing into (e.g., via input 240) or out of (e.g., via output 250) IIEVC 202, or between various components disposed in IIEVC 202.

Measurements measured and/or obtained by sensors/sensor interfaces 217 may be provided to control device 213. In some embodiments, Control device 213 may be the same as exemplary control device 114 depicted in FIGS. 1A-1G. Additionally, control device 213 may be configured to control power converter 203, and/or DC charging circuit 204, and/or AC charging circuit 205, and/or safety device(s) 216. Control device 213 may be or include an analog circuit, microprocessor, Digital Signal Processor (DSP), Application-Specific Integrated Circuit (ASIC) and/or a Field Programmable Gate Array (FPGA). In some embodiments, control device 213 may be implemented as multiple controllers. For example, control device 213 may include a first controller for controlling operation of power converter 203, and a second controller for controlling DC charging circuit 204 and/or AC charging circuit 205. Control device 213 may regulate (e.g., increase or decrease) power provided by a power source (e.g., power source 101), and regulate power provided to power converter 203 and/or EV 107 (e.g., via DC charging circuit 204 and/or AC charging circuit 205) and power provided to loads and/or provided to or drawn from a coupled power grid (e.g., loads 110 and power grid 111, respectively, of FIG. 1A).

Control device 213 may be configured to limit or increase power provided to EV 107, and/or power provided to or drawn from power grid 111 according to power available from power source 101. Control device 213 may be configured to calculate and/or provide (e.g., via communication device 215) real-time data (such as data indicating current power status information and/or historical power status statistics) to a user. Control device 213 may be communicatively coupled to a user interface and may receive commands from a user via the user interface to change an operational state. For example, a user may send a command (e.g., via communication device 215 and common interface 219) to control device 213 to reduce power provided to a power grid and increase power provided to an EV charging circuit.

In some embodiments, communication device 215 may be configured to communicate with a second communication device (not shown in the figure) which may be a part of EV 107. Information that may be transferred through this line of communication may pertain to one or more storage devices of EV 107, such as capacity of the storage device(s), how much energy is currently stored in the storage device(s), and/or recommended current and/or power for charging the storage device(s).

Input 240 may be coupled to DC power sources such as power source 101 and/or storage device 106 of FIG. 1A. Output 360 may be coupled to AC power sources such as power grid 111 and or storage devices that may be part of loads 110 of FIG. 1A. In some embodiments, IIEVC may receive AC power and output DC power. In such embodiments input 240 may reverse its role and serve as an output for IIEVC 202, and output 250 may reverse its role and serve as an input for IIEVC 202.

Control device 213 may be configured to increase power provided to EV 107 during certain times of the day. For example, control device 213 may be configured to increase power provided to EV 107 when power available from power source 101 is greater than a power input capacity of power converter 203. For example, power source 101 may be one or more PV systems that may include an installed power production capacity that is greater than a power processing capacity of power converter 203. In systems such as these, control device 213 may route excess power to EV 107 when power converter 203 is operating at full capacity.

Measurements measured and/or obtained by sensors/sensor interfaces 217 may be provided to a communication device 215. Communication device 215 may include a power-line communication (PLC) device, an acoustic communication device and/or a wireless communication device (e.g., a cellular modem, transceivers carrying out communications using Wi-Fi™, ZigBee™, Bluetooth™ and/or other wireless communication protocols). Communication device 215 may be in communication with one or more other communication devices, for example, e.g., various discrete and/or interconnected devices such as disconnect(s), PV cell(s)/array(s), inverter(s), micro inverter(s), PV power modules(s), safety device(s), meter(s), breaker(s), relay(s), AC main(s), junction box(es), camera etc.), network(s)/Intranet/Internet, computing devices, smart phone devices, tablet devices, camera, one or more servers which may include data bases and/or work stations.

Safety device(s) 216 may include one or more relay(s) configured to connect and disconnect power converter 203, DC charging circuit 204 and/or AC charging circuit 205 from input 240 and/or output 250. Safety device(s) 216 may include one or more Residual Current Detectors (RCD), Ground Fault Detector Interrupters (GFDI), fuse(s), breaker(s), safety switches(s) arc detector(s) and/or other types of safety circuitry that may protect one or more components of IIEVC 202, externally connected components and/or a human user. For example, safety device(s) 216 may protect both power converter 203 and DC charging circuit 204 from an overvoltage or overcurrent condition at input 240, thereby protecting a plurality of devices using a single safety device. As a second example, safety device(s) 216 may include a GFDI circuit disposed at output 250, protecting a user and/or installer of IIEVC 202 from a leakage current condition. As another example, safety device(s) 216 may include relays configured to disconnect IIEVC 202 from a coupled power grid (e.g., power grid 111 of FIG. 1A) in response to an islanding condition (e.g., in case of a grid outage) and allow power converter 203 to continue to provide power to AC charging circuit 205 without injecting power to a grid via output 250. The relays may be closed to enable power converter 203 to provide power to a grid via output 250, and/or to enable AC charging circuit 205 to receive power from a power grid via output 250. Where it may be desirable to enable AC charging circuit 205 to receive power from a power grid via output 250 while not injecting power to the power grid from power converter 203, power converter 203 may cease operating or reduce power converting (e.g., by not drawing substantial power via input 240).

Merger 218 may be coupled to DC charging circuit 204 and AC charging circuit 205, and may provide output 260. Merger 218 may selectively provide DC power from DC charging circuit 204 and/or AC power from AC charging circuit 205 to output 260. Output 260 may include one or more cables including one or more conductors, and may be configured (e.g., by use of a suitable plug) to be plugged into EV 107 for charging EV 107. Merger 218 may be controlled by control device 213. For example, merger 218 may include a plurality of switches controlled by control device 213 to selectively couple merger 218 to DC charging circuit 204, AC charging circuit 205, both DC charging circuit 204 and AC charging circuit 205, or neither DC charging circuit 204 nor AC charging circuit 205. In some embodiments, merger 218 may be a mechanical joiner, for example, a combined charging system connector (CCS connector).

Common interface 219 may link one or more of power converter 203, safety device(s) 216, sensors/sensor interfaces 217, DC charging circuit 204, control device 213, AC charging circuit 205, communication device 215 and merger 218. Data, information, communication and/or commands may be shared by the various components of IIEVC 202 over common interface 219.

Common interface 219 may include, for example data buses, wired communication interfaces or other methods or reliable sharing and communication of data and commands between integrated electrical circuitry.

Reference is now made to FIG. 2B, which illustrates one example of sharing of electronic components between an inverter and an EV-charging circuit, according to illustrative embodiments. Isolation tester 230 may be part and/or coupled to safety device(s) 216 of FIG. 2A and/or sensors/sensor interfaces 217 of FIG. 2A. Conductors 240a and 240b may transmit DC power to power converter 203 and DC charging circuit 204 of FIG. 2A. Isolation tester 230 may be coupled between one or more of conductors 240a and 240b, and may be coupled to ground terminal 231a, which may be the same as ground terminal 231b coupled to power converter 203. Isolation tester 230 may measure isolation between conductor 240a and ground terminal 231a, and/or may measure isolation between conductor 240b and ground terminal 231a. The isolation measurement may include, for example, injecting a current between conductor 240a (and/or conductor 240b) and ground terminal 231a and measuring a voltage caused by the injected current. The isolation measurement may include, for example, injecting an impedance between conductor 240a (and/or conductor 240b) and ground terminal 231a and measuring a voltage caused by the injected impedance. The result of the isolation measurement may provide an indication of whether the inputs to DC charging circuit 204 and power converter 203 (shown in FIG. 2A) are sufficiently isolated from ground. Additional examples of circuitry-sharing may include disposing a GFDI circuit between conductors 240a and 240b or between conductors 250a and 250b, or and/or disposing an isolation tester between conductors 250a and 250b.

By integrating an inverter (e.g., power converter 203) and EV-charging circuitry as a single device, additional advantages may include improve metering measurement. For example, a single revenue grade meter (RGM) may be used to measure power produced by power source 101, power provided to the power grid (e.g., power grid 111 of FIG. 1A) and/or power provided for charging an EV (e.g., EV 107). For example, a single RGM may measure power output by power converter 203 and power input to AC charging circuit 205, and calculate (e.g., by subtracting the power input to AC charging circuit 205 from the power output by power converter 203) the power provided to a power grid. As another example, a single RGM may measure power output by power converter 203 and power provided to power grid 111, and calculate (e.g., by subtracting the power provided to power grid 111 from the power output by power converter 203) the power provided for charging an EV.

Figure 3:
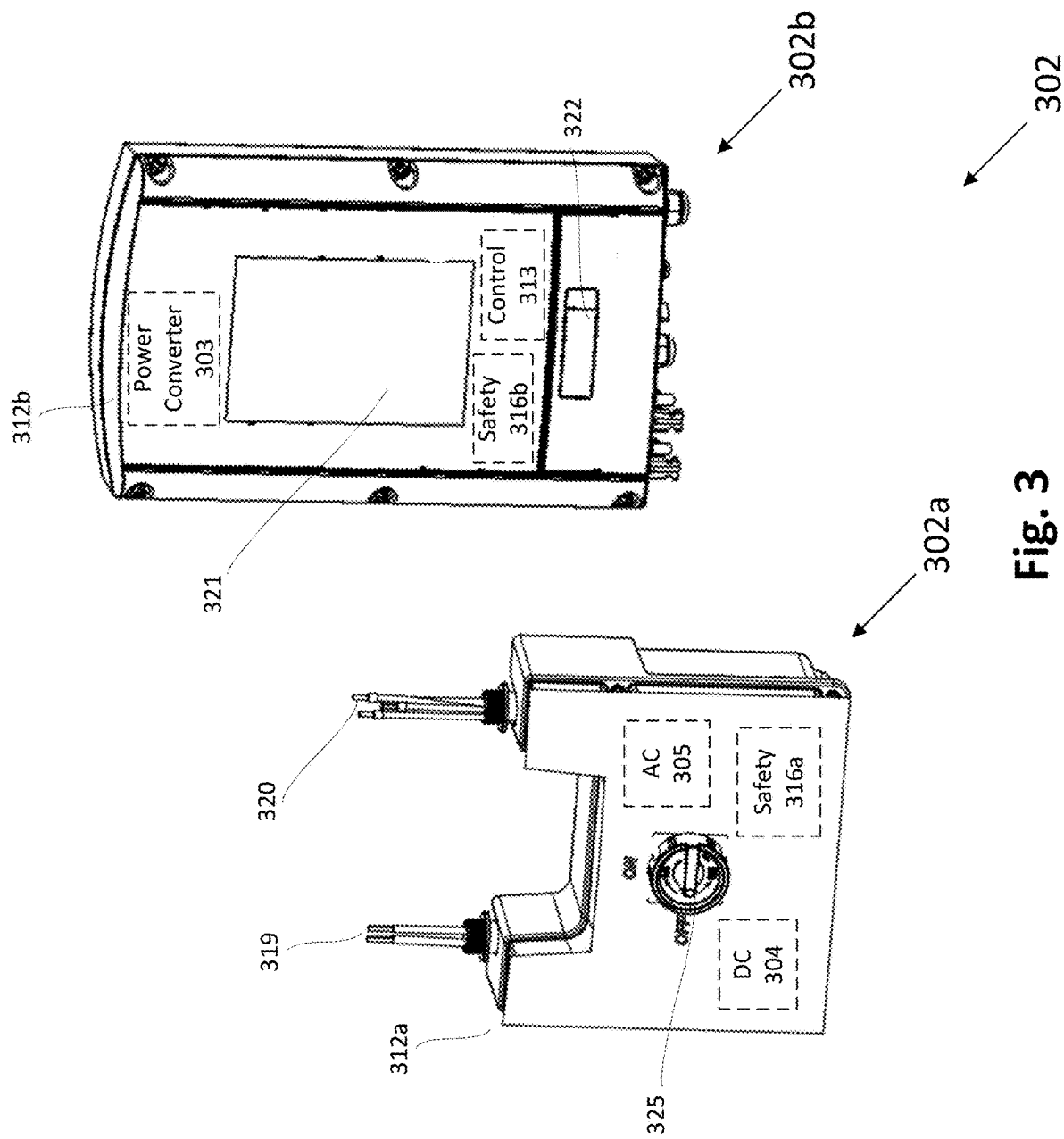
FIG. 3 is part schematic, part block-diagram depicting aspects of an integrated inverter-EV charger (IIEVC) according to illustrative embodiments.

Reference is now made to FIGS. 3A and 3A, which illustrates elements of an IIEVC according to illustrative embodiments. An IIEVC, which may be similar to or the same as IIEVC 102 of FIG. 1A and/or IIEVC 202 of FIG. 2A, may include enclosures 312a of FIGS. 3a and 312b of FIG. 3b, with each of enclosures 312a and 312b housing one or more device(s) and/or circuitry housed by IIEVC 202 of FIG. 2A. Enclosure 312b may house power converter 303, control device 313 and safety device(s) 316b. Power converter 303 may be similar to or the same as power converter 203 of FIG. 2A and power converter 103 of FIG. 1A. Safety device(s) 316b may be similar to or the same as safety device(s) 216 of FIG. 2A. Control device 313 may be similar to or the same as control device 213 of FIG. 2A. Enclosures 312a and 312b may further house sensors/sensor interfaces, communication devices and a common interface (not explicitly depicted) similar to or the same as sensors/sensor interfaces 217, communication device 215 and common interface 219, respectively, of FIG. 2A.

In some embodiments, enclosure 312a may further include display 321 and control panel 322. Control panel 322 may include, for example, mechanical buttons and/or touch-screen buttons. Control panel 322 may be communicatively connected to control device 313, enabling a user to affect the operation of devices and/or circuitry housed in enclosure 312a and/or enclosure 312b. Display 321 may display operational information regarding the devices and/or circuitry in enclosure 312a and/or enclosure 312b. In some embodiments, control panel 322 may be combined with display 321 (e.g., by having display 321 feature touch-screen button controls). In some embodiments, display 321 and/or 322 might not be featured, with monitoring and control functionality provided, for example, by an external monitor and/or computer, or a mobile app communicatively coupled to a communication device housed in enclosure 312a or 312b. Power converter 303 may provide Maximum Power Point Tracking (MPPT) functionality to draw increased power from coupled renewable power sources (e.g., PV generators). In some embodiments, power converter 303 may be communicatively and/or electrically coupled to additional power modules (e.g., DC/DC converters) configured to provide MPPT functionality at a more granular (e.g., per PV-generator) level.

EV charger 302a may include enclosure 312a and associated (e.g., housed) circuitry, and inverter 302b may include enclosure 312b and associated (e.g., housed) circuitry. Enclosures 312a and 312b may be mechanically connectable, and the electrical devices and circuitry housed by enclosures 312a and 312b may be electrically connectable (e.g., by providing suitable connectors and/or receptacles). In the illustrative embodiment of FIG. 3, enclosure 312a may house safety device(s) 316a, DC charging circuit 304, and AC charging circuit 305. DC charging circuit 304 may be similar to or the same as DC charging circuit 104 of FIG. 1A. AC charging circuit 305 may be similar to or the same as AC charging circuit 105 of FIG. 1A. Safety device(s) 316a may be similar to or the same as safety device(s) 216 of FIG. 2A. Safety device(s) 316a may be controlled via an ON/OFF switch 325, which may be configured to disconnect power from power converter 303 when switched to the OFF position. Conductors 319 may be designed to carry DC power, and conductors 320 may be designed to carry AC power. Conductors 319 may receive power from a DC power source and provide power to DC charging circuit 304 and/or to power converter 303. Conductors 320 may receive power from power converter 303 and/or a power grid (e.g., power grid 111 of FIG. 1A), and provide power to AC charging circuit 305 and/or to a power grid (e.g., power grid 111 of FIG. 1A).

Providing two separate enclosures may, in some scenarios, reduce costs associated with installing an integrated renewable power—Electric Vehicle system. For example, power converter 303 may be a DC to AC inverter, and a consumer may install inverter 302b (i.e. enclosure 312b and associated devices and circuitry) as a standalone PV inverter device. Control device 313 may be configured (e.g., programmed in hardware, firmware and/or software) to control both power converter 303, which may be part of inverter 302b, and EV-charging circuits, which may not be part of inverter 302b. When deployed in a system not having EV charging circuits, the EV charging functionality programmed into control device 313 may not be utilized. If the consumer later purchases an electrical vehicle, the consumer may then install EV charger 302a (i.e. enclosure 312a and associated circuitry) as a retrofit device to be connected to inverter 302b. Circuitry and/or devices already included in inverter 302b may be utilized to provide control, communication and/or safety functionality to circuitry and/or devices associated with EV charger 302a, which may reduce the cost of EV charger 302a. For example, inverter 302b might not require a control device or communication device, which may reduce the cost of EV charger 302a compared to traditional EV chargers.

In some embodiments, inverter 302b and EV charger 302a may be pre-connected (e.g., by connecting enclosures 312a and 312b and coupling associated circuitry housed in enclosures 312a and 312b, during manufacturing) and sold as a single unit. In some embodiments, enclosure 312b may house DC charging circuit 304, AC charging circuit 305 and/or safety device(s) 316a, and enclosure 312a may not be used. The resulting apparatus may be a fully-functional IIEVC (e.g., similar to or the same as IIEVC 102 of FIG. 1A and IIEVC 202 of FIG. 2A), which may be provided for installing an integrated renewable power—Electric Vehicle system at one time.

Power converter 303 may be designed to converter power from a variety of power sources. In some embodiments, the power converter 303 may be configured to convert DC photovoltaic voltage and/or power received from PV generators (e.g., one or more PV cells, PV cell substrings, PV cell strings, PV panels, strings of PV panels, PV shingles and/or PV roof tiles). In some embodiments, power converter 303 may convert power received from one or more fuel cells, batteries, wind turbines, flywheels or other power sources. In some embodiments, power converter 303 may receive an AC voltage and/or power input, and may include a rectifier circuit to convert the AC voltage to a DC voltage, with an inverter circuit configured to convert the DC voltage to an AC output voltage.

Figure 4A:
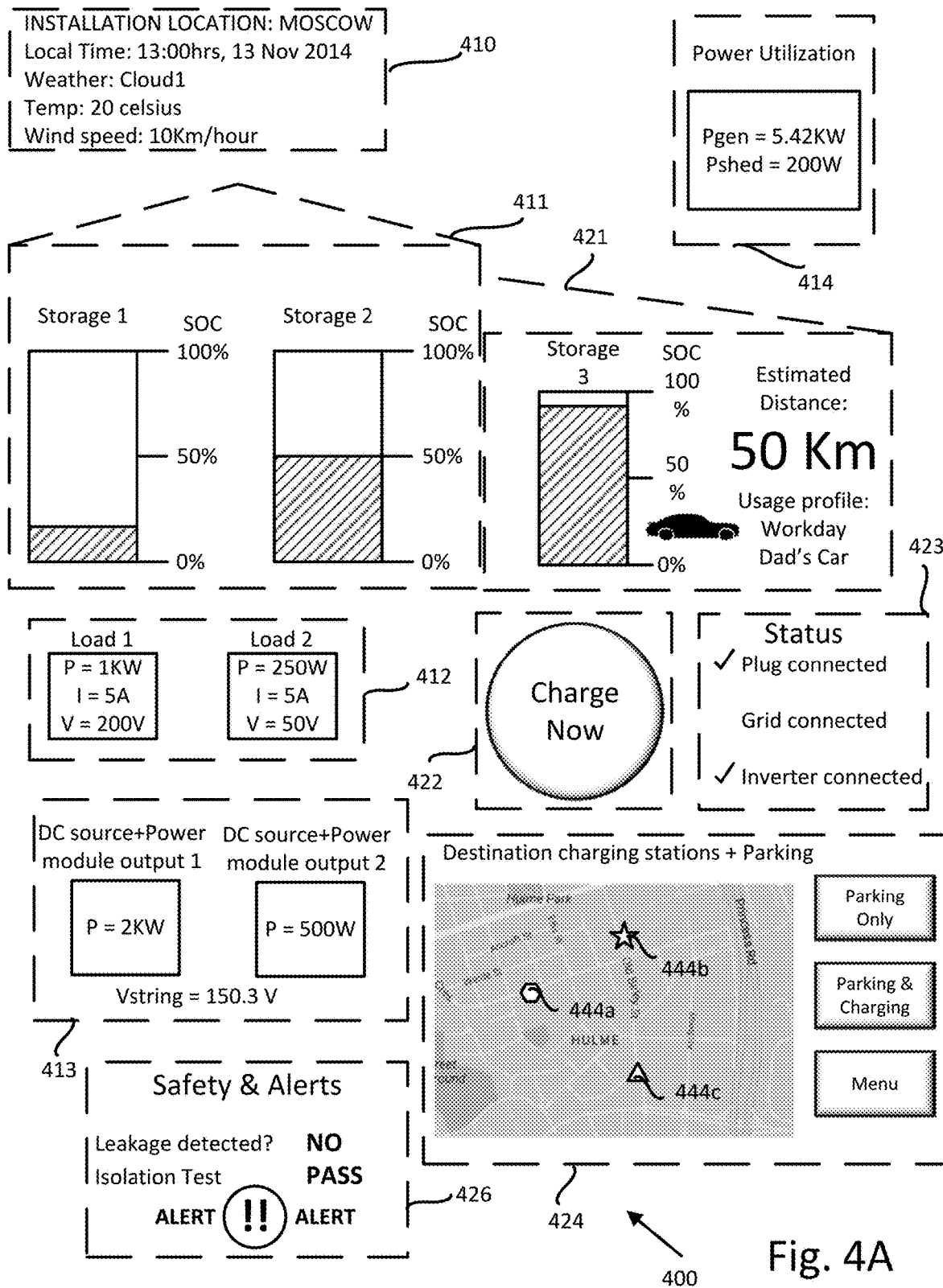
FIG. 4A is an illustrative mockup of a graphical user interface for an electrical system including an IIEVC according to illustrative embodiments.

Reference is now made to FIG. 4A, which shows a graphical user interface (GUI) 400, according to one or more illustrative embodiments. In the description that follows, a touch screen is referenced by way of example, but other screens such as computer monitors, laptop screens or smart phone screens may be used where items may be selected for example by mouse and/or pointer. The touch screen may be operatively mounted to an external surface of the housing of IIEVC 102. The touch screen may be mounted similarly to or the same as screen 321 as shown for example in FIG. 3 so as to be visible to and/or operable by a user. The touch screen may be coupled to one or more processor units configured to control the GUI and/or carry out computational and decision-making functionalities as described below. In the preceding drawings, IIEVC 102 is shown connected to a power system and EV 107 that may include one or more electric vehicles.

IIEVC 102 may be located for example in a garage used to house EV 107 of the user. IIEVC 102 as described above may provide a combined, integrated control and a delivery of power harvested from a power system to a number of loads and/or to EV 107. GUI 400, as well as displaying information to the user, may also allow the user to configure the delivery of power harvested from a power system to a number of loads and/or to EV 107. The access to the user may additionally be provided via a Bluetooth™ or other wireless connections between a smart phone and IIEVC 102, via an internet connection between a remote network and IIEVC 102 or a network local to IIEVC 102. The power system may include, for example, sources of direct current (DC) such as photovoltaic panels, DC from a localized generator each one of which may be connected to an associated power module (e.g., a DC/DC converter). The DC sources and/or associated power modules may be connected in various series-parallel, parallel series combinations. The various series-parallel, parallel series combinations may be attached to IIEVC 102 for example.

GUI 400 may provide two areas of display and control. A first area of display and control may be for the power system which may be connected to a number of loads, an AC utility grid and/or localized grid which may be AC, DC or a combination of AC and DC. The second area of display and control may be with respect to EV 107.

The first area of display and control may include areas 410, 411, 412, 413, and 414, which may be included on one graphical screen or be displayed on different graphical screens (e.g., depending on the screen size available). Similarly, the second area of display and control may include areas 421, 422, and 424, which may be included on one graphical screen or be displayed on different graphical screens.

In GUI 400, text area 410 may give a user information as to the location of the power system, the local time and date, an indication as to the weather conditions at the location, temperature at the location and the wind speed at the location of the power system. Text area 410 may also serve overall as an icon that when touched or swiped by the user using a touch screen device such as a smart phone, allows a sub menu to appear. For example, the sub menu may allow the user to view another DC power system located elsewhere to be monitored by the user. Alternatively or additionally, the sub menu may allow the user to connect and utilize a second DC power system that may be connected to and/or local to IIEVC 102. Alternatively or additionally, the sub menu may allow the user to connect to a third DC power system that may be the storage of EV 107 to provide the role of an emergency supply of DC power to the power system.

GUI 400 may include a stage of charge (SOC) area 411 and area 421 that shows the SOC percentage (%) of one or more storage devices (which may be similar to storage device 106 of FIG. 1 and/or a storage device that may be a part of loads 110) and one or more storage devices of EV 107 (which may include one or more electric vehicles), respectively. The SOC percentage (%) of the two storage devices and EV 107 is shown by respective cross hatchings. Each of the SOC percentage (%) of the two storage devices and EV 107 displayed may also serve overall as separate icons, that, when touched or swiped by the user, show further detail about a particular storage device. Using the example of a battery for a storage device, the further details may include information of battery type, rating in terms of voltage, current and ampere hours (Ah), location of the battery, the number of times the battery has been charged/discharged, the projected battery life of a battery based on its usage. The further details may also provide a remote means for a configuration and a control of the two storage devices and EV 107 via power modules coupled to IIEVC 102. The configuration may include, for example, the option to disconnect and/or not use a particular battery, the option to designate a battery to have greater priority over the other batteries to be charged first, to schedule a battery for replacement based on its current usage, the option to change parameters of a charge profile for a battery and/or to allow an upload and/or update of a charge profile for a battery.

Area 421, additionally, may show the user an estimated travelling distance (50 Km) based on the state of charge of the storage of EV 107. A wireless connection between the computer of an EV 107 and IIEVC 102 may allow display of which user ("Dad", for example) and which EV 107 is located in the vicinity of IIEVC 102 and/or may be connected to IIEVC 102. Related area 423 may indicate a status to the user if a power cable connected to IIEVC 102 and if a plug connected to the other end of the power cable is plugged into EV 107. The status shown by area 423 may additionally include an indication to the user if the charging of the storage of EV 107 is from power supplied from a utility grid (AC) or power from IIEVC 102 which may be DC power, AC power or both AC and DC power. Area 422 may provide an icon that may allow the user to charge the storage of EV 107 as soon as possible by being a certain color (green for example). The icon in area 422 may be a different color (red for example) or have some other superimposed graphic on it that may prevent the user from charging the storage of EV 107 right away. An icon in area 422 may allow stopping of the charging of the storage of EV 107 or to utilize time periods corresponding to the cheapest power available to the charge the storage of EV 107 via a "Smart charge" option. An icon in area 422 may allow a user to define a minimum PV production threshold for charging an EV. For example, a user may specify that an EV will begin charging only when PV production (e.g., power produced by power source 101) exceeds, for example, 5 kW.

The passing of data to IIEVC 102 of which user (Dad for example) and which EV 107 is near IIEVC 102 may establish activation and indication of a usage profile for IIEVC 102. The passing of data may include the monitored state of charge (SOC) by the computer of EV 107 and actual distance and route travelled by the user. Based on the time and date as displayed in area 410, it may be established that this may be a working day for the user. Additionally, a connection to a calendar of the user on their smart phone or some other remote internet connected calendar synchronized with the calendar of the user on their smart phone may establish that the user is on holiday this day or has a meeting in another location on this day. As such, a charge profile may be established for EV 107 which may consider a range of parameters, various priorities and present status of the power system as discussed below.

The charge profile may include a "start charge" and "charge before a certain time" criteria for the storage of EV 107. The charge profile may also consider how power is currently being utilized by the power system as shown in areas 411, 414, 412 and 413. Consideration of power utilization may consider the possibility of supplying more power to the storage of EV 107. Fixed, changeable and updateable priorities assigned to each load which may also include the storage of EV 107 may be based on, for example, an updatable load demand history of the power system with reference to daily or nightly demand, weekday demand, and monthly demand. The load demand history may be compared with a present load demand such that more loads may be supplied by power and/or more power may be utilized in charging storage devices. The storage devices may also include the storage of EV 107. Alternatively, if the current load demand is higher, power to loads may be supplemented by the discharge of some of the storage devices. The load demand history may further take into consideration current weather conditions, temperature or the amount of daylight time remaining.

The charge profile may also include financial consideration. For example, it may be preferable to allow supply of AC power from power generated by the power system to be sold to the grid and to defer charge of the storage of EV 107 until a point in time when supply of power to charge the storage of EV 107 may be free or cheaper.

In all of the discussions above the charge profile may include the option to configure the charge profile by the user by use of GUI 400.

In some embodiments, the load demand history may be viewable via GUI 400. In some embodiments, a control device controlling IIEVC 102 (e.g., control device 213 of FIG. 2A or control device 313 of FIG. 3) may be programmed to automatically control operational characteristics of IIEVC 102, for example, power flowing to or from a power grid (e.g., power grid 111), power flowing to or from EV 107, power flowing to or from storage device 106, power flowing to or from storage device 109 and/or power flowing to or from power converter 103. The control device controlling IIEVC 102 may provide current operational characteristics (e.g., via communication device 215 of FIG. 2A) to be displayed by GUI 400.

In the discussion that follows, reference to loads is made which also may include the consideration that storage device 109 of EV 107 when being charged may function as a load. Reference to "load" and "loads" in the following also may also include storage device 109 of EV 107. GUI 400 may include a load utilization area 412 that shows two loads and may indicate to a user the amount of power, voltage, and current, that a load is presently consuming. Each of the two loads displayed may also be displayed as separate icons that when touched or swiped by the user, may show further detail about a particular load. The detail about a load may include, for example, a load profile for a particular load. The load profile may also include updated information regarding an updatable load demand history of the power system with reference to daily and nightly demand, weekday demand, and monthly demand. The load profile may be updated and/or be configurable via load utilization area 412 and/or areas 421, 423 and 422, in order to control power delivery to loads. Options may be provided to possibly disconnect a load or to change the voltage and/or currents supplied to the load by providing access and control of the power modules that may be attached to respective loads.

GUI 400 may further include DC generation area 413, which may show two power outputs from power sources (similar to power source 101 of FIG. 1A) connected to power modules. If the outputs of power modules are connected in series to form a string, the voltage of the string (Vstring) may be displayed also in DC generation area 413. Each of the two power values displayed may also be displayed as separate icons that, when touched or swiped by the user, show further details about a particular power source such as power source 101 of FIG. 1, and respective power modules. The further details may, for example, include the voltages and currents sensed by a sensor unit that may be measuring voltages and/or currents on inputs and outputs of power modules, for example. Based on the further details, a user may be given the option to remotely switch off and/or bypass a particular power module output. Related to DC generation area 413 is power utilization area 414, which indicates the total power (Pgen) currently being generated and the amount of power currently being shed (Pshed) by one or more power sources coupled to IIEVC 102. Power may be shed since loads (e.g., loads 110 of FIG. 1A) and storage devices (e.g., storage devices 106 and 109 of FIG. 1A) might not need all of the power currently being produced.

GUI 400 may further include a graphical display area 424 to display useful graphs or a map to the user. Graphical display area 424 may also serve as an icon which, when touched or swiped by the user, allows the user to select from different sub menus, each providing different graphical displays of different parameters of a power system, such as voltage, current or power or the topographical layout of power sources in the power system. The menu icon may also provide additional features required by the user.

Area 424 shows by way of example a map that includes locations 444a, 444b and 444c which may be useful to the user of EV 107. The locations may be indicative of a planned route and driving destination for a particular day. Locations 444a, 444b and 444c may be marked with different shaped icons that may indicate parking without charging facilities or parking with charging facilities. Swiping on the locations may enable the option to book a parking place that includes charging facilities. The booking of a parking place may cause a link to a map to be sent to the mobile phone of the user, and/or the map may provide GPS data to assist the user to get to the parking place. Booking of a parking place having charging facilities may further include data transfer to the car park which indicates the storage device type, estimated time of arrival and departure, state of charge of the storage device 109 of EV 107 in order to provide the best charge profile for the storage of EV 107.

GUI 400 may further include a safety and alert area 426, which includes indications to a user of a current or leakage voltage. A swipe of area 426 may indicate further the location of the current or leakage voltage. Area 426 may indicate failure to trip of a residual current device (RCD) possible in view of the level of the current or leakage voltage monitored. An ongoing continuous test of insulation resistance of the power system cabling and components may also be indicated by a PASS or a FAIL indication to the user. A visible and audible warning to the user may be given by safety and alert area 426. The alerts mentioned above and further alerts may further be conveyed using an e-mail or text message to the user and/or to a company that may provide monitoring and maintenance to the power system.

The remote configurations described for GUI 400 which include the supply and control of powers to the storage devices and/or power from storage devices to loads may be predefined or provided dynamically via GUI 400. The supply and control of powers to loads and storage devices and/or power from storage devices to loads may be provided dynamically and/or statically predefined, according to the priorities described in further detail with respect to the descriptions above.

Figure 4B:
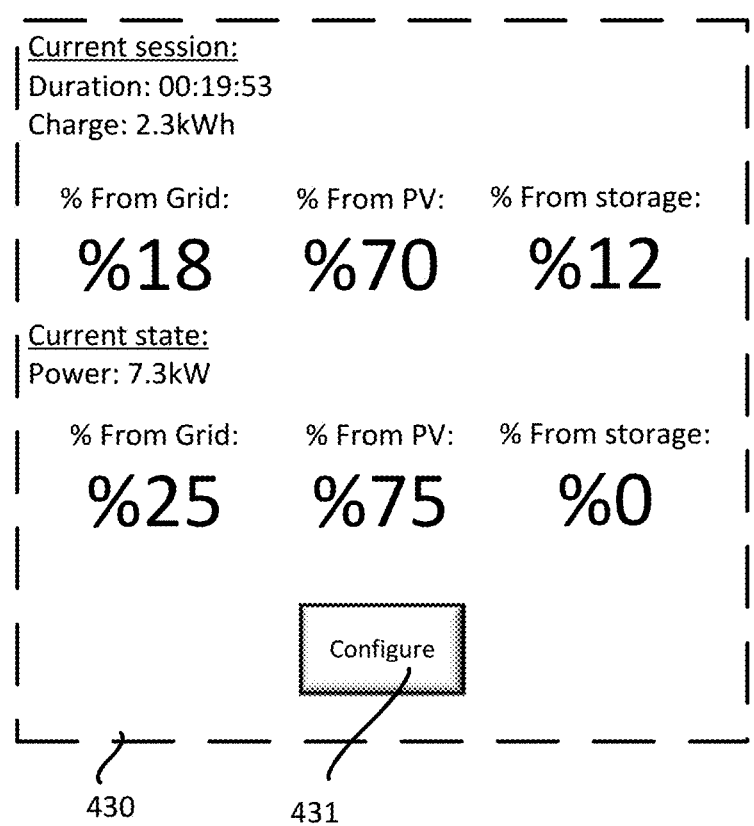
FIG. 4B is an illustrative mockup of elements of a graphical user interface for an electrical system including an IIEVC according to illustrative embodiments.

Reference is now made to FIG. 4B, which illustrates an additional feature that may be included in GUI 400. Area 430 may indicate current session data and/or current state data. The data may be presented graphically, numerically or in other visually indicative manners. Area 430 may indicate the duration of the current charging session of EV 107, and the amount of energy stored on storage device 109 during the current session. Area 430 may further indicate sources of the energy stored and indicate what proportion of the energy came from which source. For example, area 430 may indicate a percentage of the storage charge which was drawn from a power grid, a percentage of the storage charge which was drawn a renewable power source (e.g., a PV generator or PV system), and a percentage of the storage charge which was drawn from one or more storage devices. In some embodiments, a percentage may be negative, e.g. indicating that the EV may have provided energy to a power grid or storage device.

Area 430 may further indicate real-time charging information. For example, area 430 may indicate the current charging rate of an EV storage device, and may indicate a percentage of the current charging rate that is provided from a variety of power sources. Area 430 may provide button 431, which may be pressed or swiped to view an additional window or menu allowing a user to increase or decrease a proportion of power drawn from one or more power source, or increase or decrease a charging rate.

Figure 5:
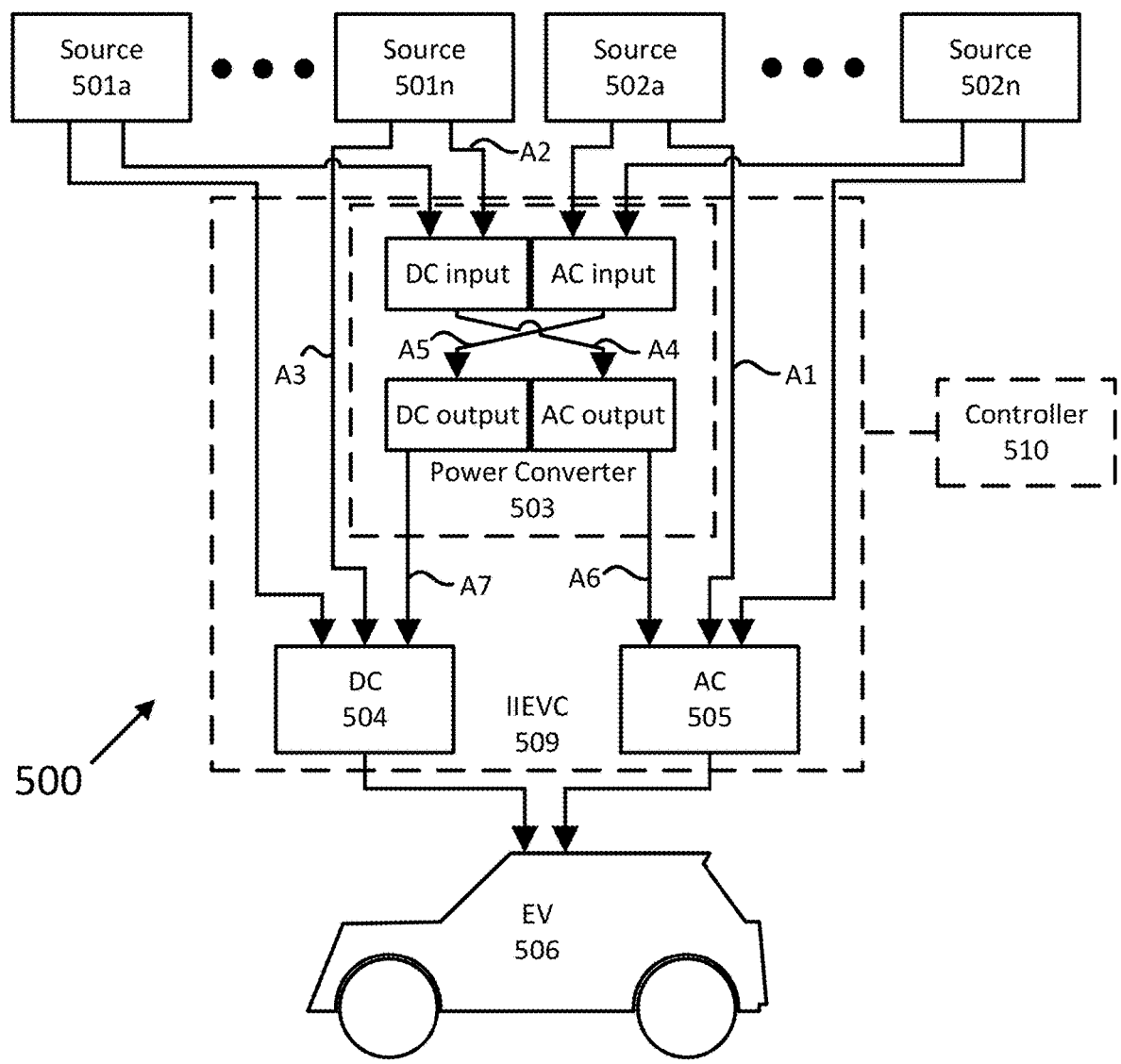
FIG. 5 illustrates power flow in a power system according to illustrative embodiments.

Reference is now made to FIG. 5, which illustrates a sytem diagram 500 of power flow in a power system according to illustrative embodiments. System diagram 500 illustrates a flow of power from power sources 501a . . . 501n and 502a . . . 502n to EV 506. EV 506 may be similar to EV 107 of FIG. 1A. Power sources 501a . . . 501n and 502a . . . 502n may be similar to one or more of power source 101, power grid 111 and storage device 106, of FIG. 1A. System diagram 500 may include blocks that represent different electrical components in the power system, such as power sources 501a . . . 501n and 502a . . . 502n, power converter 503, controller 510, DC charging circuit 504 and AC charging circuit 505. Power converter 503, controller 510, DC charging circuit 504 and AC charging circuit 505 may be included in IIEVC 509. Supply of power to EV 506 may be from either DC charging circuit 504 or AC charging circuit 505. Multiple paths of power flow between power sources 501a . . . 501n and 502a . . . 502n and the componets of IIEVC 509 are indicated by solid line with arrow head which indicates a direction of a potential path of power flow. In general controller 510 or another controller may run an algoritm which determines which paths and combinations of paths are utilized to provide power to EV 506. The selection of the paths may be by use of multiple selector units (not shown) which may include multiple switches and/or relays (not shown) which when selected by the selector units allow multiple connection paths (paths A1-A7 for example) to enable the supply of power from power sources to storages and/or loads.

By way of non-limiting example a potential supply of power between power source 501n and the input of DC charging circuit 504 is indicated by path A3. Power source 501n may also supply power to a DC input of power converter 503 which is indicated by path A2. Power source 502a may also supply power to an input AC charging circuit 505 which is indicated by path A1. Within power converter 503 a cross-over connection indicated by paths A4 and A5 such that respectively, a DC input of power converter 503 may be converted to an AC output on path A6 and an AC input of power converter 503 may be converted to an DC output on path A7. Further, the cross-over connection may be configurable such that a DC input of power converter 503 may be converted to another level of DC output on path A7 and/or an AC input of power converter 503 may be converted to another AC output on path A6 in terms of different voltage and, current levels, phase angle, frequency and/or to provide power factor correction (PFC) for example. AC to AC conversion may be achieved using a transformer which may also provide galvanic isolation between the input of power converter 503 and the output of power converter 503. In general a path of power flow may start at a power source which may end at EV 107, and may include elements (e.g., paths and blocks) connected consecutively and/or in parallel. In a more general illustration, paths of power flow may end at any load (such as loads 110 and/or storage device 106 of FIG. 1A). In general controller 510 or another controller may run an algoritm which determines which paths and combinations of paths are utilized to provide power to EV 506. Which paths, combinations of paths utilized to provide power to EV 506 may be responsive to costs aassocaited with the cost of supply in each path, required power levels in terms of voltages and curents potentially available in each path and/or current charge levels of storage devices such as storage devices 106/109 and other charge storage devices described below.

The blocks shown in FIG. 5 may be part of a bigger power system similar to power system 100 of FIG. 1. Each source of sources 501a . . . 501n and 502a . . . 502n may provide power to various loads in the power system (not shown in FIG. 5). Each element in a path of power flow may have a capacity of power that may flow through it. In some embodiments, one or more paths may have a cost associated with each path of the one or more paths. The capacity of an element may be determined according to the physical properties of the physical element it symbolizes, such as the maximum rated electrical parameter (e.g., current, voltage, power and/or energy) of an electrical component (e.g., a wire, a switch circuit, a connector, a storage device, a circuit breaker, and/or a power converter). For example, a circuit breaker, which may be coupled to source 502*a* and may be rated for a maximum current (e.g., 40A), may limit the capacity of charging paths outgoing from source 502*a* to a limit according to EV regulations that may require for example a 20% margin (e.g., 32A).

The cost of using a path may be determined according to various parameters or estimation of parameters, such as grid tariff, wear rate costs and/or efficiency of the physical path. In some embodiments, a DC only path or an AC only path may be favorable. A path of power from the plurality of sources to EV 107 may be determined using different methods that attempt to increase the amount of power flowing to EV 506. Power provided by the sources, the capacities and the costs may be time varying, and may change according to different electrical measurements such as voltage, current, power and/or temperature. For example the cost of path A1, the path coupling source 502*a* and AC charging circuit 505 may increase when the cost rate of power provided by source 502*a* increases. In another example, power source 501*n* may be similar to storage device 106 of FIG. 6, the cost of paths A2 and A3, the paths outgoing from power source 501*n*, may be increased and/or the capacity of paths outgoing from power source 501*n* may be decreased when the controller predicts a need to save power in power source 501*n*.

The total cost of charging EV 506 may be the sum of costs of paths used for charging EV 506. A controller may attempt to increase the utilization of the capacities of the paths and/or decrease the total cost of the flow of power by redirecting and distributing power between the different available paths and by controlling the amount of power drawn from power sources 501*a* . . . 501*n* and 502*a* . . . 502*n*. The controller may consider user preferences (such as the time to fully charge EV 506) and other storage device constraints (such as minimum charge in a storage device) when adjusting the utilization and/or cost.

In some embodiments, properties of an electrical device may affect the wear of the electrical device. For example, a storage device may have preferred charging and discharging rates in order to prolong its life. Some storage devices may have an expected limited amount of charge cycles. For some of these storage devices it may be preferable to discharge all or most of the energy stored in the storage devices before recharging. Other storage devices may have a preferable rate of charging and discharging power in order to prolong their life. Deviating from this rate may reduce health and increase wear on the storage device. In some embodiments the wear and/or health of the storage device may be estimated by measuring one or more electrical parameter such as voltage, current and/or power. In some embodiments the storage device may include a communication device or a data storage device including information about the wear, health and/or charge of the storage device, and/or the preferable charge and discharge rates.

In some embodiments a user may manually change the preferences of the controller. For example, if the user expects that at a defined time he/she may need to disconnect EV 506 for a trip (e.g., driving to work), the user may change the preferences of the controller such that at the defined time a storage device that may be a part of EV 506 may be about full or may have enough energy for the expected trip. This preference may be favorable over all other preferences such as saving costs and wear.

Still referring to FIG. 5, power sources 501*a* . . . 501*n* may be coupled to the DC input of power converter 503 and/or to DC charging circuit 504. Power sources 502*a* . . . 502*n* may be coupled to the AC input of power converter 503, and/or to AC charging circuit 505. The DC input of power converter 503 may be coupled to the AC output of power converter 503. The AC input of power converter 503 may be coupled to the DC output of power converter 503. The DC output of power converter 503 may be coupled to DC charging circuit 504. The AC output of power converter 503 may be coupled to AC charging circuit 505. Controller 510 may control the power through each element of HEVC 509. Controller 510 may be similar to control device 213 of FIG. 2.

Figure 6A:
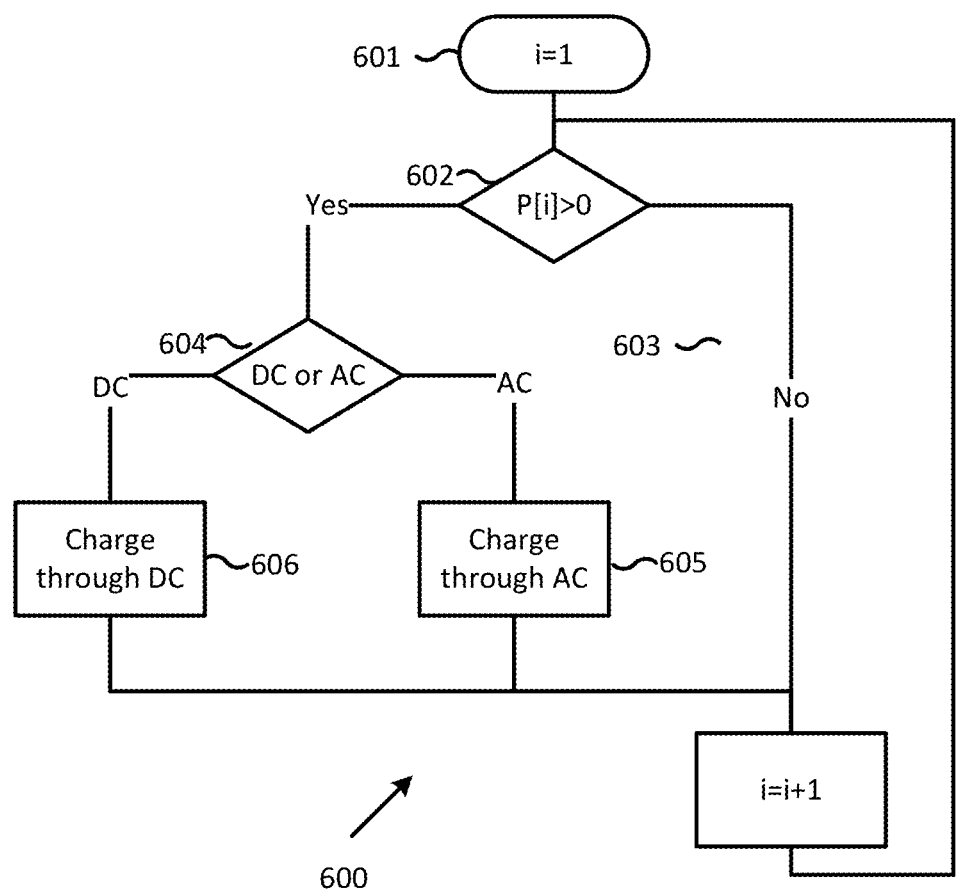
FIG. 6A is a flow chart illustrating an exemplary method for controlling charging of an EV in an electrical system according to illustrative embodiments.

Reference is now made to FIG. 6A which illustrates a method 600 for controlling charging of an EV in an electrical system according to illustrative embodiments. The electrical system may be similar to power system 100 of FIG. 1A. Method 600 may be implemented by a controller. In some embodiments, method 600 may be carried out by multiple controllers that may communicate with at least one other controller of the other controllers. The controller and/or controllers may be a part of control device 213 of FIG. 2*a*. The controller may wait until EV 107 is coupled to power system 100 before starting method 600. When EV 107 is disconnected the controller may control power converter 103 of FIG. 1A according to various parameters of the system, such as the amount of power generated by the power sources, the amount of energy desired to be stored in storage device 106, the cost of power from each power source and/or the power demand of loads 110.

At step 601 the controller initializes a power source counter to one and advances to step 602. At step 602 the controller determines if the first power source is able to provide power. If the first power source cannot provide power, the controller increments the counter by 1 at step 603, and returns to step 602 to check if the second power source is able to provide power. This process may repeat until there is a power source that is able to provide power. If there are no more power sources, then incrementing the power source counter by 1 may set it back to one.

Assuming the counter reached the ith power source, and the ith power source is able to provide power, the controller advances to step 604. At step 604, the controller may check what path is preferable for the ith power source. For example, the controller may determine whether a path through the AC charging circuit 105 or a path through the DC charging circuit 105 is preferred. To determine the preferred path, the controller may access a look-up table that may be programmed manually by a user or an installer, or computed automatically according to the state of the power system. For example, if the system has only one power converter, and the power converter is already in use by a different device, then the controller may avoid considering a path that includes the power converter. In another example, the controller may avoid a path including the AC charging circuit because the path through the AC charging circuit is close to the maximum current and/or power it may be capable to transfer. In a third example, it may avoid a path through one of the charging circuits because the EV is not coupled to the charging circuit, or it is coupled but the connection and/or charging circuit may be unsafe for charging.

If, at step 604, the controller chooses the path through the AC charging circuit 105, then the controller proceeds to step 605. At step 605, the controller may redirect some of the power provided by the ith power source to the EV through the AC charging circuit 105. If, at step 604, the controller chooses the path through the DC charging circuit 104, then the controller proceeds to step 606. At step 606 the controller may redirect some of the power provided by the 4th power source to the EV through the DC charging circuit 104. The controller may redirect some but not all of the power provided by the ith power source corresponding to the state of the power system. For example, if the selected path does not have enough capacity for all the power provided by the ith power source, the controller may redirect a portion of the power which may correspond to the difference between the current efficiency and the maximum efficiency.

Figure 6B:
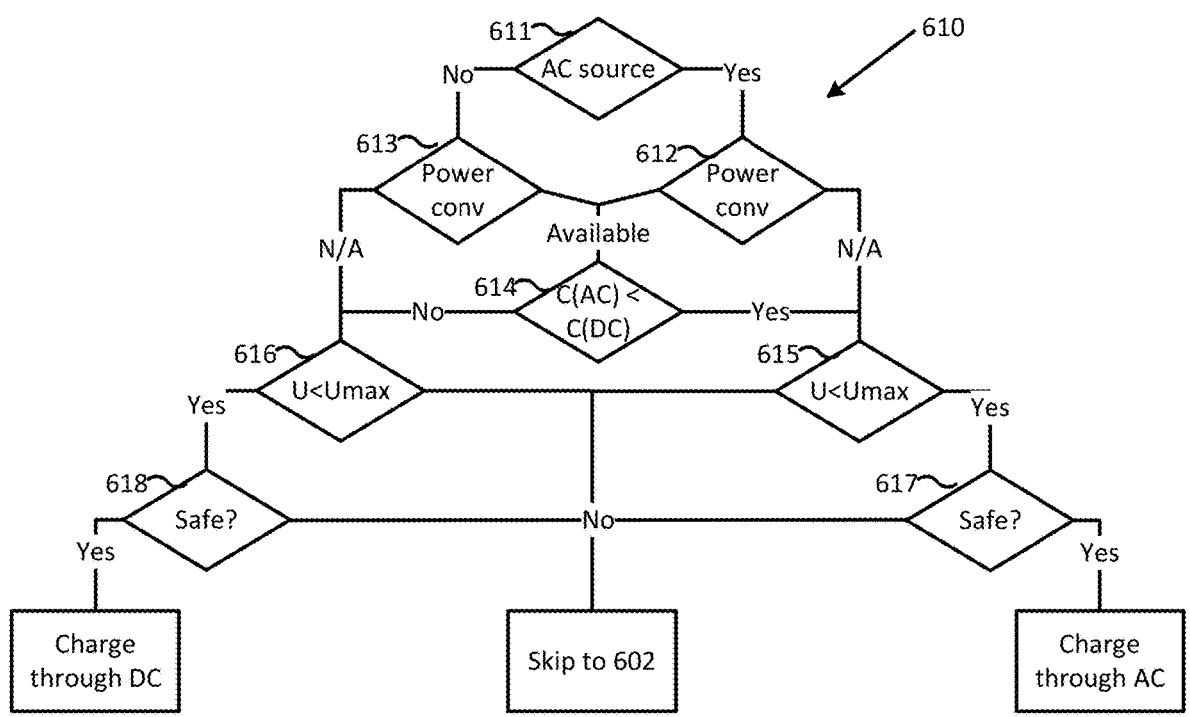
FIG. 6B illustrates a method for controlling charging of an EV in an electrical system according to illustrative embodiments.

Reference is now made to FIG. 6B, which illustrates a method 610 for controlling charging of an EV in an electrical system according to illustrative embodiments. Method 610 may be an example of an implementation of step 604 of FIG. 6A. At step 611, the controller may determine if the ith power source is an AC power source. If the ith power source is an AC power source, the controller may proceed to step 612. At step 612, the controller may determine if the power converter is available for converting power from AC to DC. If the power converter is available, the controller may advance to step 614. If at step 611 the power source is not AC source, then the controller may proceed to step 613 to determine if the power converter is available for converting power from DC to AC. If the power converter is available, then the controller may advance to step 614.

At step 614, the controller may determine which path is preferable. If the path through AC charging circuit 105 is preferable, then the controller advances to step 615. In some embodiments, a DC only path or an AC only path may be favorable. At step 615, the controller may determine if the utilization of the path through AC charging circuit 105 is lower than the maximum utilization of the path through AC charging circuit 105. If the utilization of the path through AC charging circuit 105 is lower than the maximum utilization, then the controller may continue to step 617. If the utilization is already at the maximum utilization or close to the maximum utilization, the controller may skip to step 602.

At step 617 the controller may determine if the connection is safe. A safe and/or unsafe connection may be detected by a safety device similar to safety device(s) 216 of FIG. 2. If the connection is safe, the controller may continue to step 605. If the connection is unsafe, the controller may skip to step 602. At step 613, if the power converter is not available, the controller may continue to step 616. At step 614, if the path through the DC charging circuit 104 has a lower cost, then the controller may advance to step 616. At step 616 the controller may determine if the utilization of the path through the DC charging circuit 104 is lower than the maximum utilization of the path through DC charging circuit 104. If the utilization of the path through the DC charging circuit 104 is lower than the maximum utilization of the path through DC charging circuit 104, then the controller may continue to step 618. If the utilization of the path through the DC charging circuit 104 is already at the maximum utilization of the path through the DC charging circuit 104 or close to the maximum utilization of the path through the DC charging circuit 104, the controller may skip to step 602. At step 618 the controller may determine if the connection is safe. If the connection is safe, the controller may continue to step 606. If the connection is unsafe, the controller may skip to step 602.

Figure 7:
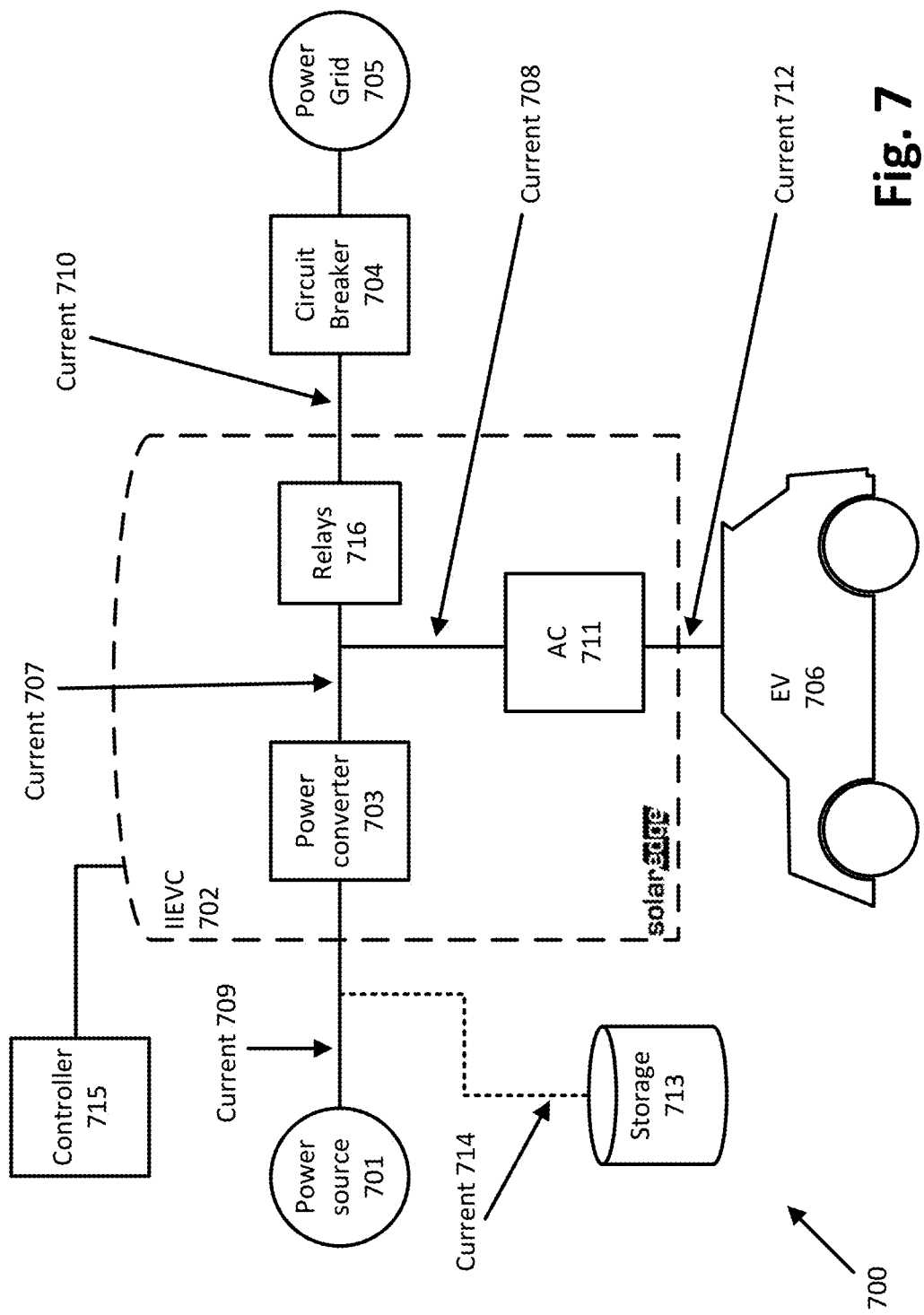
FIG. 7 illustrates a block diagram of a power system configuration according to according to illustrative embodiments.

Reference is now made to FIG. 7 which illustrates a block diagram of a power system configuration according to according to illustrative embodiments. Power system 700 may include power source 701 which may be similar to power source 101 of FIG. 1A, IIEVC 702 which may be similar to IIEVC 102 of FIG. 1A, power converter 703 which may be similar to power converter 103 of FIG. 1A, circuit breaker 704 which may be a part of an electric panel similar to electric panel 113 of FIG. 1A, relays 716, power grid 705 which may be similar to power grid 111 of FIG. 1A, controller 715 which may be similar to controller 114 of FIG. 1A, and EV 706 which may be similar to EV 107 of FIG. 1A. Power system 700 may include additional elements (e.g., a DC charging circuit similar to DC charging circuit 104 and loads similar to loads 110). IIEVC 702 may be configured to receive current 710 from power grid 705 through circuit breaker 704.

Circuit breaker 704 may be configured to trip based on the value of current 710. For example, circuit breaker 704 may be configured to trip in response to current 710 being above a threshold (e.g., 40A). The threshold may be determined by the ratings of circuit breaker 704 or by industry standards and/or government regulations. IIEVC 702 may be configured to receive current 709 from power source 701 and convert current 709 to current 707 through power converter 703. Current 708 may be the sum of currents 710 and 707 and may be converted into current 712 through AC charging circuit 711. IIEVC 702 may be configured to output current 712 to EV 706, and EV 706 may be configured to receive current 712. In some embodiments, IIEVC 702 may include a communication device similar to communication device 215. The communication device of IIEVC 702 may be configured to communicate with a second communication device that may be a part of EV 706 (both communication devices are not shown in FIG. 7).

A sudden drop in current 707 (e.g., in case power source 701 is a PV generator, and PV power production suddenly drops due to, for example, shading and/or dirt) may cause an increase in current 710 (to continue providing a sufficient charging current 712 to EV 706) such that current 710 may exceed the threshold, tripping circuit breaker 704. To avoid exceeding the threshold, IIEVC 702 may signal EV 706 through the communication device to reduce current 712, and/or may temporarily disconnect EV 706 from circuit breaker 704 (e.g., by opening relays 716 and/or relays which may be a part of AC charging circuit 711, until EV 706 has responded to the signal and/or until a predetermined time interval has passed. In some embodiments, IIEVC 702 may also be configured to receive current 714 from storage device 713, and responsive to a sudden drop in current 709, IIEVC 702 may increase current 714 to compensate for the decrease in current 709.

Figure 8:
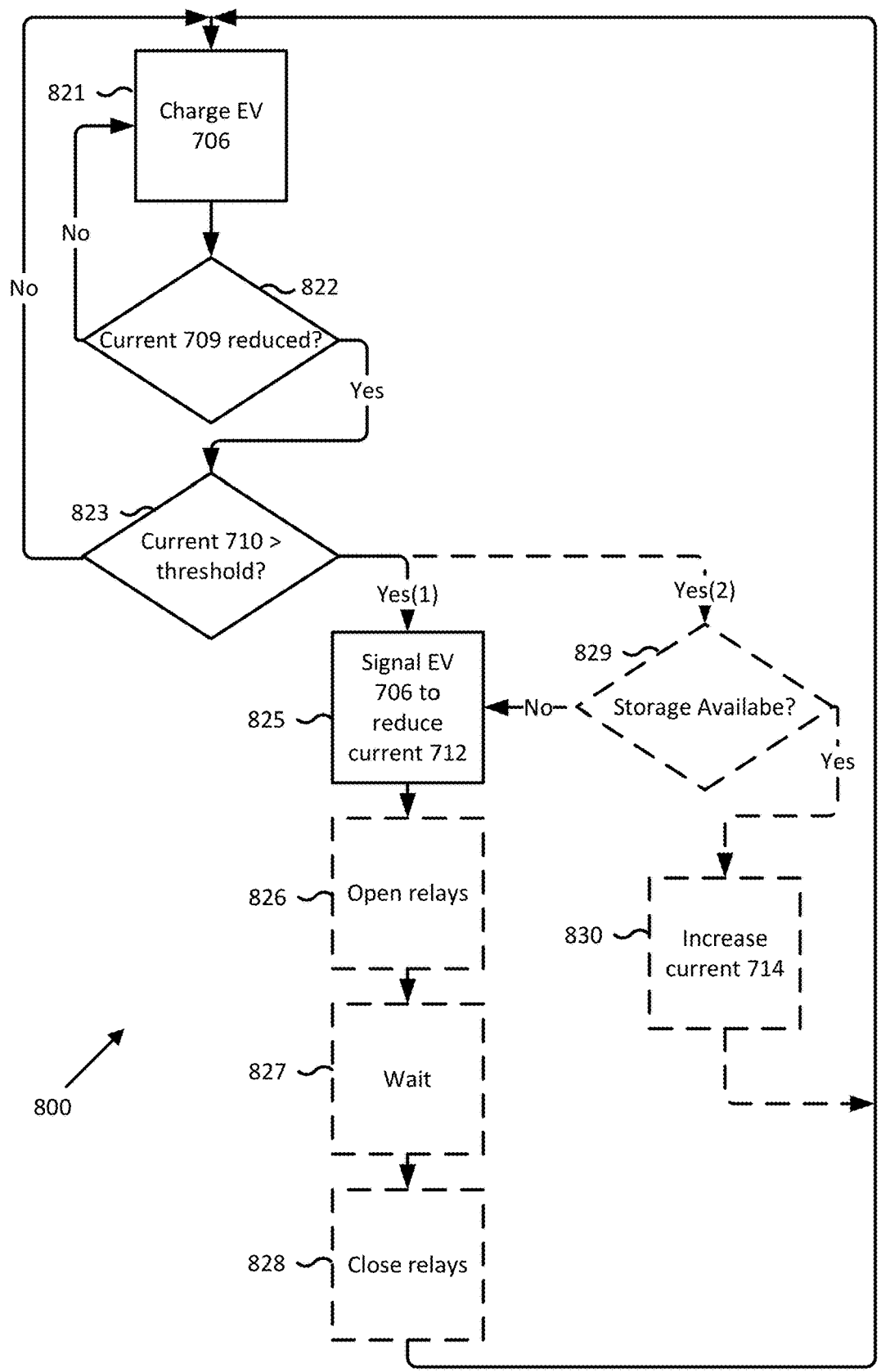
FIG. 8 is a flow chart illustrating an exemplary method for controlling the charging of an EV, according to illustrative embodiments.

Reference is now made to FIG. 8, which illustrates a flowchart describing a method 800 for controlling the charging of an EV, according to illustrative embodiments. Method 800 describes a method that may be carried out by controller such as controller 715 of FIG. 7. For simplicity, description of method 800 will refer to a controller 715 as the controller carrying out method 800.

At step 821, IIEVC 702 may receive current 710 provided by power grid 705 and/or current 709 provided by power source 701, and may use the current to charge EV 706. Controller 715 may periodically (e.g., every second, or every 100 milli seconds [ms], 10 [ms] or 1 [ms]) proceed to step 822. At step 822, controller 715 may determine if current 709 was reduced compared to a previous value of current 709. Measuring and/or estimating current 709 may be implemented by monitoring and/or sensing one or more electrical parameters (such as power, voltage, current, temperature and/or irradiance). If at step 822 controller 715 determines that current 709 was not reduced, then controller 715 may return to step 821 and may wait a short period of time before returning to step 822. If at step 822 controller 715 determines that current 709 was reduced, controller 715 may advance to step 823. At step 823, controller 715 may determine if current 710 is above a threshold. In some embodiments, the value of the threshold may depend on the current ratings of circuit breaker 704 and/or may be derived from industry standards and/or government regulations. If at step 823 controller 715 determines that current 710 is below the threshold, controller 715 may loop back to step 821.

If at step 823 controller 715 determines that current 710 is above the threshold, controller 715 may advance to step 825. At step 825, controller 715 may signal EV 706 to reduce current 712 (e.g., to avoid tripping circuit breaker 714). If the response time of EV 706 is shorter than the trip time of circuit breaker 714, then further action might not be necessary, and controller 715 may skip steps 826, 827 and 828 (not shown) and return to step 821. If the response time of EV 706 may be longer than the trip time of circuit breaker 714, then controller 715 may advance to step 826. At step 826, controller 715 may open relays 716 and/or may open relays that may be a part of AC charging circuit 711, disconnecting EV 706 from power grid 705, which may reduce the risk of EV 706 tripping circuit breaker 704 by drawing a large current from power grid 705. Controller 715 may then advance to step 827. At step 827, controller 715 may wait until a predetermined time period has passed (the period of time selected to provide EV 706 with time to respond), and/or wait until EV 706 responds to the signal sent at step 825. Once the predetermined time period has passed, or once EV 706 responds to the signal, controller 715 may then advance to step 828. At step 828, controller 715 may close relays 716 and/or relays which may be a part of AC charging circuit 711, reconnecting EV 706. Controller 715 may then return to step 821.

In some embodiments, where method 800 is carried out with regard to a power system having a storage device (e.g., storage device 713), at step 823, if controller 715 determines that current 710 is above the threshold, controller 715 may proceed to step 829. At step 829, controller 715 may determine if storage device 713 is available (e.g., is charged and is capable of providing a compensation current). If controller 715 determines that storage device 713 is unavailable, then controller 715 may advance to step 825. If at step 829 controller 715 determines that storage device 715 is available, controller 715 may proceed to step 830. At step 830 controller 715 may increase current 714 to compensate for the reduction in current 709 and then return to step 821. According to certain aspects of the current disclosure, responsive to a detection reduction in current 709 (at step 823), controller 715 may respond by simultaneously increasing current drawn from storage (step 829) and opening relays 716 (step 826). Controller 715 may further simultaneously signal EV 706 to reduce charging current 712 (step 815).

Figure 9:
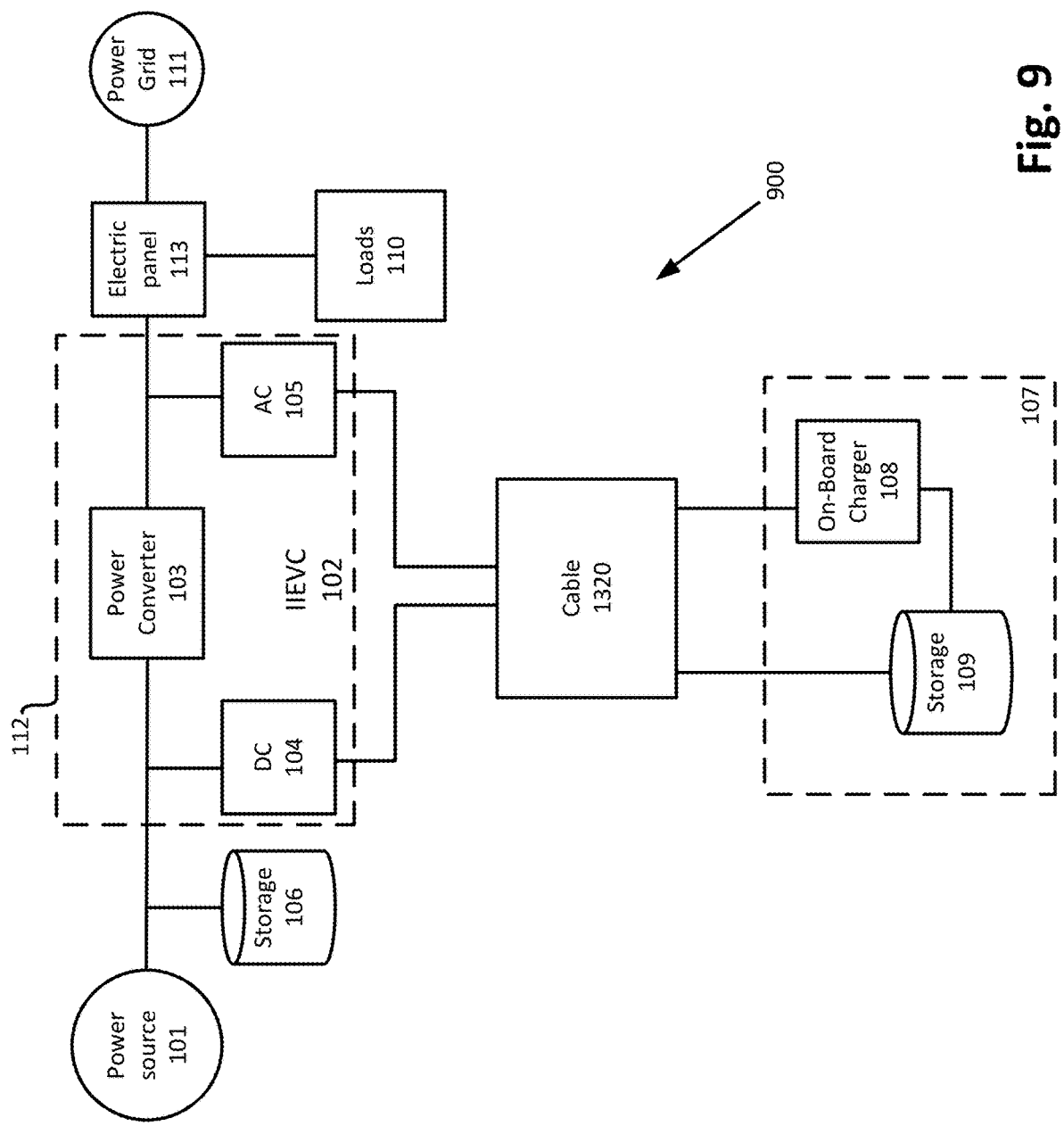
FIG. 9 is a block diagram depicting a power system according to illustrative embodiments.

Reference is now made to FIG. 9, which shows a block diagram of a power system 900 according to illustrative embodiments. In some embodiments, power system 900 may include one or more of the same components as power system 100, such as power source 101, IIEVC 102, power converter 103, DC charging circuit 104, AC charging circuit 105, storage device 106, EV 107 including on-board charger 108 and storage device 109, loads 110, power grid 111 and electric panel 113. Power system 900 may further include a cable 1320. In some embodiments, IIEVC 102 may supply power to EV 107 through DC charging circuit 104 and/or AC charging circuit 105 to storage device 109 directly or using on-board charger 108 as an intermediary between IIEVC 102 and storage device 109. Cable 1320 may transfer the supplied power from IIEVC 102 to EV 107. Cable 1320 may be configured to transfer DC power as well as AC power. Cable 1320 may have a first end and a second end opposite the first end.

In some embodiments, the first end of cable 1320 may be mechanically designed to be attached to and/or disconnected from DC charging circuit 104 and/or AC charging circuit 105. In some embodiments, DC cable 1320 may have a split end with a first connector coupled to the first end designed to plug into DC charging circuit 104 and a second connector coupled to the first end designed to plug into AC charging circuit 105. In some embodiments, the first end of cable 1320 may be designed to be permanently connected to DC charging circuit 104 and/or AC charging circuit 105.

The second end of cable 1320 may be designed to plug into on-board charger 108 and/or storage device 109. In some embodiments, connection design to on-board charger 108 and storage device 109 may be different. The second end of DC cable 1320 may have a split end with a first connector designed to connect to on-board charger 108 and a second connector designed to connect to storage device 109.

In some embodiments, a power system may have multiple cables 901. IIEVC 102 may have multiple outputs configured to connect to the plurality of cables 901. In some embodiments, EV 107 or other loads may have multiple inputs configured to connect to the plurality of cables 901. In some embodiments, cable 1320 may have a split input configured to connect to multiple outputs of IIEVC 102 and/or a different power source. In some embodiments, cable 1320 may have a split output configured to connect to multiple inputs of EV 107 and/or a different load. Cable 1320 may house multiple conductors and/or the plurality of conductors may split at the input and/or output of cable 1320. In some embodiments, cable 1320 may transfer power from an input or a split input to one or more conductors housed in cable 1320 and may output power to an output or a split output from one or more conductors housed in cable 1320.

In some embodiments, cable 1320 may be a DC cable, a single-phase AC cable, or a three-phase AC cable. In some embodiments, cable 1320 may be configured to transfer power in a DC form, in an AC single-phase form, and/or in an AC three phase form. Cable 1320 may have multiple connectors and each connector may be configured to transfer one or more forms of power. For example, cable 1320 may have three connectors, one for DC power, one for single-phase AC power, and one for three-phase AC power. The DC connector may have multiple pins (e.g., two pins) configured for power transfer. The single-phase AC power connector may have multiple pins (e.g., two or three pins—two for the power phase and an optional third terminal for connection to ground) configured for power transfer. The three-phase AC power connector may have multiple pins configured for power transfer. For example, a three-phase AC power connector may have three pins, one for each phase. In some embodiments, the three-phase AC power connector may have a fourth pin for connection to neutral, and may have a fifth pin for connection to ground.

Figure 10:
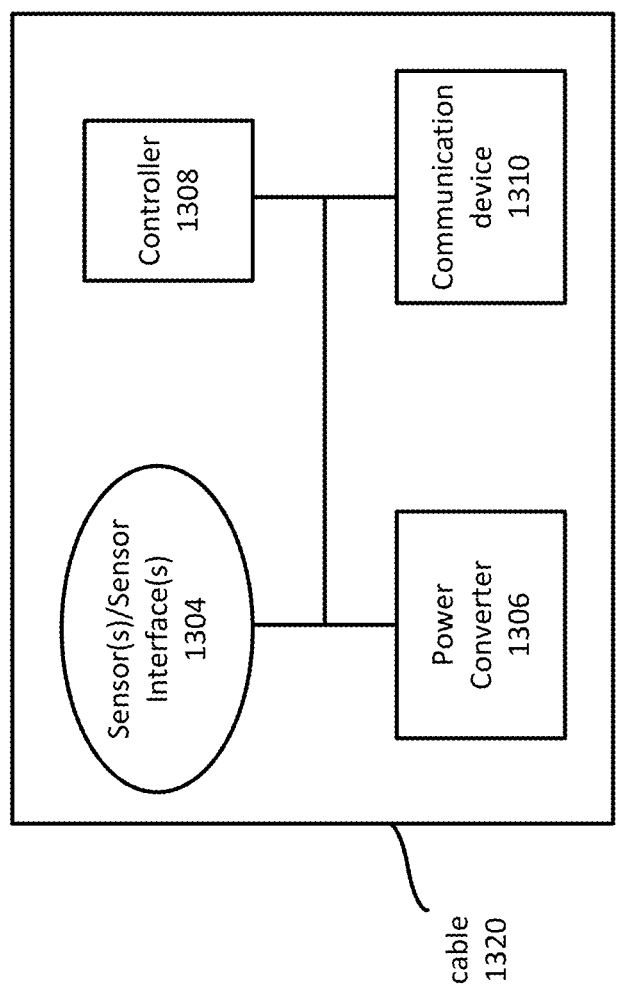
FIG. 10 is a block diagram depicting a cable according to illustrative embodiments.

Reference is now made to FIG. 10, which shows a block diagram of a cable 1320 according to illustrative embodiments. Cable 1320 may be configured to transfer AC power and/or DC power from a power device to a load and/or from a first load to a second load. A number of examples of power transferring using cable 1320 may be: transferring DC power from a photovoltaic generator to a storage device, transferring DC power from an IIEVC to an EV, transferring AC power from an inverter to a load, transferring AC power from a grid to an on-board charger, and transferring AC power from an on-board charger to a grid.

In some embodiments, the type of power transferred by cable 1320 may be significant or useful (e.g., for reporting to a system monitor or user). In order to know what type of power is transferred, cable 1320 may include sensor(s)/sensor interface(s) 1304 which may be configured to sense the type of power being transferred and determine if the power is AC or DC. For example, sensor(s)/sensor interface(s) 1304 may include a capacitor and a resistor coupled in series, with a voltage sensor coupled to the resistor. The capacitor may remove an offset in the voltage and position the voltage signal around zero. The root mean square (RMS) of the voltage signal on the resistor being different from zero may be an indication that the power is in AC form. The RMS of the voltage signal being about zero may be an indication that the power is in DC form.

In another example, sensor(s)/sensor interface(s) 1304 may include a second conductor magnetically coupled to a section of cable 1320. The sensing may be done by measuring the current or voltage on the second conductor. An amplitude above a threshold in the current or voltage on the second conductor may be an indication that the power is in AC form. An amplitude below a threshold in the current or voltage on the second conductor may be an indication that the power is in DC form. For example, a voltage on the second conductor of more than 1 milli Volt [mV] may indicate that the power may be in an AC form, and a voltage on the second conductor of less than 1 [mV] may indicate that the power is in a DC form.

In some embodiments, measuring the amount of power being transferred via cable 1320 may be desirable. Sensor(s)/sensor interface(s) 1304 may be configured to sense an electrical parameter indicative the amount of power that is being transferred through cable 1320 (e.g., by sensing power directly, or by sensing voltage and/or current and combining the measurement with other measurements to calculate and/or otherwise obtain the power measurement). In some embodiments, knowing the amount of power transferred through cable 1320 may be useful for monitoring purposes, for example, when a single cable is used to charge multiple loads, it may be determined if cable 1320 charges a first load faster than a second load.

Some electrical vehicles may be designed to charge using an on-board charger 108 (of FIG. 9) configured to receive AC power, some electrical vehicles may be designed to charge using a storage device 109 (of FIG. 9) configured to receive DC power, and other electrical vehicles may be designed to charge using either or both an on-board charger 108 configured to receive AC power and a storage device 109 configured to receive DC power. In some embodiments, on-board charger 108 may be connectable to a first type of plug and storage device 109 may be connectable to a second type of plug. In some embodiments, on-board charger 108 and storage device 109 may be connectable to the same type of plug. The type of plug may be determined based on the shape of the connector, the number of pins and the layout of the pins on the connector.

Electrical vehicles may be designed to receive power at a maximum current, maximum power, and/or maximum voltage. In some embodiments, cable 1320 may include a communication device 1310 configured to communicate with various components of cable 1320 (e.g., sensor(s)/sensor interface(s) 1304, power converter 1306, and controller 1308), a load coupled to cable 1320, with a power source coupled to cable 1320, and/or a third-party device configured to communicate with cable 1320. For example, cable 1320 may be housed in a garage, and communication device 1310 may be configured to communicate with a controller in a garage door. The controller in the garage door may be configured to open and/or close the garage door and/or configured to turn the garage lights ON and/or OFF. The controller of the garage door may communicate back to communication device 1310.

In some embodiments, communication device 1310 of cable 1320 may communicate with EV 107 or with an intermediary device (e.g., a communication adaptor) configured to sense and/or communicate with both EV 107 and communication device 1310. In such communications, communication device 1310 may receive one or more of the following values: maximum power limit that EV 107 may receive, maximum voltage limit that EV 107 may receive, maximum current limit that EV 107 may receive, power form that EV 107 is configured to receive, current form that EV 107 is configured to receive, and/or voltage form that EV 107 is configured to receive. In some embodiments, cable 1320 may include sensor(s)/sensor interface(s) 1304 configured to sense the current, power and/or voltage values transferred to EV 107. Controller 1308 may compare between the values sensed by sensor(s)/sensor interface(s) 1304 and the values received from EV 107 and determine if the transfer of power is safe for EV 107, for example, controller 1308 may determine that the transfer of power is safe if the power is less than the maximum power that EV 107 may receive. In some embodiments, sensor(s)/sensor interface(s) 1304 may sense the voltage on EV 107, controller 1308 may receive a signal from sensor(s)/sensor interface(s) 1304 including the value of the voltage on EV 107, and according to the voltage estimate the state of charge of EV 107. If the state of charge is above the EV's stated maximum, cable 1320 may limit the power transferred to EV 107 to be under the EV's stated maximum.

In some embodiments, cable 1320 may have a power converter 1306. Controller 1308 may receive values of electrical parameters sensed by sensor(s)/sensor interface(s) 1304 and/or values of electrical parameters received from a load by communication device 1310, and may operate/control power converter 1306 according to the values received. Power converter 1306 may convert input current and voltage to output current and voltage according to values received by controller 1308. EV 107 may receive power from IIEVC 102, but may be limited by power converter 1306 to a maximum voltage and/or maximum current according to the specific design of storage device 109 and/or on-board charger 108, which may have been communicated from EV 107.

Power converter 1306 may convert input current and voltage to output current and voltage suitable to the design and ratings of components in EV 107. For example, EV 107 may be configured to receive power at a maximum voltage of 20[V] and communication device 1310 may receive from EV 107 or an intermediary device coupled to EV 107 an indication that storage device 109 is missing 100[Ampere hour] (e.g., charging storage device 109 with an additional 100 Ampere hour[Ah] may charge storage device 109 to full capacity). Sensor(s)/sensor interface(s) 1304 may sense that power from IIEVC is in DC form (e.g., a DC voltage or a DC current may be sensed, which indicates that the power is in DC form). As a result, converter 1306 may be configured to receive power P=20[V]·100[A]=2000[W]. In some embodiments, cable 1320 may be configured to transfer 2000[W] at a higher voltage than a voltage suitable for EV 107, for example: a voltage value of 500[V]. Providing 2 [kW] of power at a voltage value of 500[V] will lower the current to 4[A]. In some embodiments, it may be preferable to transfer power at a high voltage and a low current, which may be carried by comparatively smaller conductors. Power may reach power converter 1306 at a high voltage and may be converted to power at a voltage and current suitable to EV 107.

Power converter 1306 may be configured to receive an input of DC and/or AC voltage and current, and may output DC and/or AC voltage and current. In some embodiments, power converter 1306 may have a first converter configured to convert AC to AC, a second converter configured to convert AC to DC, a third converter configured to convert DC to DC, and a fourth converter configured to convert DC to AC. In some embodiments, the four converters may be implemented using shared electronics, with a controller configured to operate the electronics to implement one or more of the conversion functions at any given time.

In some embodiments, the first converter, the second converter, the third converter and the fourth converter may be placed in parallel, and controller 1308 may connect a converter by switching one converter in and switching the other converters out, based on values sensed by sensors/sensor interfaces 601 and/or values of electrical parameters received by communication device 1310. For example, sensor(s)/sensor interface(s) 1304 may sense a DC voltage of 10[V] on storage device 109 in EV 107. Communication device 1310 may receive a signal from EV 107 that storage device 109 is missing 500 Watt hour[Wh] to be completely charged. Sensor(s)/sensor interface(s) 1304 may sense a DC voltage of 500[V] at the output of IIEVC 102. Controller 1308 may receive the values from sensor(s)/sensor interface(s) 1304 and communication device 1310 and switch in the DC/DC power converter in power converter 1306 while switching out AC/AC, AC/DC and DC/AC power converters in power converter 1306. Cable 1320 may transfer DC power from IIEVC 102 at a voltage value of 500[V] to EV 107 and convert the transferred power from 500[W] with a voltage value of 500[V] and a current value of 1[A] to a voltage value of 10[V] and a current value of 50[A].

In some embodiments, power converter 1306 may have a first converter configured to convert AC to AC and/or AC to DC, a second converter configured to convert DC to DC and/or DC to AC. The first converter and second converter may be placed in parallel, and controller 1308 may connect a converter by switching one converter in and switching the other converters out, based on values sensed by sensors/sensor interfaces 601 and/or values of electrical parameters received by communication device 1310.

Figure 11:
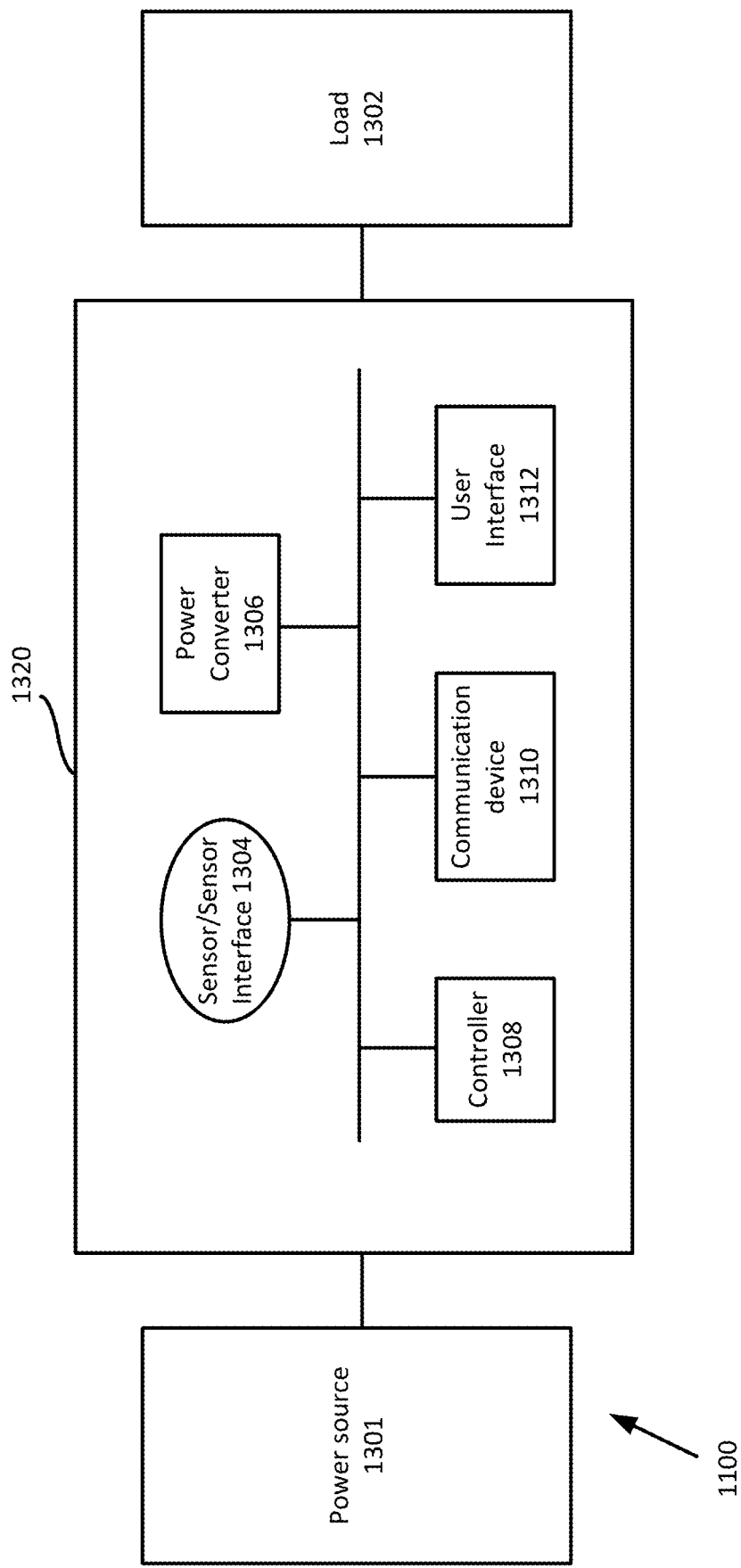
FIG. 11 is a block diagram depicting a power system according to illustrative embodiments.

Reference is now made to FIG. 11, which shows a block diagram of a power system 1100 according to illustrative embodiments. Power system 1100 may include a cable 1320, a power source 1301, and a load 1302. Cable 1320 may include sensor(s)/sensor interface(s) 1304 and power converter 1306 which may be the same components as components of cable 1320 of FIG. 10. Cable 1320 may include a user interface 1312. Cable 1320 may transfer power from power source 1301 to load 1302. Power source 1301 may be a battery, a photovoltaic power source, a hydropower source, a grid, a wind power source, a geothermal power source, a hydrogen power source, a tidal power source, a wave energy power source, a hydroelectric power source, a biomass power source, a nuclear power source, and/or a fossil fuel power source. In some embodiments, power source 1301 may include or be connected to an IIEVC (not explicitly depicted). Load 1302 may be an EV.

Cable 1320 may include a communication device 1310 configured to receive and transfer data to load 1302 and/or power source 1301 using PLC, wired communication, wireless communication protocols (e.g., Bluetooth™, ZigBee™, WiFi™ etc.), acoustic communication, etc. In some embodiments, communication device 1310 may be placed at an end of cable 1320 configured to connect to load 1302, or at an end of cable 1320 configured to connect to power source 1301. One reason for placing communication device 1310 at the end of cable 1320 is because the end may be as close as possible to load 1302 and/or power source 1301 and a small distance may be to prevent communication interferences and/or electromagnetic interferences. For instance, if the communication device 1310 were placed near the center of the cable 1320 where such interferences may be present, the interferences may hinder the ability of the communication device 1310 to communicate with other devices.

In some embodiments, user interface 1312 may display one or more parameters, such as the voltage of load 1302, the current flowing into load 1302, the temperature at one or more system locations (e.g., the temperature of cable 1320, power source 1301, and/or load 1302), the connection status between cable 1320 and power source 1301 (e.g., connected, disconnected, and/or not connected correctly), the connection status between cable 1320 and load 1302 and/or current flow direction (e.g., charge/discharge status). In embodiments where load 1302 has a storage device (e.g., a battery), user interface 1312 may display the state of charge of the storage device. In an embodiment where load 1302 is an EV, user interface 1312 may display mileage charged (mileage charged may refer to how many miles the car can travel under the present level of charge), mileage left to fully charge, and/or number of miles needed for next planned trip (similar to as shown in area 421 of FIG. 4A) which may be determined as follows: number of miles for the trip minus the number of miles charged may equal the number of miles left needed to charge.

In some embodiments, user interface 1312 may receive user inputs and output alerts to notify the user of various conditions. For instance, user interface 1312 may have "start charging" and "stop charging" buttons and a "set percentage of charge" setting, which may be specified by the user in terms of percentage of battery filled or number of miles the EV is able to traverse (e.g., charge to 93 percent or charge enough for a planned trip of 121 miles). The user interface may have a visual alert for when cable 1320 disconnects from power source 1301 or load 1302, a visual alert reporting leakage between power source 1301 and load 1302, and a distress button configured to contact the authorities (e.g., police, fire department, and medical services).

In some embodiments, user interface 1312 may use different colors to indicate different operational conditions and/or alerts. For example, user interface 1312 may display a red screen in case of an error or physical and/or electrical disconnection from power source 1301 and/or from load 1302. User interface 1312 may display a yellow screen while power from power source 1301 is flowing in full capacity with regard to load 1302 and power source 1301. For example, if load 1302 is configured to receive power at 100 Volts [V] and 10 Amps [A] and power source 1301 is transferring 1000 Watts [W], user interface 1312 may display a yellow screen showing power is flowing at full capacity. In some embodiments, user interface 1312 may provide (e.g., using a speaker element) audible alerts such as a speech, buzz, or ring sound, when the storage (e.g., storage 109) is full and when cable 1320 is disconnected from power source 1301 and/or load 803 in case of overheating.

In some embodiments, communication device 1310 in cable 1320 may communicate with power source 1301 and/or load 1302. Communication may include transferring data such as, for example, values of electric parameters related to the power being transferred, values of electric parameters of the power that load 1302 wants to receive, values of electric parameters that power source 1301 may be able to provide, and connection status of cable 1320. In addition to transferring data, communication may also include commands to disable and/or enable certain components and/or mechanisms. For example, communication device 1310 may communicate to load 1302 that cable 1320 is transferring power to load 1302 and, as a result, may also instruct load 1302 to disable certain mechanisms and/or components. In some embodiments, load 1302 may have a safety mechanism configured to disable load 1302 when cable 1320 is transferring power and/or when cable 1320 is connected. An example of disabling and/or enabling mechanisms and/or components may be disabling and enabling the ability of load 1302 to operate. In some embodiments, load 1302 may be an EV. When charging load 1302 using cable 1320 to transfer power from power source 1301, communication device 1310 may instruct the load 1302 to disable its movement ability (e.g., by enabling an immobilizer mechanism) to prevent load 1302 from driving off while charging.

In an embodiment where load 1302 is an EV and cable 1320 is configured to charge load 1302, communication device 1310 in cable 1320 may communicate with other mechanisms surrounding cable 1320 and/or mechanisms other than load 1302 and/or power source 1301. For example, power source 1301 may be located in a garage. While charging load 1302 using cable 1320, communication device 1310 may be configured to communicate with the garage door (e.g., by embedding a wireless transceiver in cable 1320, and a similar transceiver in a garage-door controller). User interface 1312 may include an option for pressing a button configured to open and close the garage door. In some embodiments, power source 1301 may be placed in a residential or commercial compound, which may have an automation system (e.g., a home automation system) with a communication transceiver. While using cable 1320 to charge load 1302, communication device 1310 may communicate with the automation system to control the automation system itself and components coupled to the automation system. For example, communication device 1310 may instruct the automation system to enable, disable, or set a parameter value (e.g., lumen value, temperature value) for lights, air-conditioning, hot water heating, and surround system.

In some embodiments, sensor(s)/sensor interface(s) 1304 may be configured to sense proximity to load 1302 and/or power source 1301 using proximity sensors such as: capacitive displacement sensor, Doppler effect based sensor, eddy current sensor, inductive sensor, magnetic sensor, magnetic proximity fuse, photodetector, laser rangefinder, charge coupled device, infrared sensor, radar based sensor, Sonar, ultrasonic transducer, hall effect sensor etc. User interface 1312 may visually and/or auditorily alert the user when cable 1320 is in proximity to load 1302 and/or power source 1301. User interface 1312 may visually and/or auditorily alert the user as cable 1320 is getting closer or further from cables 701 connection point to load 1302 and/or power source 1301. User interface 1312 may provide visual and/or auditory indications of proximity to and/or connection status to connection points in load 1302 and/or power source 1301. For example, cable 1320 may be configured to be plugged into load 1302. User interface 1312 may visually display distance, direction, and/or alignment between a cable 1320 connection point and a load 1302 connection point. User interface 1312 may provide different auditory alerts based on distance, direction, and/or alignment between cable 1320 connection point and load 1302 connection point. The auditory alert may be a periodic audio ping (e.g., a beeping sound), a buzzing sound, and/or a voice message announcing the distance, direction, and/or alignment between a cable 1320 connection point and a load 1302 connection point and/or power source 1301. As an example, the alert may be a periodic audio ping and as load 1302 (e.g., EV 107) moves closer to cable 1320, the frequency of the audio ping may increase and/or the decibel level of the audio ping may increase. As load 1302 moves away from cable 1320, the frequency of the audio ping may decrease and/or the decibel level of the audio ping may decrease.

Sensor(s)/sensor interface(s) 1304 may be configured to sense proximity to load 1302 and/or power source 1301 using, for example, visual sensing or magnetic sensing. Load 1302 and/or power source 1301 may have a device coupled to and sensible by sensors/sensor interfaces 601. In some embodiments, communication device 1310 may receive the distance, direction, and/or alignment between cable 1320 connection point and load 1302 connection point from load 1302 sensed by internal sensor(s) in load 1302. In some embodiments, communication device 1310 may receive the distance, direction, and/or alignment between a cable 1320 connection point and a power source 1301 connection point from power source 1301 sensed by internal sensor(s) in power source 1301. For example, communication device 1310 may receive an indication that cable 1320 is 2 ft. away from load 1302, and that cable 1320 is 45 degrees (counter clockwise) from a receptacle in load 1302.

In some embodiments, sensor(s)/sensor interface(s) 1304 may be configured to sense movement around and contact of another object with cable 1320. For example, sensor(s)/sensor interface(s) 1304 may be configured to detect a person attempting to disconnect cable 1320 from load 1302 and/or power source 1301. Communication device 1310 may be configured to transmit an alert to a user interface, which may display the alert, output an auditory sound, and/or output a tangible alert (e.g., vibration) as a result of the movement. Communication device 1310 may be configured to provide an alert when the movement sensed is larger than a configured value. The user interface may be on a mobile phone, tablet, computer, watch, etc. As a result of the alert, the user is informed of when any person attempts to disconnect cable 1320 from load 1302, which may be indicative of a person attempting to steal load 1302.

Figure 12:
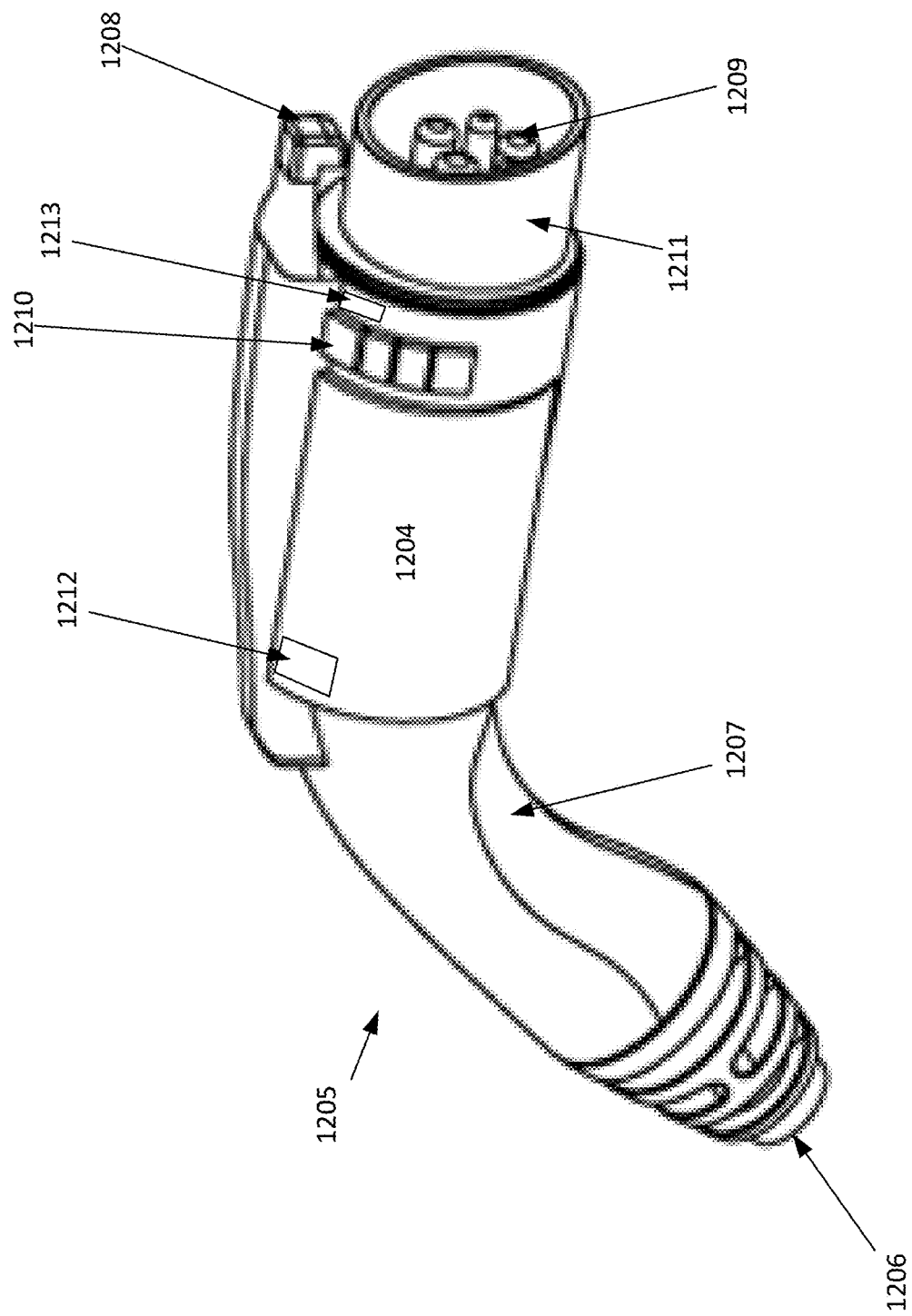
FIG. 12 shows an illustrative embodiment of a connector which may be part of a cable of FIG. 11, according to illustrative embodiments.

Reference is now made to FIG. 12 which shows an illustrative embodiment of a connector 1205 which may be part of cable 1320 of FIG. 11, according to illustrative embodiments. Connector 1205 may be placed at an end of a cable (e.g., cable 1320) and may connect to a cable at a cable attachment 1206. Connector 1205 may have a handle 1207, designed for a comfortable and balanced holding of connector 1205. Connector 1205 may further have pins 1209 configured to connect to a power source and/or a load such as power source 1301 and load 1302 of FIG. 11. Pins 1209 may have one or more pins for the transfer of current and/or power from a power source to a load. Pins 1209 may further include a control pin, a proximity detection pin, a communication pin, and a ground connection pin. In some embodiments, pins 1209 may include a communication pin. A communication pin may transfer a signal using, for example, a twisted pair communication cable, a fiber optic data cable, or any other communication cable. Connector 1205 may have a safety mechanism 1208 configured to click-on to a load and/or a power source outlet. Safety mechanism 1208 may prevent an unintentional disconnect of connector 1205 and pins 1209 from a load and/or a power source.

In some embodiments, some or all the components of cable 1320 of FIG. 11 such as sensor(s)/sensor interface(s) 1304, power converter 1306 and user interface 1312 may physically be located in/on connector 1205 rather than in cable 1320. That is, one or more of the sensor(s)/sensor interface(s) 1304, power converter 1306, communication device 1310, controller 1308, and user interface 1312 may be located in/on connector 1205 rather than in/on cable 1320. In some cases, connector 1205 may include each of the above-listed components of cable 1320. In such cases, connector 1205 may be coupled to the end of a basic cable. A basic cable may be a typical cable that includes a conductor, insulating sheath, and one or more connection points on each end of the cable. A basic cable does not include the above-listed components (e.g., sensor(s)/sensor interface(s) 1304, power converter 1306, communication device 1310, controller 1308, and user interface 1312) of cable 1320. As a result of coupling the connector 1205 with the basic cable, the basic cable is retrofitted and/or otherwise provided with the functionalities the various above-listed components of cable 1320.

In other cases, connector 1205 may include some of the above-listed components of cable 1320 and the cable may include the remainder of the above-listed components. For example, connector 1205 may include power converter 1306, communication device 1310, controller 1308, and user interface 1312. In such an example, the cable may include the sensor(s)/sensor interface(s) 1304. Once coupled, the various components of the connector 1205 may communicate and/or otherwise interact with various components of the cable.

Connector 1205 may be produced from a rigid material while the rest of the cable may be produced from a more flexible material. The flexibility of the cable may make it easier to connect the cable on one end to a power device and at a second end to a load. The rigidness of connector 1205 may protect the components included in connector 1205. For example, the cable may connect to an IIEVC on one end and to an EV on the other. The IIEVC and the EV might not always be vertically and/or horizontally aligned with one another, creating a situation where flexibility of the cable may ease the connection of the IIEVC and the EV. However, the cable may be exposed to trauma (e.g., an EV may periodically drive over an associated charging cable, or a charging cable may be dropped), so it may be beneficial to locate certain components in a protective, rigid connector 1205.

In some embodiments, user interface 1312 may be integrated in or mounted on connector 1205 rather than in/on the cable 1320. In FIG. 12, the user interface 1312 is depicted as user interface 1204, which includes the same functionality as user interface 1312. One example of user interface 1204 being integrated in connector 1205 may be using user interface as part of the outer structure of connector 1205. Connector 1205 may include buttons 1210, which may be separate from user interfaces 1204 screen (as shown in FIG. 12) or may be part of user interfaces 1204 (e.g., as part of a touch screen (not shown)). User interface 1204 may be powered by power flowing through the cable (e.g., cable 1320) and connector 1205. Alternatively, user interface 1204 may be powered by an external power source (e.g., a battery, photovoltaic cells, etc.) separate from a power source providing the power flowing through the cable (e.g., power to charge the load).

In some embodiments, pins 1209 may protrude from connector 1205, and connector 1205 may include a pins protector 1211. Protector 1211 may prevent pins 1209 from being damaged by an external object or surface. In some embodiments, pins 1209 may be flat and may be designed to connect to a load and/or power source by touch. In some embodiments, connector 1205 may be configured to connect to a load and/or a power source using a magnetic force. Protector 1211 and/or pins 1209 may be partially or fully magnetized, so that when connecting connector 1205 to a load or to a power source, a receptacle part designed to receive pins 1209 may be configured to connect to connector 1205 as well as aligning together with connector 1205 according to the placement of pins 1209. A magnetic force connecting connector 1205 to a load or a power source may function as a safety mechanism which may prevent unintentional unplugging of connector 1205. For example, a human may apply a force of 500 Newtons [N]. If a magnetic force between pins protector 1211 and a receptacle socket in a load is created and set to 750[N], an unintentional disconnection of connector 1205 from the load may be prevented. A magnetic force may be created in connector 1205 using electrical power, and/or may be created in the respective plug in the load or power source.

In some embodiments, connector 1205 may plug and lock to a respective receptacle of a load or power source using a mechanical lock (not shown) such as a latch. Connector 1205 may lock and unlock to and from its respective receptacle using a mechanical key or an electric key activated by a controller. Connector 1205 may have a lock 1213 designed to receive a mechanical key via a key hole of the lock, and may be configured to lock and unlock connector 1205 to a load and/or power source depending on the position of the key. Additionally, or alternatively, the key may be an electrical key and lock 1213 may be designed to communicate with the electrical via a wired connection, which may be established when the key contacts a surface of lock 1213 (e.g., a surface of lock 1213 defining the key hole). Lock 1213 may be configured to lock and/or unlock upon a contact with the electrical key. For instance, a first contact may cause lock 1213 to lock while the second (e.g., next) contact may cause lock 1213 to unlock. Additionally, or alternatively, the key may be a proximity key and lock 1213 may be designed to automatically establish a connection with and communicate with the proximity key when the proximity key is within a maximum preset distance (e.g., 1 meter, 10 meters) of lock 1213. Lock 1213 may be configured to unlock when the proximity key is near (e.g., within the maximum preset distance) of lock 1213. Lock 1213 may be configured to lock when the proximity key is not near (e.g., outside the maximum preset distance) of lock 1213, which may be determined by losing its connection with the proximity key.

In some embodiments, a key designed to fit into keyhole of lock 1213 may activate a magnetic force configured to lock pins protector 1211 to a power source and/or load configured to connect to connector 1205. Locking connector 1205 to a power source and/or load may prevent unauthorized hands from disconnecting and unplugging connector 1205 from the respective power source and/or load.

In some embodiments, connector 1205 may include a fingerprint scanner 1212. Fingerprint scanner 1212 may be configured to lock/unlock lock 1213 of connector 1205 from its respective receptacle plug. Connector 1205 may be locked using a magnetic force, and fingerprint scanner 1212 may be configured to lock or unlock connector 1205 by either enabling or disabling the magnetic force. In a different embodiment, connector 1205 may lock to a receptacle retaining surface of the power source or load using a mechanical lock such as a latch (not shown). Fingerprint scanner 1212 may cause the latch to move from one position to a second (and vice versa), where the first position may be configured to lock connector 1205 to a corresponding receptacle retaining surface of the power source or load and the second position may be configured to unlock connector 1205 from the corresponding receptacle retaining surface of the power source or load. Connector 1205 may lock and/or unlock to its respective receptacle by pressing on one or more buttons 1210 or on user interface 1312/1204. Fingerprint scanner 1212 may enable the locking/unlocking option in buttons 1210 or user interface 1312/1204. In some embodiments, connector 1205 may connect to and/or disconnect from a load and/or a power source using a remote user interface configured to communicate with cable 1320 from a distance, such as an application running on a mobile phone or on a computer. Connector 1205 may be remotely locked and/or unlocked from a load and/or a power source using a remote user interface.

Figure 13:
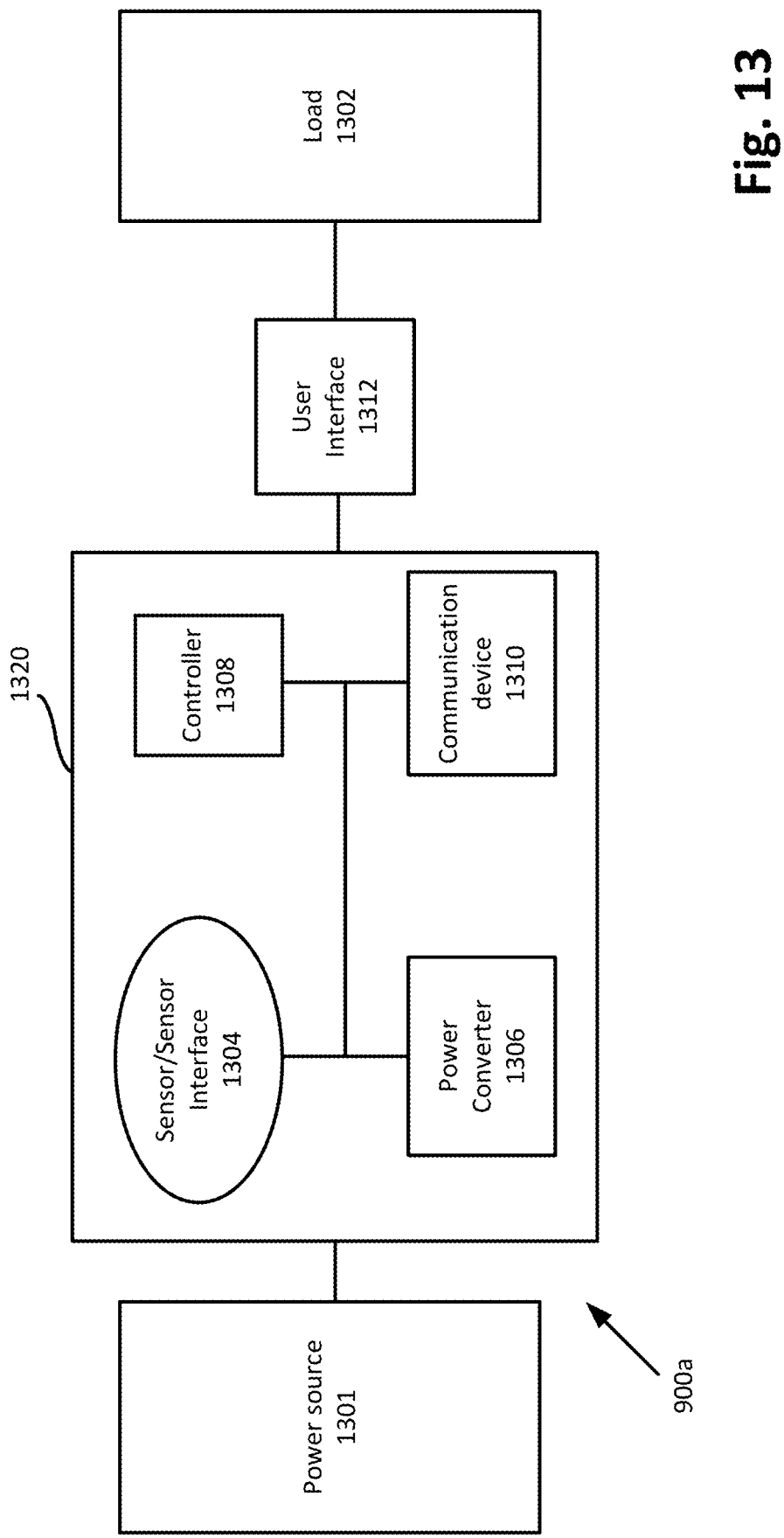
FIG. 13 is a block diagram of a power system according to illustrative embodiments.

Reference is now made to FIG. 13, which shows a block diagram of a power system 900*a* according to illustrative embodiments. Power system 900*a* may include cable 1320, power source 1301, and load 1302. Cable 1320 may connect between power source 1301 and load 1302 with one end of cable 1320 being designed to couple to power source 1301 and the other end of cable 1320 being designed to couple to load 1302. Power system 900*a* may include user interface 1312, which may be an extension of cable 1320 such that user interface 1312 may be connected to, added to, or mounted on to cable 1320. User interface 1312 may display the same information, and have the same user interface functionalities as user interfaces 704/1204. User interface 1312 may be powered by an external power source with regard to cable 1320, such as a battery, photovoltaic cells, etc. In some embodiments, user interface 1312 may be electromagnetically coupled to cable 1320 and may be powered by drawing power from cable 1320 using electromagnetic methods. In some embodiments, cable 1320 may include sensor(s)/sensor interface(s) 1304, power converter 1306, controller 1308, and communication device 1310.

Reference is now made to FIG. 14A, which shows add-on clamp 1400*a* according to illustrative embodiments. Clamp 1400*a* may clamp on using tips 1403*a* where tips 1403*a* may be configured to be separated (referred to as "opened") and joined (referred to as "closed"). Clamp 1400*a* may have handles 1401*a* configured to open clamp 1400*a* as a result of pressure applied to handles 1401*a*, and close clamp 1400*a* as a result of lack of pressure to handles 1401*a*. Clamp 1400*a* may be designed to have a default position, for example, a closed position (as shown in FIG. 14A). Clamp 1400*a* may be biased in the default position by a spring 1404 configured to force clamp 1400*a* to the default, closed position using a force generated by the spring. In some examples, the force may be generated using the moment of a spring (i.e. $M = k \cdot \Delta\theta$, where M is the moment on the spring, k is the spring coefficient and $\Delta\theta$ is the angle between handles 1401*a* relatively to when clamp 1400*a* is closed). In some embodiments, handles 1401*a* may have areas parallel to each other for grip ease of clamp 1400*a*. In some embodiments, user interface 1402*a* may be mounted on clamp 1400*a*. User interface 1402*a* may be the same as or similar to user interface 1312 of FIG. 13.

Clamp 1400*a* may be designed to clamp onto an EV charging cable and/or an EV charging connector. For instance, when clamp 1400*a* is in the open position, clamp 1400*a* may receive the EV charging cable and/or EV charging connector. When clamp 1400*a* is in the closed position, an interior surface of clamp 1400*a* may be sized to contact an outer surface of the EV charging cable and/or EV charging connector. The clamp 1400*a* may fixedly couple to the EV charging cable and/or EV charging connector as a result of a friction fit between the inner surface of the clamp 1400*a* and the outer surface of the EV charging cable and/or EV charging connector. The clamp 1400*a* may fixedly couple to the EV charging cable and/or EV charging connector also as a result of pressure applied by clamp 1400*a* to the outer surface of the EV charging cable and/or EV charging connector. The pressure may be generated by spring 1404.

Reference is now made to FIG. 14B, which shows an embodiment of an add-on clamp 1400*b* according to illustrative embodiments. Clamp 1400*b* may include components that are the same or similar as the components of clamp 1400*a*: handles 1401*b*, tips 1403*b*, and spring mechanism 1404 may be the same as handles 1401*a*, tips 1403*a*, and spring 1404, respectively. Clamp 1400*b* may also clamp to the EV charging cable and/or EV charging connector in the same manner as clamp 1400*a*. User interface 1402*b* (e.g., screen) may be connected to clamp 1400*b* via joints 1406 and 1407. Joints 1406 and 1407 may be configured to adjust the position and/or angle of user interface 1402*b*. For instance, joints 1406 and 1407 may be configured to pivot when the user adjusts user interface 1402*b* while retaining a measure of pivotal resistance such that joints 1406 and 1407 hold the user interface in a fixed position relative to clamp 1400*b* when the user is not adjusting user interface 1402*b*. User interface 1402*b* may be a screen and include the same functionalities as any user interface described herein (e.g., user interface 1312 of FIG. 13).

Figure 15:
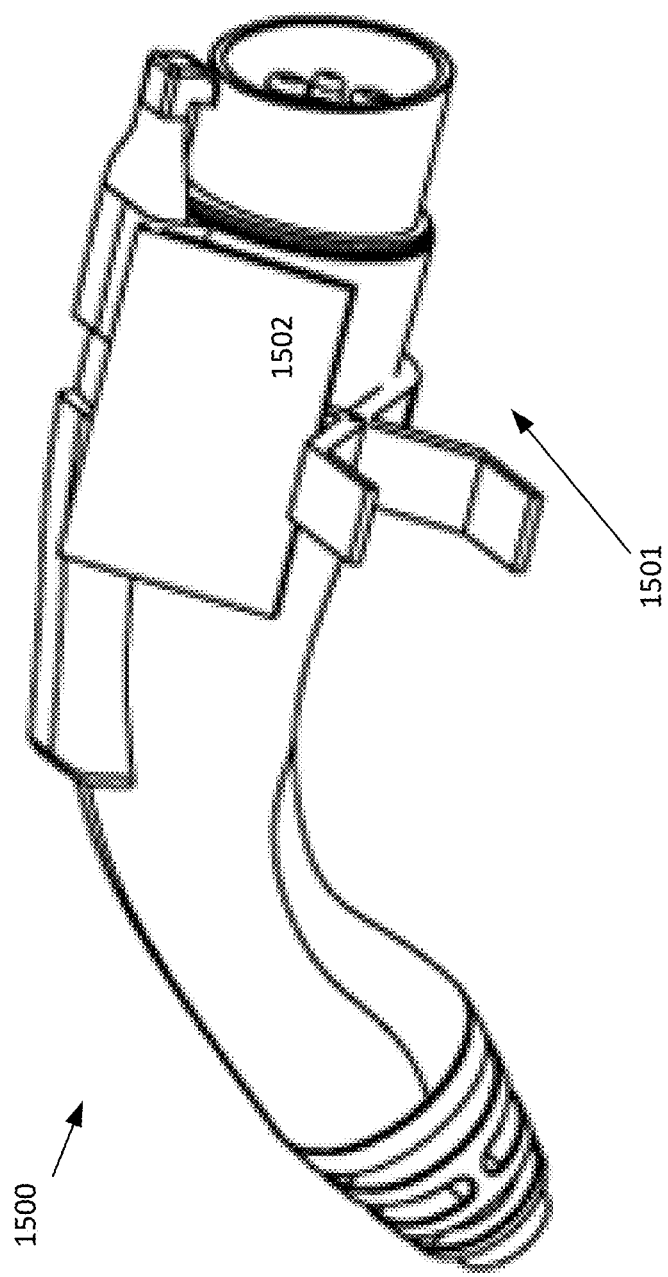
FIG. 15 shows a connector according to illustrative embodiments.

Reference is now made to FIG. 15, which shows a connector 1500 according to illustrative embodiments. In some embodiments, a clamp 1501 may be designed to clamp on and off from connector 1500. Clamp 1501 may include components that are the same or similar as the components of clamp 1400*a* or 1400*b*. Clamp 1501 may be clamped on connector 1500. For instance, when clamp 1501 is in the open position, clamp 1501 may receive connector 1500. When clamp 1501 is in the default, biased, closed position, an interior surface of clamp 1501 may be sized to contact an outer surface of connector 1500. The clamp 1501 may fixedly couple to connector 1500 as a result of a friction fit between the inner surface of the clamp 1501 and the outer surface of connector 1500. The clamp 1501 may fixedly couple to connector 1500 also as a result of pressure applied by clamp 1501 to the outer surface of connector 1500. The pressure may be generated by a spring of clamp 1501. In some instances, the outer surface of connector 1500 defines a recess configured to receive clamp 1501.

A user interface 1502 may be mounted on clamp 1501. User interface 1502 may display the same information and includes the same functionalities as user interface 1204 of FIG. 12. User interface 1502 may draw power by an external power source (such as a battery or photovoltaic cells) separate from a power source providing the power flowing through cable connector 1500 (e.g., power to charge the load). In some embodiments, user interface 1502 may be powered by a cable connected to connector 1500 when clamp 1501 is clamped on connector 1500. In some embodiments, clamp 1501 may be magnetically coupled to connector 1500, so that when connector 1500 is transferring power, clamp 1501 may transfer power to user interface 1502.

Figure 16:
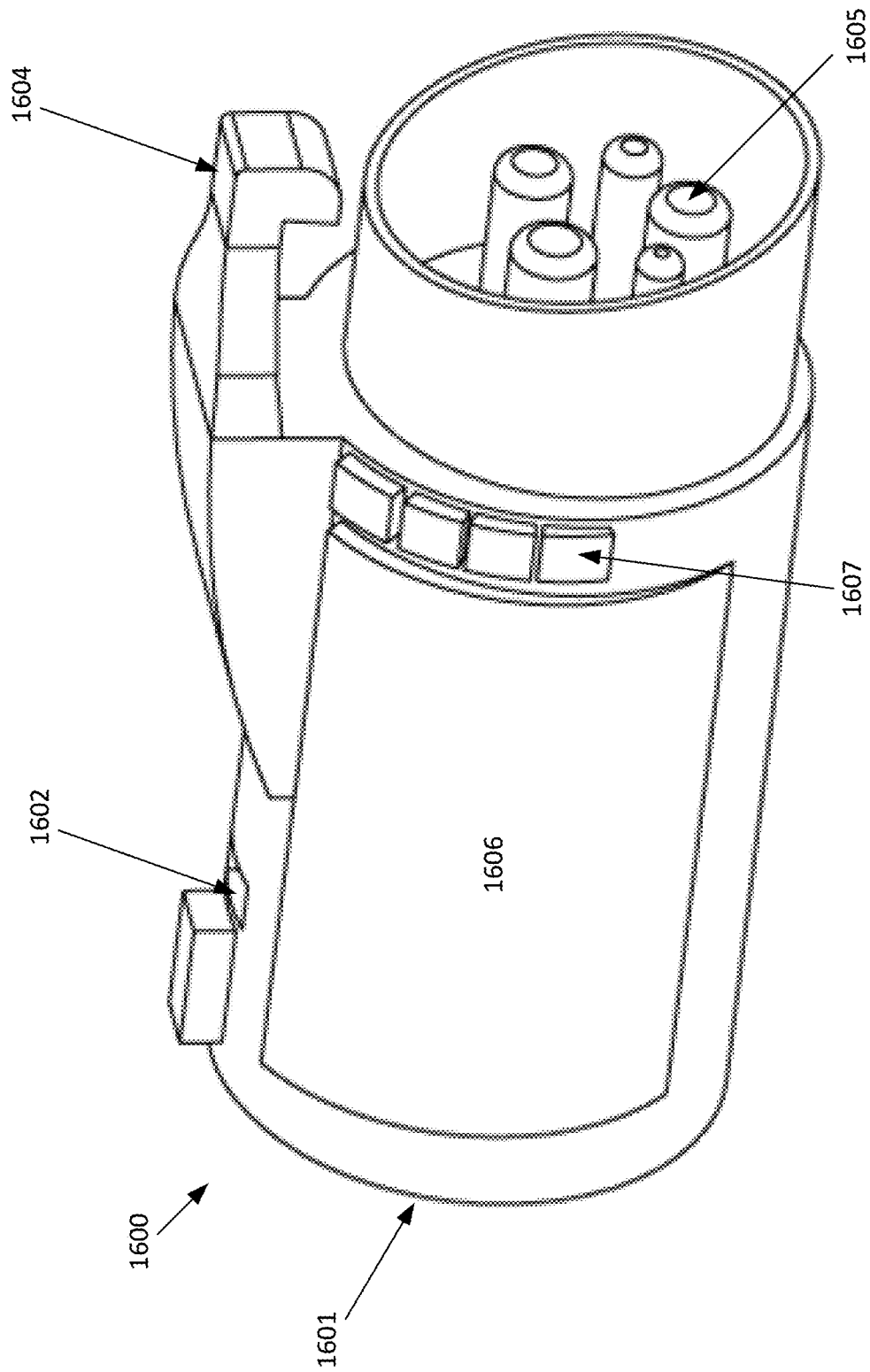
FIG. 16 shows a cable add-on according to illustrative embodiments.

Reference is now made to FIG. 16, which shows a cable add-on 1600 according to illustrative embodiments. Cable add-on 1600 may connect to a cable configured to connect an EV to a power source. Cable add-on 1600 may be designed to connect to a cable at connection point 1601 and may connect to an EV using pins 1605. Cable add-on 1600 may have a cavity 1602 configured to hold a safety mechanism of a cable (for example, safety mechanism 1208 of FIG. 12. Safety mechanism 1604 may be designed to click into an EV or a power source. Safety mechanism 1604 may be an L-shaped latch that prevents cable add-on 1600 from disconnecting accidently from an appropriate mate (e.g., a retaining tab of the EV or power source). Safety mechanism 1604 may include or be connected to electronics designed to electrically couple to a load and/or a power source. When safety mechanism 1604 connects to a load and/or a power source, the electronics of safety mechanism 1604 may enable the transfer of power through a cable connected at connection point 1601 and through cable add-on 1600. For example, safety mechanism 1604 may house a resistor configured to electrically couple to a circuit in a load. The resistor housed in safety mechanism 1604 may serve as a "key" in the sense that when the circuit in the load senses the resistor (e.g., by impedance detection) housed in safety mechanism 1604, the flow of power is enabled. When the resistor in safety mechanism 1604 is not sensed by the circuit in the load, the power flow is disabled. Sensing of the resistor housed in safety mechanism 1604 may be done with a current sensor in the load that is configured to sense current flow through a branch shorted with the resistor housed in safety mechanism 1604.

Cable add-on 1600 may function as an adapter between a cable and a load, and/or an adapter between a power source and a cable. In a first embodiment, pins 1605 may be the same as pins designed to connect to connection point 1601. In a second embodiment, pins 1605 may be different from pins designed to connect to connection point 1601. Cable add-on 1600 may include buttons 1607 and user interface 1606, which may include similar functionalities to buttons 1210 and user interface 1204 of FIG. 12, respectively.

Figure 17A:
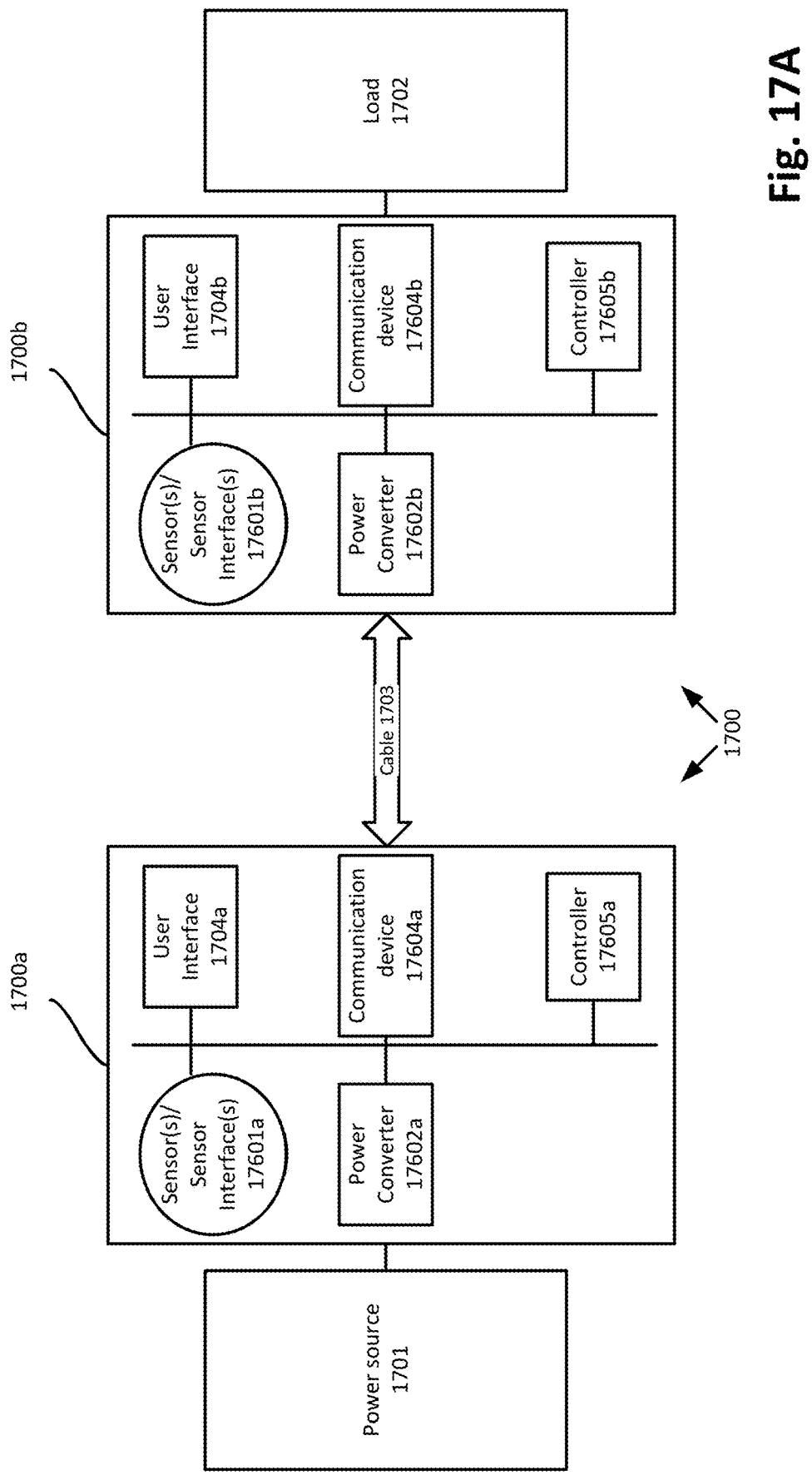
FIG. 17A shows a block diagram of a power system according to illustrative embodiments.

Reference is now made to FIG. 17A, which shows a block diagram of a power system 1700 according to illustrative embodiments. In some embodiments, power system 1700 may have a cable add-on 1700b placed between and coupled to cable 1703 and load 1702. Cable add-on 1700b may include sensor(s)/sensor interface(s) 17601b and power converter 17602b, which may have the same functionality as similar components of FIG. 10. In some embodiments, sensor(s)/sensor interface(s) 17601b may be configured to sense current, voltage, and/or power at an output of a cable 1703. In some embodiments, sensor(s)/sensor interface(s) 17601b may be configured to sense current, voltage, and/or power at an input of a load 1702. Power converter 17602b may be placed in cable add-on 1700b and configured to convert power from cable 1703 at a first current and first voltage to power at a second current and second voltage to charge load 1702. Power converter 17602b may be, for example, a DC-to-DC converter (e.g., a buck converter, boost converter, buck+boost converter, flyback converter, forward converter, buck-boost converter, or charge pump converter).

In some embodiments, power system 1700 may have a cable add-on 1700a placed between and coupled to a power source 1701 and cable 1703 (where cable add-ons 1700a and 1700b may be similar or the same). Sensor(s)/sensor interface(s) 17601a of cable add-on 1700a may sense the value of current, voltage and/or power at an output of power source 1701 and/or sense the current, voltage and/or power at an input to cable 1703. Power converter 17602a may be, for example, a DC-to-DC converter (e.g., a buck converter, boost converter, buck+boost converter, flyback converter, forward converter, buck-boost converter, or charge pump converter).

Cable add-ons 1700a-b may include controllers 17605a-b, respectively. Controllers 17605a-b may have same functionality as controller 1308 of FIG. 10. Controller 17605a may control power converter 17602a such that depending on the values of the electrical parameters (e.g., power, voltage, and current) read by sensor(s)/sensor interface(s) 17601a, power converter 17602a may set output current and voltage values from cable add-on 1700a and input current and voltage values to cable add-on 1700b. Controller 17605b may control power converter 17602b and according to the values of the electrical parameters sensed by sensor(s)/sensor interface(s) 1304b at the input to cable add-on 1700b, may adjust the values of the electrical parameters at an input to load 1702.

Power system 1700 may have cable 1703 with cable add-on 1700a electrically coupled to power source 1701 and cable add-on 1700b electrically coupled to load 1702. In some embodiments power source 1701 may output power at a first voltage and a first current, cable add-on 1700a may adjust the first voltage to a second voltage and adjust the first current to a second current because cable 1703 may be configured or more efficient to transfer power at the second voltage and the second current. Cable add-on 1700b may adjust the second voltage to a third voltage and the second current to a third current because load 1702 may be configured to receive power at the third voltage and the third current.

Cable add-ons 1700a and 1700b may include communication devices 17604a and 17604b, respectively. Communication devices 17604a and 17604b may be have the same functionality as similarly numbered communication device 1310 of FIG. 10.

Cable add-ons 1700a and 1700b may include user interfaces 1704a and 1704b, respectively. User interfaces 1704a and 1704b may be have the same functionality as similarly numbered user interface 1312 of FIG. 11.

Figure 17B:
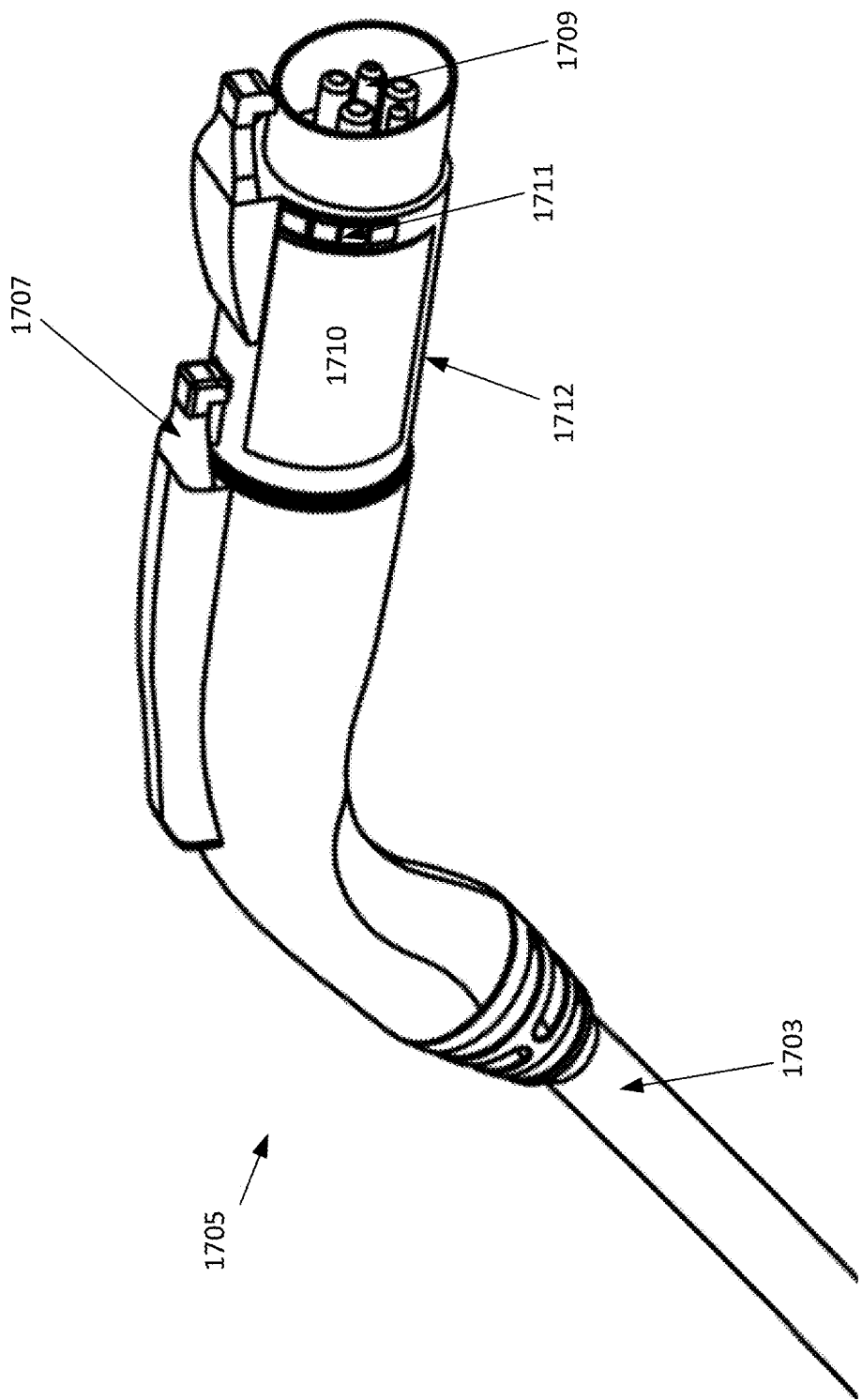
FIG. 17B-17C show an illustrative embodiment of a connector configured to connect to a cable add-on according to illustrative embodiments.
Figure 17C:
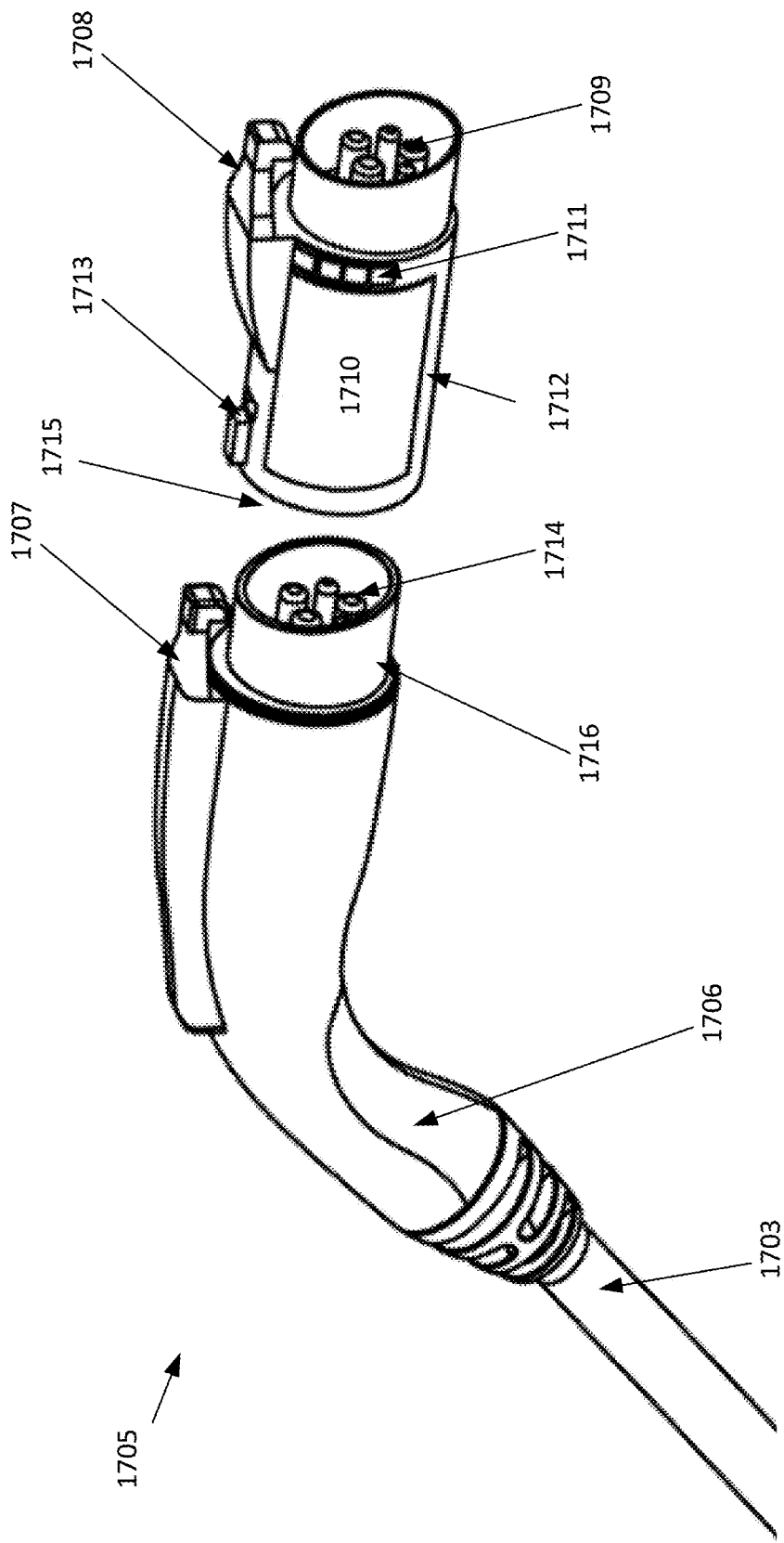

Reference is now made to FIG. 17B-17C, which show an illustrative embodiment of a connector 1705 configured to connect to a cable add-on 1712 according to illustrative embodiments. FIG. 17B shows an instance where cable add-on 1712 is connected to connector 1705 and FIG. 17C shows an instance where cable add-on 1712 is disconnected from connector 1705. Safety mechanism 1707 of connector 1705 may be substantially L-shaped latch and configured to click into cavity 1713 of cable add-on 1712 such that the latch engages a retaining surface of cavity 1713 and the tab of cable add-on 1712 resulting in a coupling of connector 1705 with cable add-on 1712. Pins 1714 may be configured to plug into an input 1715 of cable add-on 1712 while cable add-on 1712 may be designed to receive pins protector 1716 with its receptacle. Pins 1714 of connector 1705 may be arranged, shaped, and/or sized differently or the same as pins 1709 of cable add-on 1712. Connector 1705 may be shaped to provide a handle 1706. Connector 1705 may lock to a receptacle retaining surface of a power source such as power source 1701 or a load such as load 1702 using a mechanical lock (not shown) for example. The Connector 1705 may include similar features and/or functionality as provided and described above with respect to connector 1205.

In some embodiments, user interface 1710 may be electrically and/or magnetically coupled to cable add-on 1712 and may draw power from the power flowing through connector 1705 and cable add-on 1712. User interface may have the same functionality and displays the same information as user interface 1204 of FIG. 12. In some embodiments, user interface 1710 may be powered by an external power source (e.g., a battery or photovoltaic cells).

In some embodiments, user interface 1710 may include a touch screen. In some embodiments, user interface 1710 may be coupled to buttons 1711 such that buttons 1711 may select options displayed or control user interface 1710. User interface 1710 may output (via a display or an audible message) one or more of: state of charge (presented as a percentage and or as a value), voltage needed for the load, current voltage of cable, current voltage of cable add-on 1712, amount of power flowing through cable 1703, amount of power flowing through cable add-on 1712, temperatures in cable 1703, temperatures in connector 1705, temperatures in a load connected to pins 1709, connection status of pins 1714 to cable add-on 1712, connection status of pins 1709 to a load, and notification if charge is enough for upcoming objective such as a planned trip of an EV (e.g., EV currently has enough power stored to travel to a user preset destination). Cable add-on 1712 may have an audible alert (e.g., ring, buzz, beep, voice), alerting on disconnection of a cable from a plug, end of charge, error while charging, etc.

Figure 18:
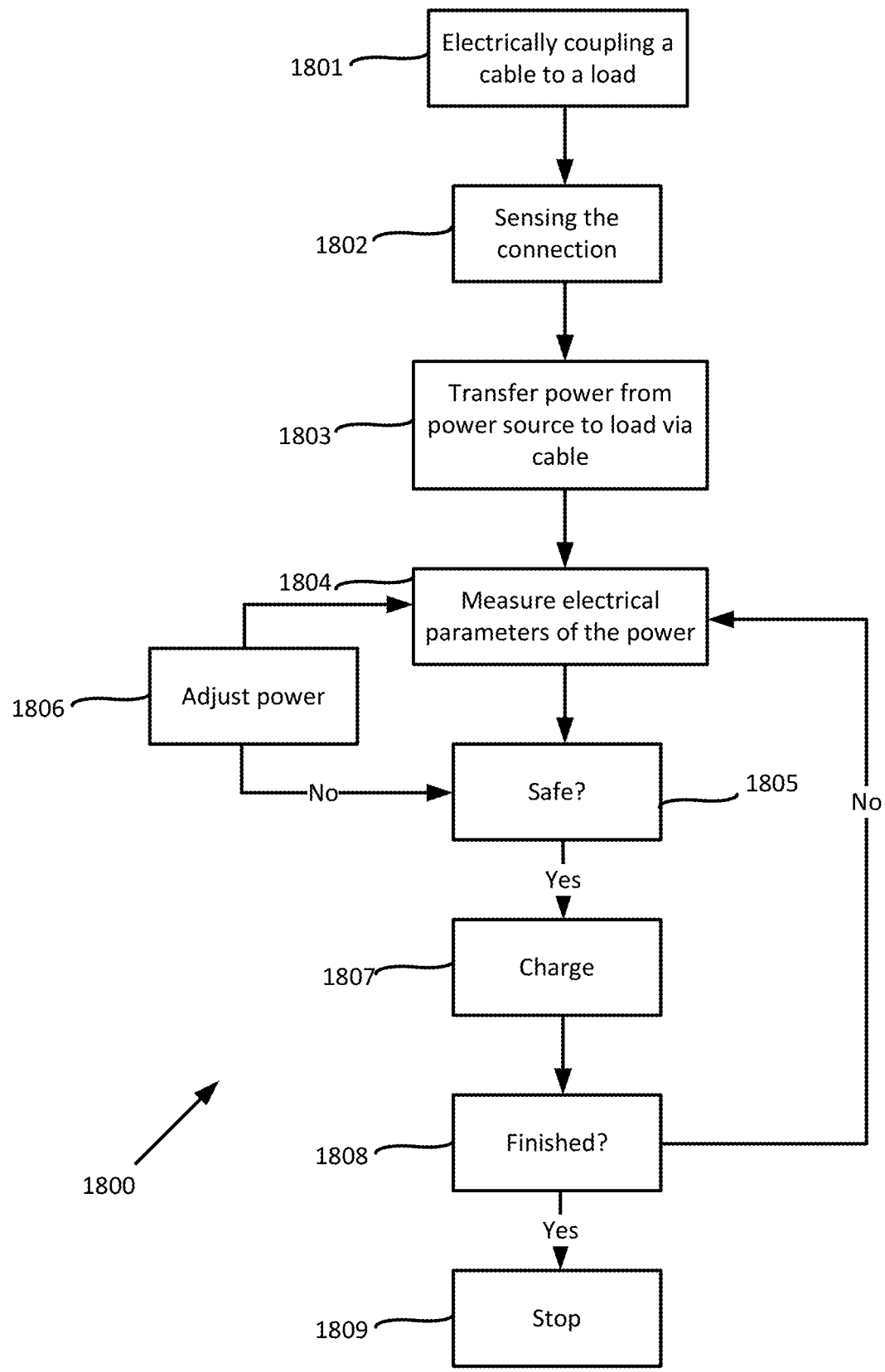
FIG. 18 illustrates a flow chart of a method for charging a load using a cable, according to illustrative embodiments.

Reference is now made to FIG. 18 which illustrates a flow chart of a method 1800 for charging a load (load(s) 110/1302/1702 for example using a cable (cable 1320/1703 for example), according to illustrative embodiments. Step 1801 includes coupling a cable to a load. In some embodiments, the load may be an EV (EV 506/706 for example) configured to receive power from a power source (power sources 101/501n/701/1301/1701 for example). In some embodiments, a first end of the cable may be permanently connected to the power source, and in other embodiments the cable bay be designed to plug into and unplug from the power source using a connector (connector 1205/1500/1705 for example) placed at the first end of the cable. A second end of the cable, opposite the first, may include a connector configured to connect to the load, and the load may include a receptacle designed to receive the connector of the plug.

At step 1802 sensors (sensor-sensor interfaces 217/601 for example) housed in the connector placed at the first and/or second end of the cable may sense the connection between the connector and the receptacle in the load and/or the power source. The connection between the connector and the load and/or the power source may include the placement of the connector in the corresponding receptacle. The connector may have a power circuit (power converters 103/203/303/503/703/1306/17602a/17602b for example) configured to couple to an electronic component placed in the corresponding receptacle such that when the connector is placed in the receptacle correctly the electronic component in the receptacle is coupled to the power circuit in the connector, and the electronic component may change an electric parameter (e.g., voltage, current, impedance) in the power circuit and the sensor(s) may measure the change.

A controller (controllers 213/313/510/715/1308/1760a/17605b for example) coupled to the sensor(s) may determine according to the measurement of the sensor(s) if the connection of the connector to the receptacle is. If the connection is successful, a communication device may signal the power source to start transferring power and/or may signal the load to start drawing power (for example steps in methods 600/610/800). In some embodiments, the cable may have a user interface (GUI 400, user interfaces 1204/1312/1502/1606/1704a/1704b for example) configured to display certain values and alerts with regard to the charging of the load and the power output by the power source. The user interface may display and/or alert audibly if the cable is connected and/or disconnected correctly from the power source and/or the load successful.

In step 1803 the power is transferred from the power source to the load via the cable, following the reception of the signal from the communication device in the cable that the connection of the connector to the receptacle was successful and/or that it is safe to start transferring power. As the power is transferring, step 1804 may include measuring values of the electrical parameters of the power being transferred. The electrical parameters may include the voltage level of the power delivery, the current level of the power delivery and/or the power level which may be computed by multiplying the current and the voltage. In some embodiments the user interface may display the levels of charge, such as the voltage value on the load, the level of current flowing through the cable, the temperature on the cable, the voltage on the cable, and the amount of power flowing through the cable etc.

When the connector is connected to the load, the communication device (communication devices 1310/17604a/17604b for example) in the connector may receive from the load values of electrical parameters which are safe and best fit for the load to receive. In some embodiments, the values of electrical parameters which are safe and best fit for the load to receive are received by an intermediary device (e.g., an adapter device or a retrofit communication device) coupled to the load configured to receive the values from the load. In some embodiments, the values of electrical parameters which are safe and best fit for the load to receive are received by the load itself. In some embodiments, the sensor(s) in the connector may sense certain electrical parameters on the load, and according to assessments done by the controller using look-up tables, determine what safe values of the other electrical parameters may be. For example, the sensor(s) in the connector may sense that the voltage on the load is 12[V], the controller may decide according to a specific look-up table that a safe current may be 5[A] considering the type of load.

At step 1805, the controller housed in the connector may compare the values of the electrical parameters measured by the sensor(s) with electrical parameters of the load. If the values of the electrical parameters of the power being transferred from the power source to the load are safe with regard to the values of the electrical parameters received by the communication device, the transfer of power may be continued and the load may be charged by the power source, at step 1807. In some embodiments, the user interface may provide a display and/or an alert indicating if the values of the electrical parameters are safe, including which electrical parameter are at safe levels and which are not.

If the values of the electrical parameters of the power being transferred are not safe with regard to the values of the electrical parameters received by the communication device, at step 1806 the power may be adjusted to bring all electrical parameters to safe levels. In some embodiments, adjusting the power may be done by signaling the power source to transfer power at safe values of electrical parameters. In some embodiments, adjusting the power may be done by the cable converting the power transferred from the power source to the load, with an integrated power converter. In some embodiments, the power converter may be a DC/DC converter, DC/AC converter, AC/DC converter and/or AC/AC converter. The integrated power converter may be housed in the connector of the cable connecting the power source to the load. After the electrical parameters are adjusted, the values of the electrical parameters are measured again in step 1804. If the values of the electrical parameters are safe (step 1805) the power is transferred from the power source to the load and the power source charges the load (step 1807).

Step 1808 includes checking if the load is fully charged, and/or charged according to a set state of charge, (e.g., a state of charge set before or while charging, for example, 85% charge). If the target set level of charge is reached, (the charging process is finished), the communication device in the cable may receive a signal from the load that the charging process is finished. In some embodiments, the cable may receive a target level of charge from the load at the beginning of the charge. For example, if the load is an EV, the load may indicate to the communication device that the load needs energy for 23 miles of travel more than the current state of charge. The cable may measure the amount of power that transferred from the power source to the load through the cable, and if the amount of power reaches the target level of charge the charging process is stopped.

If the charging process is not finished the transfer of power continues and the method returns to step 1804. If the charging process is finished the charging process is stopped and the transfer of power stops at step 1809. In some embodiments, the user interface may display the amount of energy that was charged and how much use the user may get with the amount of energy charged. For example, in an embodiment where the load is an EV, the user interface may display how many kilometers and/or miles the load may travel. In some embodiments, the user interface may provide an alert that the charging process was finished, where the alert may be displayed on a screen and may be an audible alert such as a beep, buzz and/or a voice announcing a message.

Figure 19A:
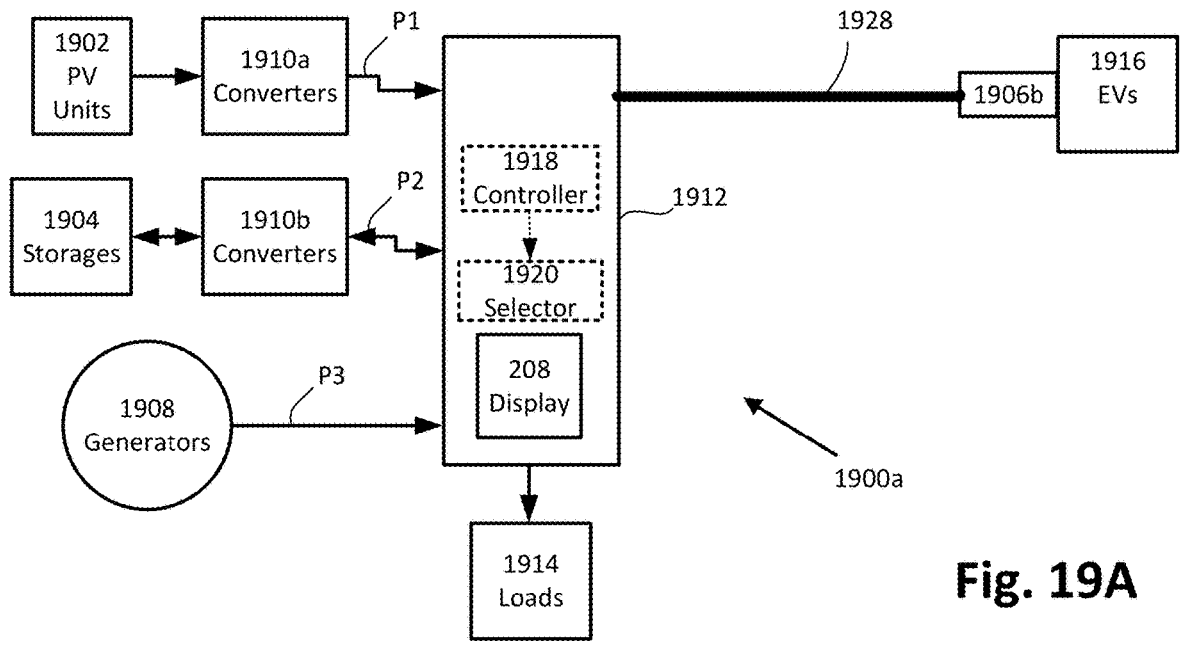
FIGS. 19A-19C block diagrams of exemplary power system configuirations according to illustrative embodiments.
Figure 19B:
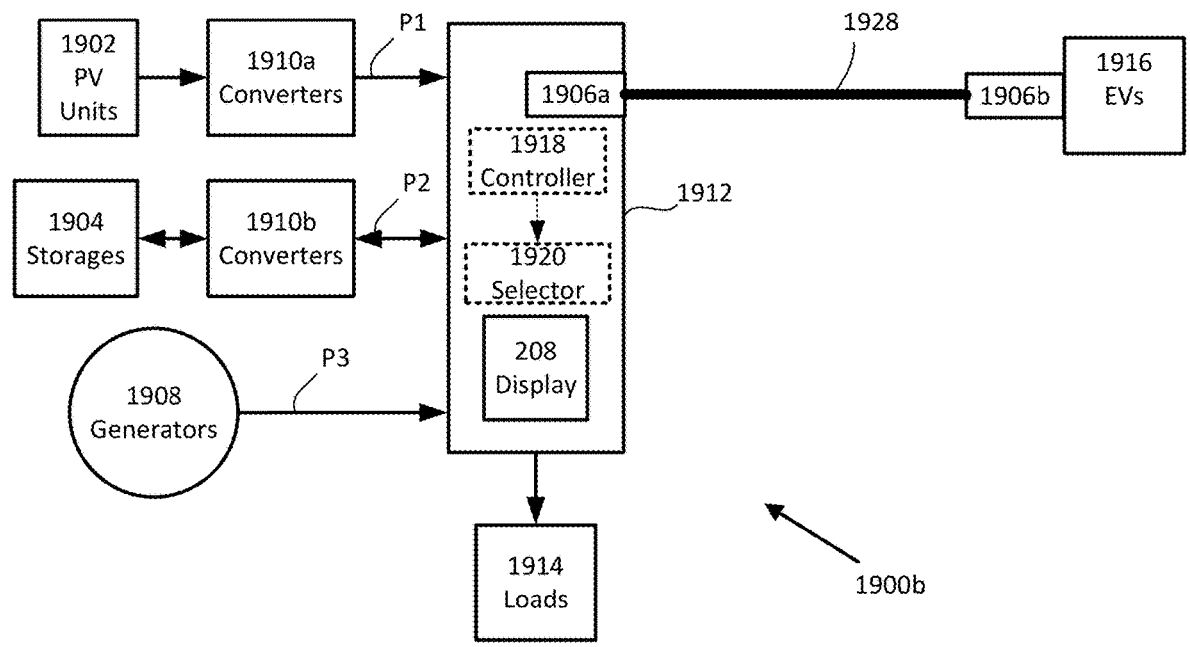
Figure 19C:
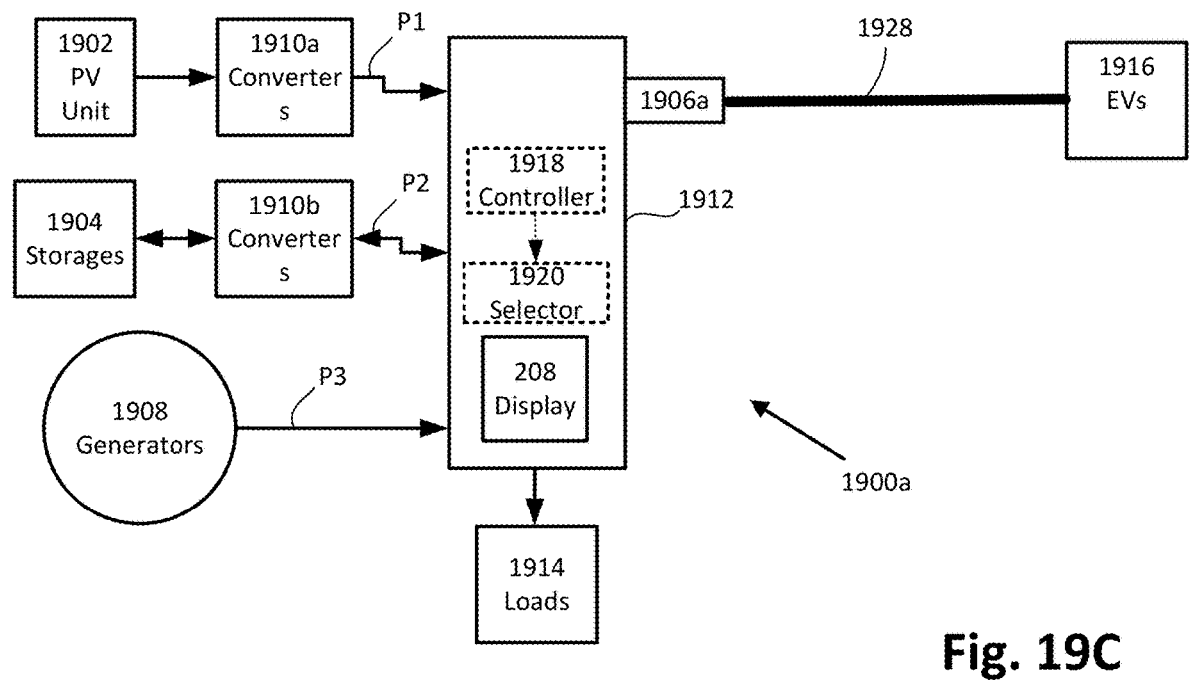

Reference is now made FIGS. 19A, 19B and 19C which show block diagrams of power system configuirations 1900a, 1900b and 1900c, according to illustrative embodiments. Several of the various embodiments described above may be implemented in accordance with the examples depicted in FIGS. 19A, 19B and 19C. As shown in FIGS. 19A, 19B, and 19C, three powers P1, P2 and P3 are shown connected to enclosure 1912. Connection of P1, P2 and P3 may be by connection of respective cables between power converters 1910a, 1910b and generators 1908. Both mechanical and electrical connection of the cables may be by cable glands attached to enclosure and enclosures of power converters 1910a and 1910b (not shown). Similar mechanical and electrical connection of cables may for example be between photovoltaic (PV) units 1902 and power converters 1910a, storages 1904 and power converters 1910b and between generators 1908 and enclosure 1912. Multiple terminal blocks which enable the terminations of the conductors of the cables may be included in enclosure 1912 as well as in the enclosures of power converters 1910a and 1910b (not shown) and generators 1908 (not shown).

Power P1 may be provided from power converters 1910a which convert power from photovoltaic units 1902. Photovoltaic units 1902 may be examples of sources of direct current (DC) power. Other examples of DC power may include DC power provided from DC generators, storage devices such as batteries or supercapacitors. Other examples of sources of DC power may be provided from a rectified source of AC power provided from a utility grid and/or AC generator or DC derived from a switch mode power supply (SMPS) for example. Photovoltaic units 1902 may be inter connected in various serial and/or parallel connections to give DC power outputs converted by converters 1910a where power P1 may be terminated in input terminals of enclosure 1912 to provide multiple sources of both DC and/or AC powers. Examples of multiple sources of both DC and/or AC powers may include power sources 501a ... 501n and 502a ... 502n of EV 506 as shown in FIG. 5 As such converters 1910a may include both DC to DC converters and DC to AC inverters as shown with respect to illustrative embodiments of HEVCs 102, 702 and 509 for example.

Power P2 may be provided from power converters 1910b which convert power from storages 1904. Storages 1904 may include storage devices such batteries or supercapacitors. The flow of power P2 is shown as a bi-directional flow of power since storages not only can be used to store energy but also may provide energy to loads such as loads 1914 for example. Power P2 may include multiple DC and/or AC powers conveyed over the cables which connect between enclosure 1912 and power converters 1910b. As such converters 1910b may provide a feature of providing converters able to convert power P2 in order to store charge in storages 1904 and/or convert power from storages 1904 to enclosure 1912 to provide multiple sources of both DC and/or AC powers. Power P2 may be terminated in the terminals of enclosure 1912 along with the terminations from power P1 for example to provide multiple sources of both DC and/or AC powers.

Power P3 is depicted in a similar way as power power P1 and may be provided from generators 1908. Generators 1908 may be fuel driven generatures or wind powered generators for example. As such power P3 may include include multiple DC and/or AC powers conveyed over the cables which connect between enclosure 1912 and generators 1908.

Enclosure 1912 may connect to electric vehicle EV 1916 via a cable 1928 and also to multiple loads 1914. Cable 1928 may connect to EV 1916 via a connector 1906b which connects to a corresponding recepticcal connector of EVs 1916 (not shown). A controller 1918 may be included in enclosure 1912 which may run an algoriothm which allows a configuration of enclosure to supply power from powers P1, P2 and P3 to loads 1914 and/or storage devices of EVs 1916 via operation of selector units 1920. Selector units 1920 may include multiple switches and/or relays (such as relays 716 as shown in FIG. 7) which when selected selector unit 1920 allow multiple connection paths to enable the supply of power from power sources to storages and/or loads. Examples of the types of connection paths are show by paths 113b, 113c, 113d, 113e, 113f and 113g, shown in FIGS. 1b-1g, and paths A1-A7 shown in FIG. 5.

In general, loads 1914 may include utility grids, an electric motors and storage devices such as storages 1904 and/or storage devices of EVs 1916 for example. Dislpay 208 mounted on enclosure 1912 may be similar to that of GUI 400. Features of GUI 400 may also be included on a display of connector 1906b for example.

Control by the algorithm may allow selection by the selection units 1920 to select the connection paths between the electrical power sources provided by powers P1, P2 and P3 and the loads 1914 and/or storage devices of EVs 1916. Which of the connection paths selected may be responsive to grid tarrifs of utility grids connected to enclosure 1912. The connection paths selected may be also provide powers to loads 1914 and/or storage devices of EVs 1916 by operation of power converters 1910a/1910b through the connection paths responsive to the power demands of loads 1914 and/or storage devices of EVs 1916. The selection of the connection paths may be by use of relays such as relays 716 as shown in FIG. 7 which may switched responsive to currents sensed in power system 700 according to method 800 for example. The power demands of loads 1914 and/or storage devices of EVs 1916 may be sensed by sensors (not shown) operatively attached to controller 1918. The connection paths selected may also provide DC and/or AC input powers to the input terminals of enclosure 1912 to be selectable form the electrical power sources provided by powers P1, P2 and P3 terminated at the input terminals of enclosure 1912 by selection units 1920. As such DC and/or AC input powers to the input terminals of enclosure 1912 may be converted by converters 1910a/1910b to give multiple outputs of DC and/or AC power on the output terminals of enclosure 1912. As such since multiple outputs of DC and/or AC power may be available on the output terminals of enclosure 1912, controllers, selector units similar to controller 1918, selector unts 1920 may be included in connector 1906b. As such the DC and AC power on the output terminals of enclosure 1912 may be converted by multiple power converters located in connectors 1906b to DC and/or AC powers to the corresponding connector recepticals of loads 1914 and/or storage devices of EVs 1916. Alternatively, controllers, selector units similar to controller 1918, selector unts 1920 may be included in the cables and/or cable 1928 in particular.

Differences between FIGS. 19A, 19B and 19C may concern connectors 1906. FIG. 19B shows two conectors 1906a and 1906b where connector 1906a is placed inside enclosure 1912 whereas FIG. 19A has connector 1906b connected between cable 1928 and corresponding connector recepticals of storage devices of EVs 1916. FIG. 19C also shows the possibility of connector 1906A provided on the exterior of enclosure 1912 which may be connectable to corresponding connector recepticals of enclosure 1912 (not shown). Each of connectors 1906 may or may not include controllers, selector units and sensors similar to controller 1918, selector unts 1920 and sensors 217, 1304, 17601a/b for example. In similar way power converters 1910a and/or 1910b may be included inside enclosure 1912 or be connected exteriorly to enclosre 1912.

It is noted that various connections are set forth between elements herein. These connections are described in general and, unless specified otherwise, may be direct or indirect; this specification is not intended to be limiting in this respect. Further, elements of one embodiment may be combined with elements from other embodiments in appropriate combinations or sub combinations. For example, sensors/sensor interfaces 217 of FIG. 2A may be included in inverter 302b or EV charger 302a of FIG. 3. As another example, user interface 1710 may include all or some of the features of user interface 400 of FIG. 4A. Residual Current Detectors (RCD), Ground Fault Detector Interrupters (GFDI), fuse(s), breaker(s), safety switches(s) arc detector(s) and/or other types of safety circuitry that may protect one or more components of IIEVC 202 may similarly incorporated in cables 1320/1703/1928 and connectors 1205/1500/1705/1906a/1906b. Similarly power conversion circuitries of FIG. 2A, 2B, 5, 7, or 9 may be included in connectors 1205/1500/1705 and/or cables 1320/1703/1928.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

The invention claimed is:

1. An apparatus comprising:
an electric vehicle (EV) charger;
a first input terminal configured to receive alternating current (AC) power from an electrical grid;
a second input terminal configured to be electrically connected to a secondary power source;
an output terminal configured to provide electrical power to an electric vehicle;
first current-limiting circuitry connected to the first input terminal, wherein the first current-limiting circuitry is configured to limit current received on the first input terminal to a first maximum current corresponding to a first maximum power; and
second current-limiting circuitry connected to the output terminal, wherein the second current-limiting circuitry is configured to limit the electrical power provided on the output terminal to a second maximum power that is greater than the first maximum power.

2. The apparatus of claim 1, wherein the output terminal is configured to be coupled to a battery of the electric vehicle.

3. The apparatus of claim 1, wherein the first current-limiting circuitry comprises a circuit breaker configured to trip at the first maximum current.

4. The apparatus of claim 1, further comprising a power converter configured to convert power from the second input terminal to the output terminal.

5. The apparatus of claim 1, wherein the electrical power provided on the output terminal is at least twenty percent greater than the first maximum power.

6. The apparatus of claim 1, wherein the second input terminal comprises an AC conductor configured to be connected to a wind turbine.

7. The apparatus of claim 1, wherein the second input terminal comprises a direct current (DC) conductor configured to be connected to a solar power generation system.

8. The apparatus of claim 1, wherein the second input terminal comprises a DC conductor configured to be connected to an energy storage system.

9. The apparatus of claim 1, wherein the output terminal comprises an AC conductor configured to carry AC power or a DC conductor configured to carry DC power.

10. The apparatus of claim 1, wherein the output terminal comprises an AC conductor configured to carry AC power and a DC conductor configured to carry DC power.

11. A method comprising:
receiving, using a first input terminal and first current-limiting circuitry, AC power from an electrical grid, wherein the AC power is limited by the first current-limiting circuitry to a grid maximum current corresponding to a grid maximum power;
receiving, using a second input terminal, electrical power from at least one power source;
providing, using an output terminal and second current-limiting circuitry, electrical power to an electric vehicle; and
limiting, using the second current-limiting circuitry, the electrical power to the electric vehicle to a second maximum power that is greater than the grid maximum power.

12. The method of claim 11, further comprising converting, using a power converter, the electrical power from the at least one power source.

13. The method of claim 11, further comprising coupling a battery to the electric vehicle.

14. The method of claim 11, further comprising tripping a circuit breaker at the grid maximum current.

15. The method of claim 12, wherein the electrical power provided on the output terminal is at least twenty percent greater than the grid maximum power.

16. The method of claim 12, further comprising outputting AC power from an AC conductor or outputting DC power from a DC conductor.

17. The method of claim 12, further comprising carrying AC power from an AC conductor or carrying DC power from a DC conductor.

18. A system comprising:
an electrical grid;
current-limiting circuitry configured to limit current input from the electrical grid to a first maximum current;
a DC-to-AC inverter comprising:
a DC input terminal configured to be connected to a DC power source, and
an AC output terminal configured to provide AC power, wherein the AC output terminal is configured to be electrically connected to the current-limiting circuitry via a first AC current path; and
an electric vehicle charging circuit connected to the AC output terminal via a second AC current path,
wherein the electric vehicle charging circuit is configured to draw the AC power from the AC output terminal via the second AC current path according to a second maximum current that is greater than the first maximum current.

19. The system of claim 18, wherein the second maximum current is at least twenty percent greater than the first maximum current.

20. The system of claim 18, wherein the current-limiting circuitry comprises a circuit breaker configured to trip at the first maximum current.

* * * * *

UNITED STATES PATENT AND TRADEMARK OFFICE
CERTIFICATE OF CORRECTION

| | |
|---|---|
| PATENT NO. | : 11,400,821 B2 |
| APPLICATION NO. | : 17/017842 |
| DATED | : August 2, 2022 |
| INVENTOR(S) | : Galin et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 149 days.

Signed and Sealed this
Eleventh Day of February, 2025

Coke Morgan Stewart
*Acting Director of the United States Patent and Trademark Office*